(12) United States Patent
Benesi

(10) Patent No.: US 12,115,476 B2
(45) Date of Patent: Oct. 15, 2024

(54) FILTER APPARATUS, FILTER DISC SECTORS, FILTER ELEMENTS AND USES

(71) Applicant: Steve C. Benesi, Novato, CA (US)

(72) Inventor: Steve C. Benesi, Novato, CA (US)

( * ) Notice: Subject to any disclaimer, the term of this patent is extended or adjusted under 35 U.S.C. 154(b) by 474 days.

(21) Appl. No.: 17/435,955

(22) PCT Filed: Mar. 5, 2020

(86) PCT No.: PCT/US2020/021076
§ 371 (c)(1),
(2) Date: Sep. 2, 2021

(87) PCT Pub. No.: WO2020/185484
PCT Pub. Date: Sep. 17, 2020

(65) Prior Publication Data
US 2022/0143536 A1    May 12, 2022

Related U.S. Application Data

(60) Provisional application No. 62/919,383, filed on Mar. 8, 2019.

(51) Int. Cl.
*B01D 33/23* (2006.01)
*B01D 33/46* (2006.01)
*B01D 33/48* (2006.01)

(52) U.S. Cl.
CPC ........... *B01D 33/23* (2013.01); *B01D 33/466* (2013.01); *B01D 33/48* (2013.01)

(58) Field of Classification Search
CPC ...... B01D 33/23; B01D 33/466; B01D 33/48; B01D 37/02
See application file for complete search history.

(56) References Cited

U.S. PATENT DOCUMENTS 4,330,405 A    5/1982  Davis et al.
4,721,566 A *  1/1988  Chamberlain ......... B01D 33/19
                                                  210/345

(Continued)

FOREIGN PATENT DOCUMENTS

CN    108970219 A  * 12/2018  ............. B01D 33/21
RU    2163502 C1     2/2001

(Continued)

OTHER PUBLICATIONS

Supplementary European Search Report for European Application No. 2077010.3 dated Oct. 7, 2022.

(Continued)

*Primary Examiner* — Bradley R Spies
*Assistant Examiner* — Jeannie McDermott
(74) *Attorney, Agent, or Firm* — Buchanan Ingersoll & Rooney PC

(57) ABSTRACT

A filtration device can be configured to form filter cakes and filtrate by filtering solid particulates from a slurry. Some embodiments of the filtration device can utilize a mechanism that is configured to separate the formed filter cake from a disc sector for subsequent processing of the solid particulates of the filter cake and/or the formed filtrate. Embodiments of the filter device and/or mechanisms of the filter device as well as methods of making and using the same can help provide improvements in operational efficiency for processing operations in which solids are to be filtered from a slurry.

22 Claims, 31 Drawing Sheets

(56) References Cited

U.S. PATENT DOCUMENTS

| | | | |
|---|---|---|---|
| 5,656,162 A * | 8/1997 | Nilsson | B01D 33/60 |
| | | | 210/324 |
| 6,461,507 B1 * | 10/2002 | Ishigaki | B01D 29/055 |
| | | | 210/111 |
| 2004/0238439 A1 * | 12/2004 | Oglesby | B01D 33/19 |
| | | | 210/483 |
| 2012/0325753 A1 | 12/2012 | Baker et al. | |
| 2014/0374363 A1 | 12/2014 | Hammarberg et al. | |
| 2020/0023293 A1 * | 1/2020 | Knoop | B01D 21/2461 |

FOREIGN PATENT DOCUMENTS

| | | |
|---|---|---|
| RU | 2254237 C2 | 6/2005 |
| WO | 9816293 | 4/1998 |
| WO | 2014061184 A1 | 4/2014 |
| WO | 2014170533 A1 | 10/2014 |
| WO | 2017005972 A1 | 1/2017 |

OTHER PUBLICATIONS

International Search Report for PCT/US2020/021076 dated Jun. 1, 2020.

* cited by examiner

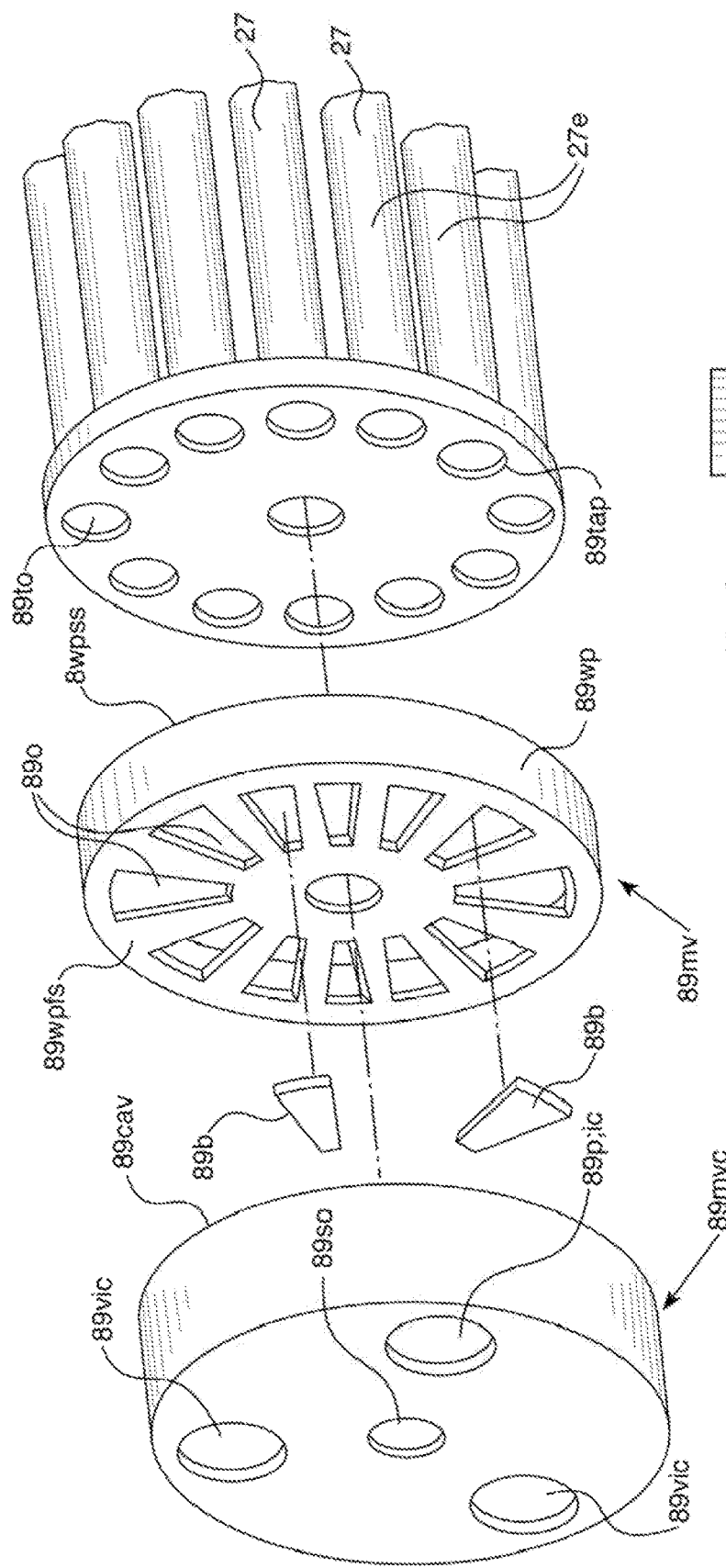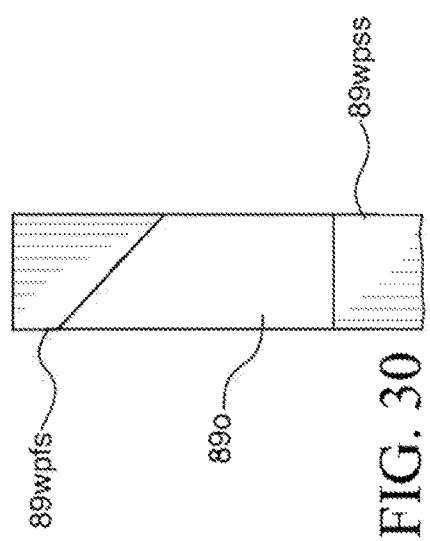
FIG. 29
FIG. 30

FILTER APPARATUS, FILTER DISC SECTORS, FILTER ELEMENTS AND USES

CROSS-REFERENCE TO RELATED APPLICATION

The present application is the U.S. national stage application of International Application No. PCT/US2020/021076, which claims priority to U.S. Provisional Patent Application No. 62/919,383, which was filed on Mar. 8, 2019.

FIELD

The present innovation is directed to filtration systems, filter devices, filtration elements used to remove solid particulates from a slurry for forming a filter cake and/or forming cleaner filtrate, mechanisms utilized to separate a formed filter cake from a filter element of a filter device, mechanisms used in filtration devices, and methods of making and using the same.

BACKGROUND

Filter devices are often used in mineral processing, processing of starch or chemical products, processing of agglomerated material, power generation applications, and other industries to remove solid materials from a slurry (e.g. a liquid having solid particulates entrained therein or a gas having solid particulates entrained therein). Examples of such devices can be appreciated from U.S. Pat. Nos. 6,409,929, 6,006,554, 4,330,405, 4,207,190, 4,152,267, 3,869,389, 3,471,026, 3,291,312, 3,250,396, and 1,538,980 and U.S. Patent Application Publication Nos. 2018/0326357, 2018/0071667, 2017/0341004, 2016/0121245, 2016/0074784, 2015/0266780, 2015/0184099, 2014/0346104, 2013/0161252, 2013/0008006, 2011/0131873, 2011/0011785, 2010/0115899, 2009/0139193, 2008/0314012, 2007/0017196, 2005/0067342, and 2004/0177471. Other examples of filter devices and mechanisms that can be used in such devices can be appreciated from my U.S. Pat. Nos. 7,011,741, 6,521,135, 6,491,817, 6,159,359, 5,477,891, 5,292,434, 5,059,318, and U.S. Patent Application Publication Nos. 2006/0102545, 2006/0027509, 2006/0283785, and 2007/0256984.

SUMMARY

Embodiments of a filtration device, filtration elements used to remove solid particulates from a slurry for forming a filter cake, mechanisms utilized to separate a formed filter cake from a filter element of a filter device, and methods of making and using the same are disclosed herein that provide improvements over conventional filtration devices, conventional filtration mechanisms, and conventional methods of utilizing such devices and mechanisms. In some embodiments, a significant improvement in operational parameters and a reduction at the rate at which maintenance may be required can result in significant improvements in operational performance and output for mineral processing operations, processing of starch or chemical products, processing of agglomerated material, power generation applications, and other industrial processing that may utilize a filtration system for filtering solid particulate material from a slurry. This can be particularly true for embodiments that are configured for use in filtering solid particulates from a liquid slurry having the solid particulates entrained therein.

A filtration device can include at least one rotatable disc that is rotatable so disc sectors are insertable into a slurry bath positioned adjacent the at least one rotatable disc. The disc sectors can be configured to form filter cakes comprised of solid particulate material of the slurry via rotation of the at least one rotatable disc. The filtration device can include at least one of:

(i) a scraper comprising at least one scraper member configured to scrape filter cakes formed on the disc sectors of at least one disc via the at least one scraper member directly contacting at least one filter element of each of the disc sectors of the disc to remove the filter cake for directing solid particulate material of the filter cake to at least one discharge chute;

(ii) a backwash mechanism configured to feed backwash fluid to the disc sectors of the at least one rotatable disc via tube manifolds connected to a backwash mechanism tank of the backwash mechanism so backwash fluid flows through inner spaces defined by a frame and at least one filter element of each of the disc sectors via the tube manifolds and is output from passageways of the at least one filter element to clean the filter element during a backwash operation, the backwash fluid including liquid, gas, or a combination of liquid and gas;

(iii) a dip mechanism configured so that so that the disc sectors of each disc move independently of each other between a retracted position and an extended position so that the disc sectors are in the extended position when passing through the slurry bath and are in the retracted position when out of the slurry bath during rotation of the at least one rotatable disc; and (iv) a master valve assembly configured so that at least one disc sector of each disc receives a backwash fluid flow while vacuum flows of fluid is passed out of other disc sectors of each disc during each revolution of the at least one disc.

In some embodiments, the filtration device can include all of features (i)-(iv) (i.e. the dip mechanism, the backwash mechanism, the master valve assembly, and the at least one scraper). In other embodiments, the filtration device can include only one of these features, two of these features, or three of these features. For instance, the filtration device can include: (a) the dip mechanism and the backwash mechanism, (b) the dip mechanism and the at least one scraper, (c) the at least one scraper and the backwash mechanism, or (d) the master valve assembly and the backwash mechanism.

The filter elements of the disc sectors can have different configurations in different embodiments of the filtration device. In some embodiments, the filter element can be comprised of a mesh body that has a coating that covers a portion of the mesh body, a side of the mesh body, an entirety of the exterior surface of the mesh body or at least a portion of the exterior surface of the mesh body.

Each disc sector can include at least one stabilizer element positioned in an inner space of a frame extending between filter elements attached to opposite sides of the frame. In other embodiments, each disc sector may only have a single filter element and may or may not utilize stabilizer elements.

In embodiments that utilize at least one scraper, the filtration device can include a first scraper member positioned so that a distal end of the scraper member contacts the filter element of the disc sectors of a first disc of the at least one disc at a first side of the disc. There can also be a second scraper member positioned so that a distal end of the scraper member contacts the filter element of the disc sectors of a first disc of the at least one disc at a second side of the disc.

Each scraper can also include a guide positioned adjacent the distal end of the first scraper member and/or the distal end of the second scraper member. In some embodiments, each guide can be configured as a rider that rides on the filter elements of the disc sectors of the first disc.

In embodiments that utilize a backflow mechanism, the backflow mechanism can be configured to provide a backflow fluid of just liquid, just gas, or a combination of gas and liquid. For instance, embodiments of the backflow mechanism can include a liquid source, a compressed gas source, and a backflow mechanism tank. The backflow mechanism tank can be connected to the compressed gas source to receive compressed gas from the compressed gas source. The backflow mechanism tank can also be connected to the liquid source to receive liquid from the liquid source. The backflow mechanism tank have a backflow fluid outlet to output the backflow fluid from the backflow mechanism tank. The backflow mechanism can also include a diffuser positioned in the backflow mechanism tank to mix the compressed gas with the liquid in the backflow mechanism tank to form a two phase backflow fluid.

In embodiments that utilize the dip mechanism, the dip mechanism can include multiple tube manifold moving devices for dipping of disc sectors of discs into the slurry bath during a slurring insertion phase of each revolution of the disc(s). For instance, the dip mechanism can include a first tube manifold moving device connected adjacent first ends of the tube manifolds and a second tube manifold moving device connected adjacent second ends of the tube manifolds. The first tube manifold moving device and the second tube manifold moving device can each include a rotatable cam, a moveable lever, and an actuator member connecting the cam to the lever so that rotation of the cam causes the lever to move to adjust a vertical position of a distal end of the lever attached to a moveable segment of an attachment ring to which the tube manifolds are connected so that a position of a respective one of the tube manifolds is adjusted relative to the other tube manifolds from the retracted position to the extended position while the tube manifold is positioned into engagement with the moveable segment of the attachment ring. Each cam can be positioned so that the cam rotates as the tube manifolds rotate.

In some embodiments, each lever of the dip mechanism can be pivotally attached to a wall of the slurry bath or a floor of the slurry bath and rotates to vertically adjust the moveable segment of the attachment ring. For embodiments that utilize a dip mechanism, the first ends of the tube manifolds can be connected to flexible connection hoses and the second ends of the tube manifolds can be connected to flexible connection hoses. The flexible connection hoses can flex between flexed and compressed positions to accommodate the retracting and extension movement of the tube manifolds.

A filtration system can include at least one embodiment of the filtration device or a plurality of embodiments of the filtration device. The system can include a plurality of filtration devices configured to operate in parallel or in series in some embodiments.

A method of operating a filtration device is also provided. Embodiments of the method can include operating at least one embodiment of the filtration device or operating multiple embodiments of the filtration device in a filtration system.

For some embodiments that utilize the backwash mechanism, each of the tube manifolds can be connected to disc sectors via outlet conduits extending from frames of the disc sectors to which the tube manifold is connected so that fluid is passable from between an inner space of the frame and a fluid conduit defined by the tube manifold. There can also be a plurality of gaskets and a plurality of gasket attachment plates. Each of the gaskets can be positioned about a respective one of the outlet conduits to surround the outlet conduits and engage the tube manifold adjacent an interface between the outlet conduit and the tube manifold. Each of the gasket attachment plates can be positioned on a respective one of the gaskets to position the gasket in a resilient engagement adjacent the interface between the outlet conduit and the tube manifold. In some embodiments, each of the gasket attachment plates can be configured to facilitate attachment of the frame of the disc sector to the tube manifold as well (e.g. via use of fasteners, welding and/or other attachment mechanisms).

In some embodiments of the filtration device that include the master valve assembly, the master valve assembly can include a tube manifold attachment plate configured to attach to the tube manifolds so that the tube manifolds are in fluid communication with the backwash mechanism and a vacuum driving mechanism. There can also be a plurality of blocking elements positioned in a cavity of the master valve assembly to define a backwash fluid chamber and a vacuum chamber in the cavity. The blocking elements can be positioned so that during rotation of the tube manifold plate, each tube manifold attached to the tube manifold plate is in fluid communication with the backwash fluid chamber during a first phase of a revolution of the at least one disc and is also in fluid communication with the vacuum chamber during a second phase of the revolution of the at least one disc. The first phase of the revolution can be the scraping phase of the revolution and the second phase of the revolution can be a drying phase.

Some embodiments of a method of operating a filtration device can include providing a filtration device having at least one rotatable disc of disc sectors that rotates adjacent a slurry bath and at least one of:

(i) scraping filter cakes formed on the at least one disc via scraper members directly contacting filter elements of the at least one disc to remove the filter cake from the at least one disc for directing solid particulate material of the filter cake to at least one discharge chute;

(ii) feeding backwash fluid to the at least one disc via tube manifolds connected to a backwash mechanism tank so the backwash fluid flows through inner spaces defined by frames and filter elements of disc sectors of the at least one disc via the tube manifolds and is output from passageways of the filter element to clean the filter element during a backwash operation, the backwash fluid including liquid, gas, or a combination of liquid and gas;

(iii) rotating the at least one disc so that disc sectors of the at least one disc move independently between a retracted position and an extended position so that the disc sectors are in the extended position when passing through the slurry bath and are in the retracted position when out of the slurry bath; and (iv) passing a backwash fluid flow through at least one disc sector of each disc while vacuum flows of fluid are passed out of other disc sectors of each disc during each revolution of the at least one disc. Embodiments of the method can include all of steps (i) through (iv) or a subset of such steps (e.g. a combination of three or two of these steps or just one of these steps, etc.).

Other embodiments of methods are also provided. For example, a method of providing a filter element for a disc sector of a filtration device comprising: positioning a mesh body between a permeable septum and a mold body having an opening defined therein, adding matrix material comprising a polymeric material and solid particulate material within the opening of the mold body, and applying heat and pressure for a pre-selected period of time so that a portion of the matrix material is liquefied and the portion of the liquefied matrix material passes through holes in the mesh body and out of the permeable septum so that a portion of the matrix material covers a portion of the mesh body and is curable thereon to bond to the mesh body so that a coating covers a portion of the mesh body such that the mesh body having the coating has passageways defined therein after the matrix material cures on the mesh body. The liquefied matrix material can include a liquefied portion of the polymeric material.

In some embodiments, the particulate material of the matrix material can include silica, glass, diatomaceous earth and/or perlite. The coating that can be formed on the mesh body can be hydrophilic or hydrophobic, or can have both hydrophilic and hydrophobic properties. The method can also include selecting ingredients for the matrix material so the coating is hydrophilic, hydrophobic of has both hydrophilic properties and hydrophobic properties.

The method of providing a filter element can also include draining the portion of the liquefied matrix material passed through the holes of the mesh body away from the mesh body during the applying of heat and pressure. The septum can be positioned on a stand. The method can also include attaching the filter element to a frame of a disc sector after the matrix material has cured on the mesh body and attaching the frame of the disc sector to a tube manifold of a filtration device to form a disc of disc sectors of the filtration device.

The method can also include adding a reinforcing member onto a top of the matrix material within the opening of the mold body. The reinforcing member can be positioned on the matrix material before the applying of the heat and pressure for the pre-selected period of time so that the reinforcing member is embedded onto the coating and the coating formed on the mesh body is between the reinforcing member and the mesh body.

A filter element molding system that can be used to form filter elements is also provided. The filter element molding system can include a mold body having an opening defined therein, a permeable septum configured so that a liquefied portion of the matrix material is passable through the septum when the matrix material is liquefied, and a die configured to apply heat and pressure for a pre-selected time period within the opening of the mold body to bond the matrix material to a mesh body positioned in the opening of the mold body so that the liquefied matrix material passes through holes in the mesh body and out of the permeable septum so that a portion of the matrix material covers the mesh body and is curable thereon to bond to the mesh body so that a coating covers the mesh body such that the mesh body having the coating is a filter element having passageways defined therein after the matrix material cures on the mesh body.

The coating can hydrophilic or hydrophobic, or can have both hydrophilic and hydrophobic properties.

Embodiments of the filter element molding system can also include a stand that supports the septum. The stand can be configured so that a portion of the matrix material passed through the holes of the mesh body away from the mesh body via the septum is passable away from the stand for recycling or disposal. An annular seal member can also be positionable between the mold body and the septum. There can also be a release plate positionable between the septum and the stand.

It should be appreciated that embodiments of filter elements made using the filter element molding system can be incorporated into disc sectors of embodiments of the filtration device.

A method of operating a filtration device can also include providing the filtration device, operating the filtration device, and then removing first disc sectors of the at least one disc. The removed first disc sectors can have first filter elements that include a mesh body having a skin encapsulating at least a portion of the mesh body. The method can also include installing new second disc sectors having second filter elements to replace the removed first disc sectors to form the at least one disc. The new second filter elements can be ceramic filter elements or cloth filter elements. The method can also include operating the filtration device with the new second filter elements. Thereafter, the method can include removing the second disc sectors of the at least one disc and installing new third disc sectors having third filter elements to form the at least one disc (and replace the removed second disc sectors). The new third filter elements can include a mesh body having a skin encapsulating at least a portion of the mesh body. The method can also include operating the filtration device with the new third filter elements. Embodiments of the method can also include at least one of:

(i) scraping filter cakes formed on the third filter elements via scraper members directly contacting the third filter elements to remove the filter cake for directing solid particulate material of the filter cake to at least one discharge chute;

(ii) feeding backwash fluid to the at least one disc via tube manifolds connected to a backwash mechanism tank so the backwash fluid flows through inner spaces defined by frames and the third filter elements of disc sectors of the at least one disc via the tube manifolds and is output from passageways of the third filter elements to clean the third filter elements during a backwash operation, the backwash fluid including liquid, gas, or a combination of liquid and gas;

(iii) rotating the at least one disc so that the disc sectors of the at least one disc move independently between a retracted position and an extended position so that the disc sectors are in the extended position when passing through the slurry bath and are in the retracted position when out of the slurry bath; and (iv) passing a backwash fluid flow through at least one disc sector of each disc while vacuum flows of fluid are passed out of other disc sectors of each disc during each revolution of the at least one disc.

Embodiments of a filtration device can include at least one rotatable disc that is rotatable so that disc sectors of each rotatable disc are insertable into a slurry bath positioned adjacent the rotatable disc. The disc sectors can be configured to form filter cakes comprised of solid particulate material of the slurry via rotation of the rotatable disc. A plurality of tube manifolds can be provided. Each of the tube manifolds can be connected to a respective one of the disc sectors via an outlet conduit extending from a frame of the disc sector to which the tube manifold is connected so that fluid is passable from between an inner space of the frame and a fluid conduit defined by the tube manifold. A plurality of gaskets and a plurality of gasket attachment plates can also be included in such embodiments. Each of the gaskets can be positioned about a respective one of the outlet conduits to engage the tube manifold adjacent an interface between the outlet conduit and the tube manifold. Each of the gasket attachment plates can be positioned on a respective one of the gaskets to position the gasket in a resilient engagement adjacent the interface between the outlet conduit and the tube manifold to seal the interface. Each of the gasket attachment plates can be configured to facilitate attachment of the frame of the disc sector to the tube manifold. Each gasket attachment plate can be positioned to maintain the gasket to which the gasket attachment plate is on so that the gasket is maintained at a second compressed thickness or height that is less than a first thickness or height of the gasket so that the gasket resiliently engages the interface to seal the interface. Embodiments of the filtration device utilizing the gasket/gasket attachment plate feature can help ensure that fluid is passable between the disc sectors and tube manifolds at relatively high pressures or high vacuum levels.

Other embodiments of a filtration device can include at least one rotatable disc that is rotatable so that disc sectors of each rotatable disc are insertable into a slurry bath positioned adjacent the rotatable disc. The disc sectors can be configured to form filter cakes comprised of solid particulate material of the slurry via rotation of the rotatable disc. The filtration device can include a master valve assembly that can be configured so that at least one disc sector of each disc receives a backwash fluid flow while vacuum flows of fluid is passed out of other disc sectors of each disc during each revolution of the at least one disc. Embodiments of the filtration device can also include a backwash mechanism connected to the master valve assembly via a backwash fluid conduit connecting the backwash mechanism to a backwash fluid port opening of the master valve assembly that is in fluid communication with a backwash fluid chamber within a cavity of the master valve assembly. At least one vacuum driving mechanism can be connected to the master valve assembly via at least one vacuum flow conduit connecting the at least one vacuum driving mechanism to a vacuum port opening of the master valve assembly that is in fluid communication with a vacuum chamber within the cavity of the master valve assembly. The master valve assembly can be configured to help facilitate operation of the filtration device so that, for each disc, some disc sectors are exposed to a vacuum during a drying phase of a revolution of a disc while at least one disc sector is exposed to a backwash fluid flow during the scraping phase of the revolution.

The master valve assembly of the filtration device can include blocking elements to define different chambers within a cavity in some embodiments. For instance, there can be a first blocking element and a second blocking element positioned in the cavity to define the backwash fluid chamber and the vacuum chamber within the cavity. In other embodiments, the master valve assembly may have a body that defines the different chambers without use of the blocking elements (e.g. there may be separate chambers defined in the body as vacuum and backwash ports, etc.).

The master valve assembly can be connected to a plurality of tube manifolds. Each of the tube manifolds can be connected to a respective disc sector of each disc. The tube manifolds can be connected to the master valve assembly such that the tube manifolds are in fluid communication with the cavity and are rotatable relative to the backwash fluid chamber and the vacuum chamber within the cavity so that during a revolution, each tube manifold is in fluid communication with the backwash fluid chamber for a first phase of the revolution and is in fluid communication with the vacuum chamber for a second phase of the revolution. In some embodiments, the vacuum chamber can be isolated from the backwash fluid chamber within the cavity and the vacuum chamber and the backwash fluid chamber can be defined by spaced apart blocking elements positioned in the cavity. Some of the tube manifolds can be in fluid communication with the vacuum chamber during the revolution so that vacuum flows pass from some of the tube manifolds to the vacuum chamber while at least one backwash fluid flow passes from the backwash fluid chamber to at least one other tube manifold.

These and other objects, aspects and advantages of the present invention will be better appreciated in view of the drawings and following detailed description of certain exemplary embodiments thereof.

BRIEF DESCRIPTION OF THE DRAWINGS

Exemplary embodiments of filter devices, filtration elements used to remove solid particulates from a slurry for forming a filter cake and a substantially clean filtrate, mechanisms utilized to separate a formed filter cake from a filter element of a filter device, filtration element fabrication systems, and embodiments of methods for making and using the same are shown in the accompanying drawings. It should be understood that like reference numbers used in the drawings may identify like components.

FIG. 10 illustrates exemplary phases of a revolution of the disc(s) of the filtration device.

FIG. 29 is an exploded view of the first filtration device 10 illustrating an exemplary master valve assembly of the device for connection of vacuum and/or backflow fluid conduits to the tube manifolds 27 that can facilitate vacuum and/or backwash operations of the filtration device 10.

FIG. 30 is a cross sectional view of the wear plate 89wp shown in FIG. 29 to illustrate an exemplary shape of the wear plate opening 89o.

DETAILED DESCRIPTION OF EXEMPLARY EMBODIMENTS

Figure 1:
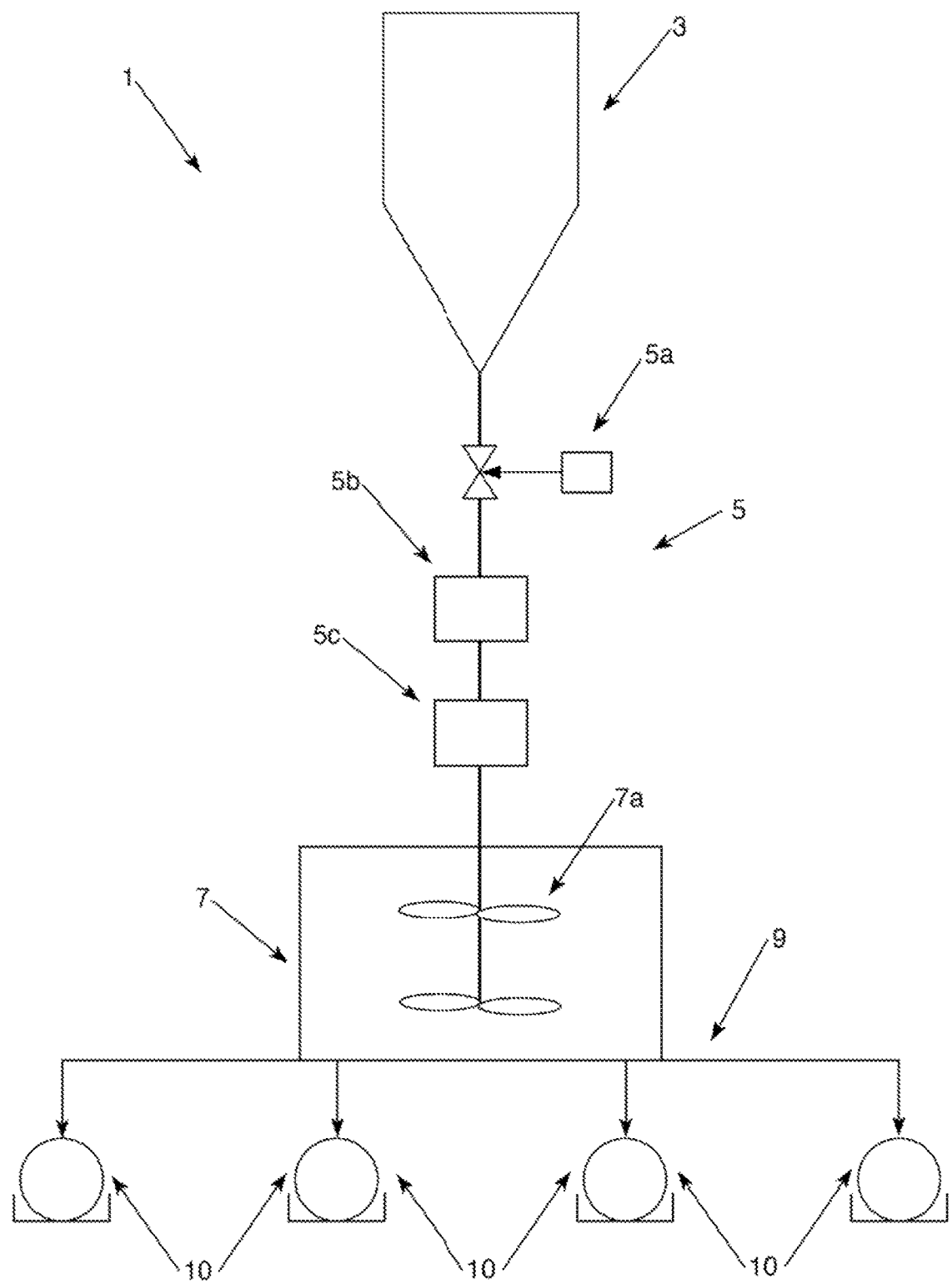
FIG. 1 is a schematic view of a first exemplary embodiment of a filtration system.
Figure 2:
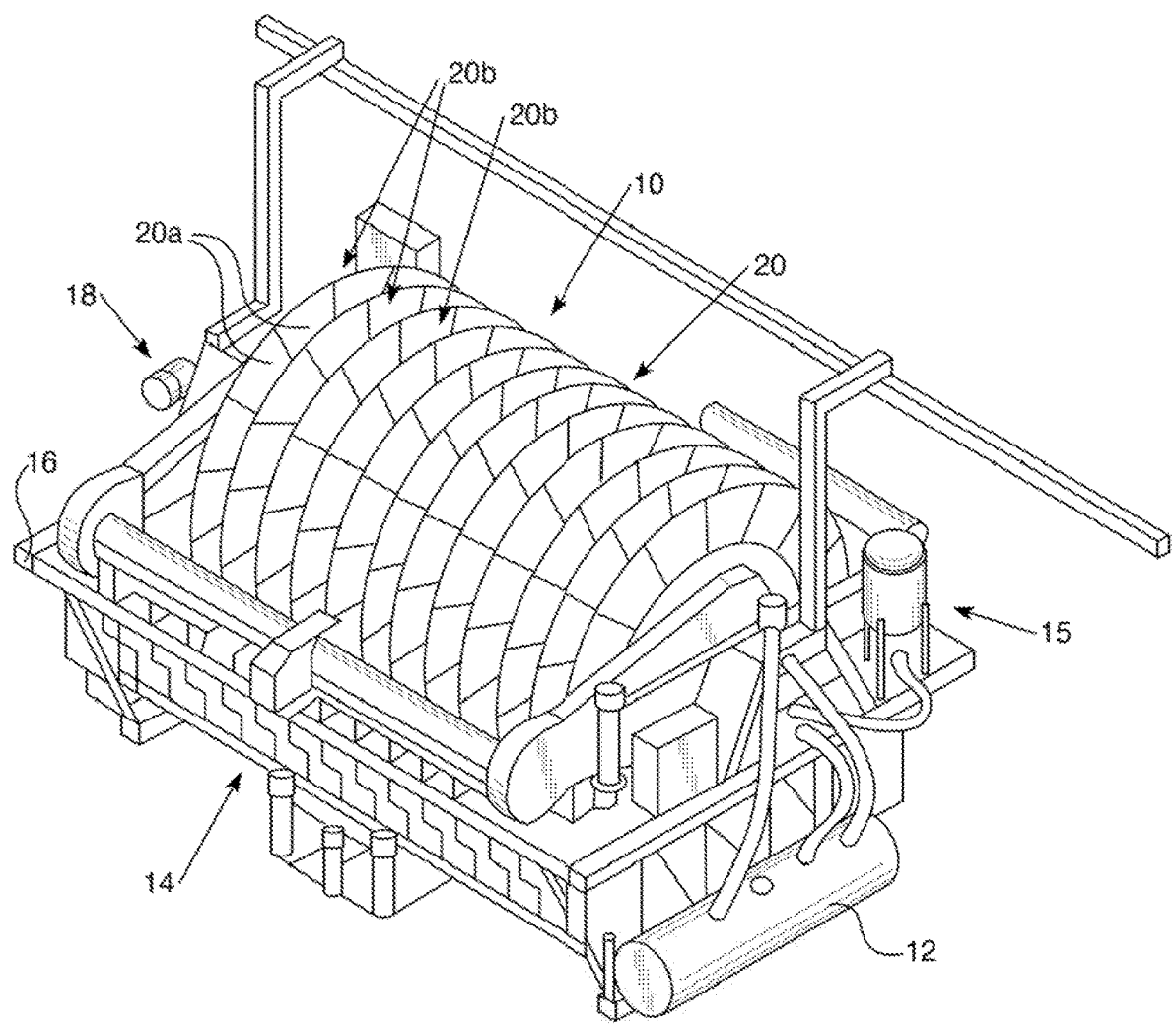
FIG. 2 is a perspective schematic view of a first exemplary embodiment of a filtration device of the first exemplary embodiment of the filtration system. A hood 26 of the filtration device is removed to better illustrate internal components of the filtration device 10 in FIG. 2.
Figure 3:
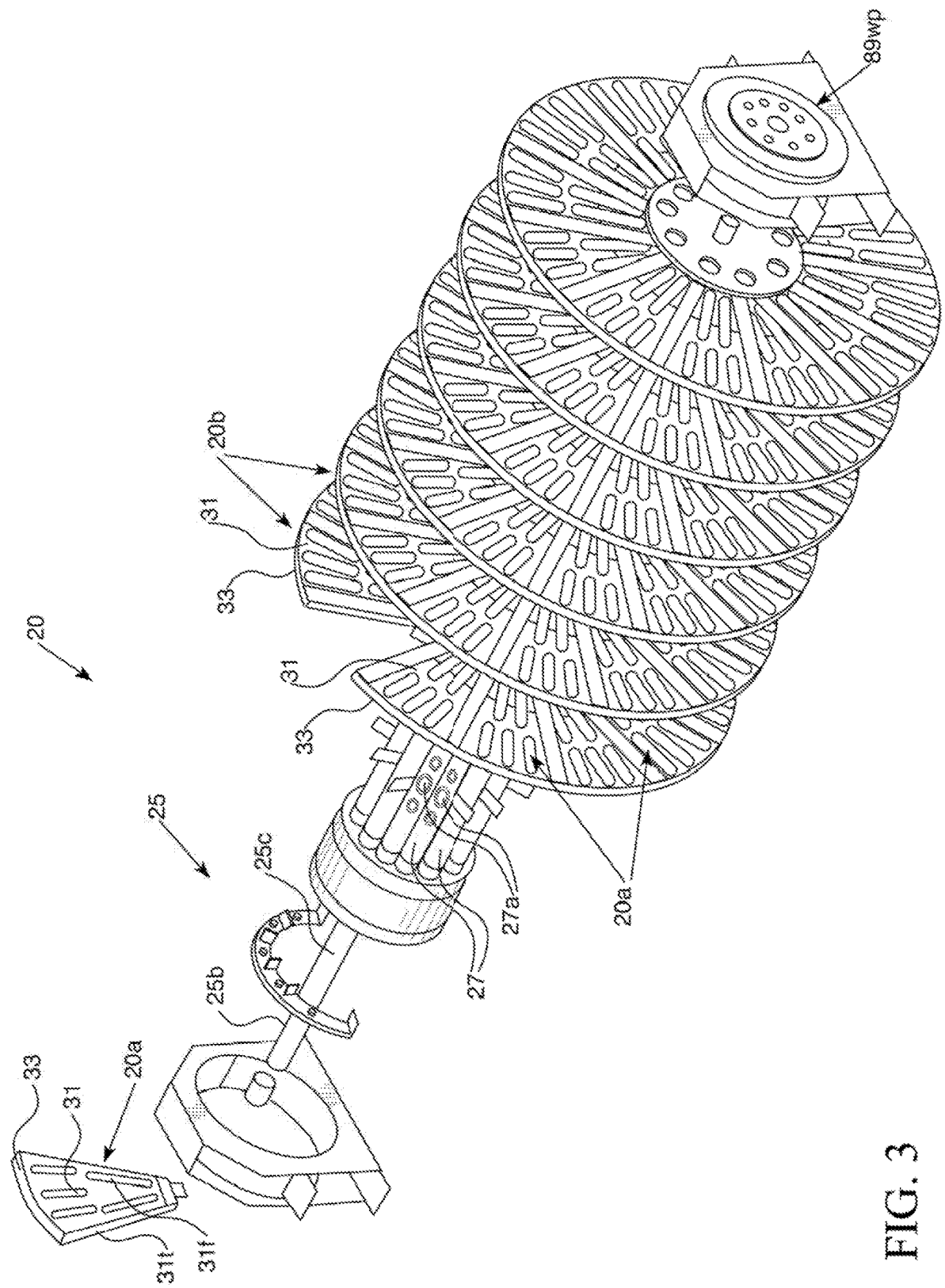
FIG. 3 is an exploded view of the first exemplary embodiment of the filtration device shown in FIG. 2.
Figure 4:
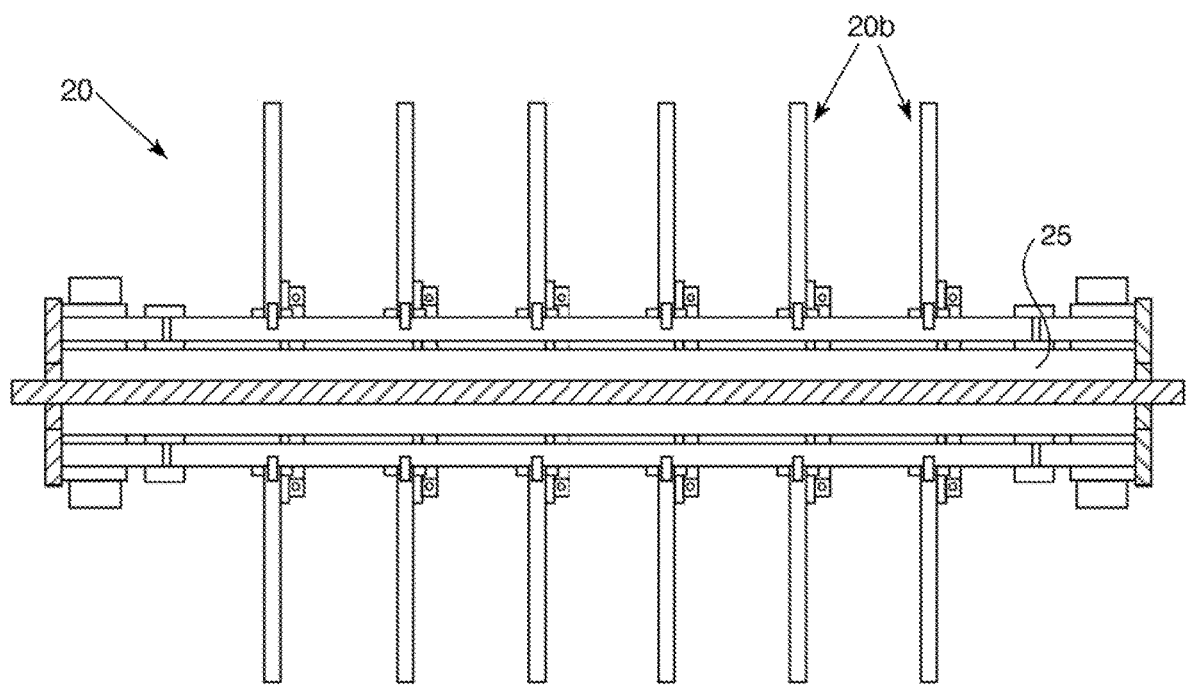
FIG. 4 is a front view of the first exemplary embodiment of the filtration device shown in FIG. 2.
Figure 5:
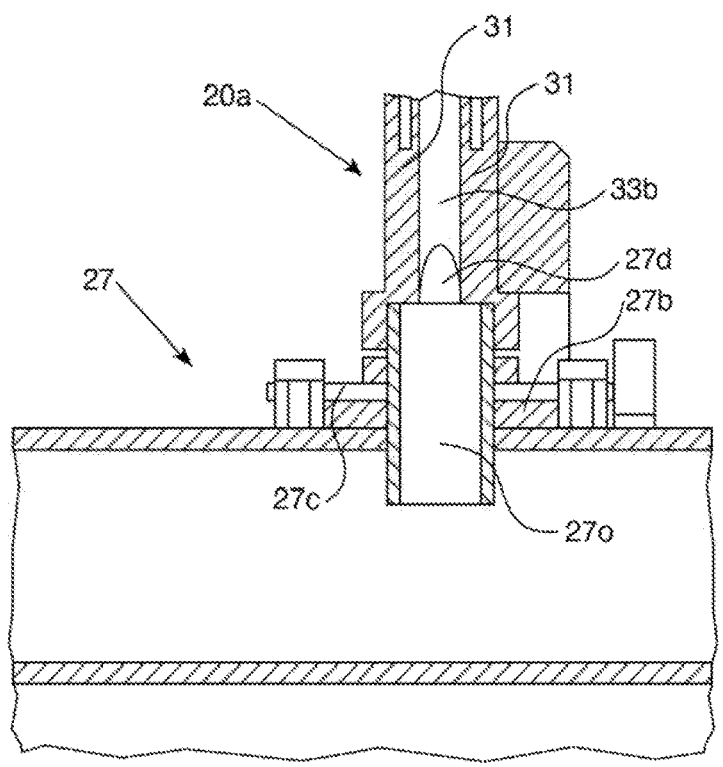
FIG. 5 is an enlarged view of an exemplary connection mechanism for attachment a tube manifold 27 to which a disc sector 20*a* having filter elements 31 of a disc 20*b* are attached shown in FIG. 4.
Figure 6:
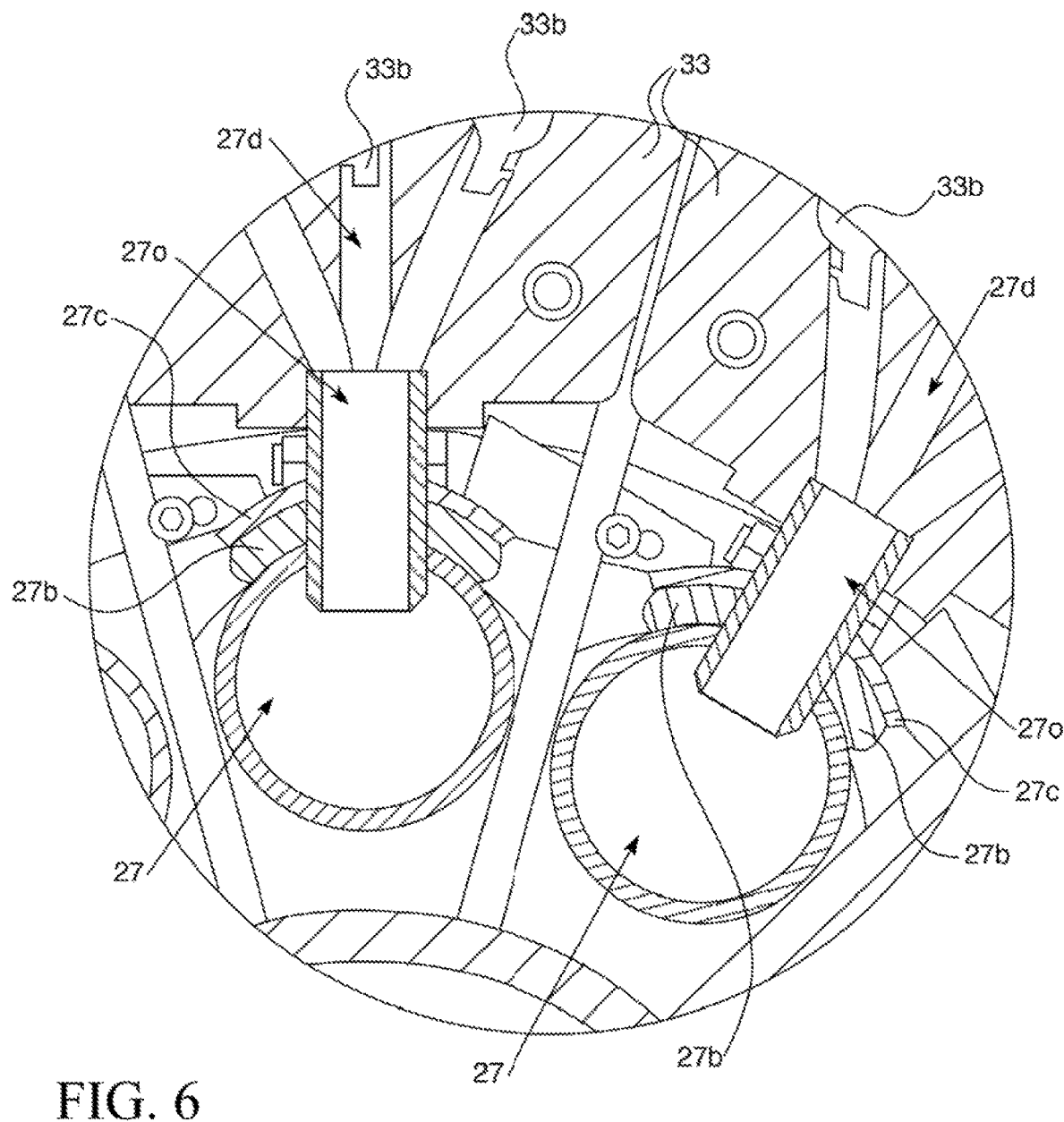
FIG. 6 is a view similar to FIG. 5 that is enlarged to better illustrate the exemplary attachment between disc sectors 20*a* and tube manifolds 27 included in the first exemplary embodiment of the filtration device.
Figure 7:
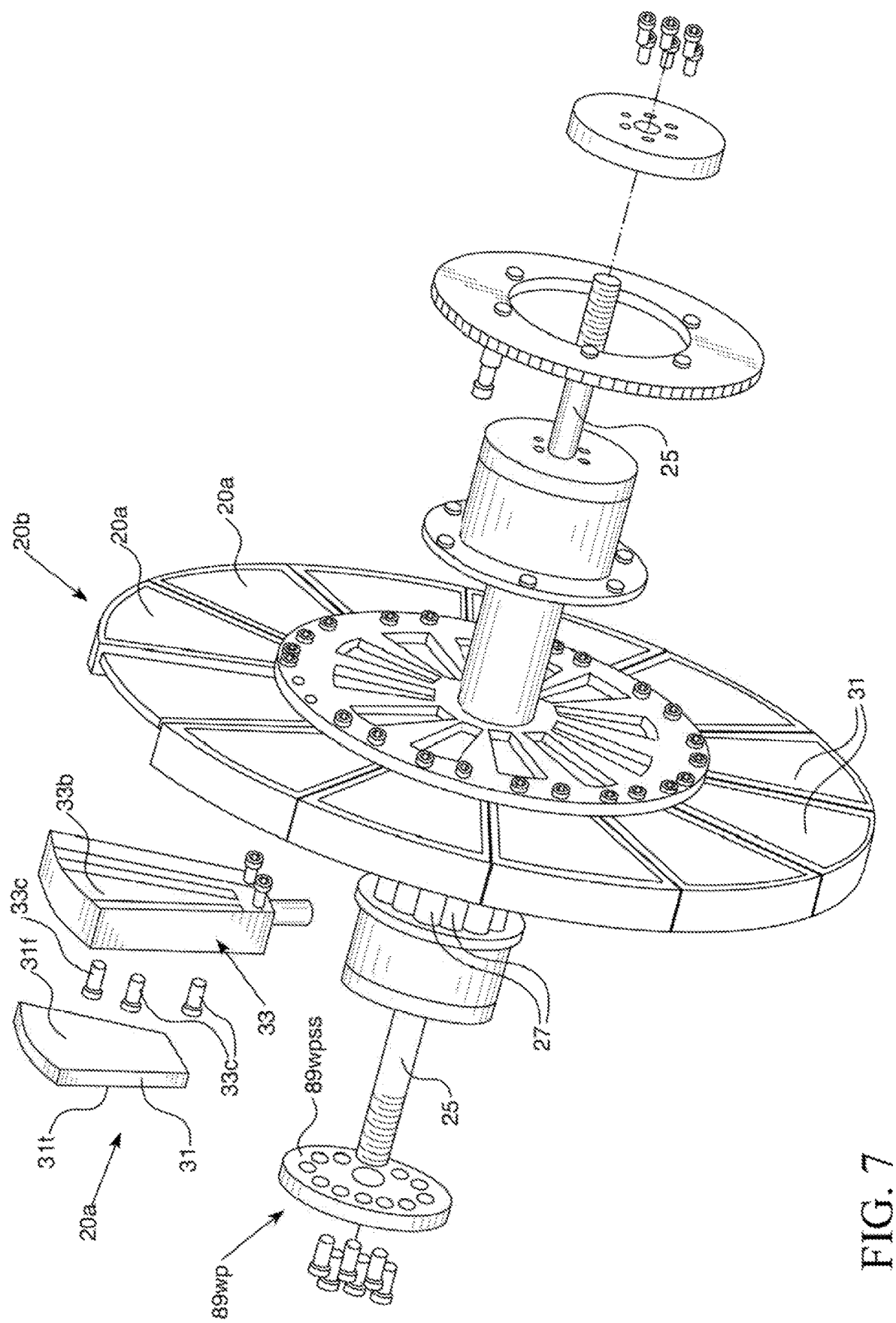
FIG. 7 is an exploded view of a single peripheral array of disc sectors 20*a* connected to respective tube manifolds 27 to form an exemplary disc 20*b* of the first exemplary embodiment of the filtration device.

Referring to FIGS. 1-38, a processing facility can include a filtration system 1. The filtration system 1 can utilize a slurry-based system for recovering minerals or other desired solid particulates (e.g. particular type of rock or ore or a collection of different solid particulates, recovery of filtrate as valuable product, etc.). For example, the solid particulates within the slurry can have base metal concentrates, iron ore, chromite, copper, gold, cobalt, nickel, zinc, lead, pyrite, silver, or and/or other solid material. As another example, the solid particulates can include starch, food product additives, precipitates formed from a chemical process, or be another type of solid material entrained within a fluid that is desired to be removed from the fluid.

In some embodiments, the filtration system 1 can utilize a tank 3 that is positioned to form a slurry or adjust a concentration of solid particulates within the slurry so the slurry has a concentration of solid particulates that is within a pre-scribed range (e.g. a preselected range). In some embodiments, the tank 3 can be configured a process slurry control tank or a slurry control vessel. The slurry from within the tank 3 can be fed via a slurry feed conduit 5 so the slurry is transported from the tank 3 to a mixer unit 7 or a slurry filter tank, which can have at least one mixer unit (e.g. at least one mixer, agitator, stirrer, etc.). The slurry feed conduit 5 can be structured as piping, tubing, or other type of conduit and can include one or more valves or other flow control mechanisms.

The mixer unit 7 can have at least one agitator 7*a* that is moved to stir or otherwise agitate the slurry within the mixer unit 7 for subsequently feeding the slurry to one or more filtration devices 10. The mixer unit 7 can be configured as a mixer or other type of slurry collection and agitation mechanism. In some embodiments, the mixer 7 can have agitators 7*a* that are configured as impellers for stirring the slurry and driving output of the slurry to one or more filtration devices 10. A filtration device feed conduit 9 can be a pipe, tube, or other type of conduit that extends from the mixer unit 7 to the filtration devices for transporting the slurry from the mixer 7 to the filtration device(s) 10. It should be appreciated that the filtration device feed conduit 9 can include valves and have sensors attached thereto or positioned therein.

One or more of the devices of the filtration system 1 can have sensors connected to at least one controller (e.g. a programmable logic controller ("PLC"), etc.) as well as other process control elements. For instance, the slurry feed conduit 5 can have a control valve 5*a* that can be opened and closed to control a rate at which slurry from the tank 3 is fed to the filtration devices 10 via the mixer 7. The control valve 5*a* can be fully opened, partially opened or closed to adjust the rate at which slurry is fed to a slurry bath 14 and/or a density of the slurry that is to be within the slurry bath 14 being fed via the slurry feed conduit 5. The filtration system 1 can also include a specific gravity sensor 5*b* and a flow sensor 5*c* connected to the slurry intake conduit 5 for measuring the flow rate and specific gravity of the slurry to monitor those process variables and control them so the flow rate and specific gravity of the slurry are within a pre-selected specific gravity range and a pre-selected flow rate range. These parameters can be adjusted or otherwise controlled for controlling the slurry level and slurry density within the slurry bath 14. For instance, the pre-selected ranges for flow rate and the slurry specific gravity can be defined by user selected set-points that account for a particular filtration system design, the material to be filtered, and other design criteria and operational criteria. An automated process control system can be connected to the control valve 5*a*, specific gravity sensor 5*b*, and flow sensor 5*c* to monitor and control operations of the filtration system 1. Other filtration system mechanism (e.g. mixer 7, filtration devices 10, mixer output conduit 9, tank 3) can also have one or more sensors and/or valves included therein connected to at least one controller of an automated process control system of the filtration system.

In some embodiments, the filtration system 1 can be configured so it does not utilize a mixer unit 7. For example, some embodiments of the filtration system 1 can connect the tank 3 to a single filtration device or a plurality of filtration devices via a slurry feed conduit 5 that extends from the tank 3 to the filtration device(s) 10. The slurry feed conduit (as well as tank 3 and the filtration device(s) 10) can include at least one valve and one or more sensors connected to at least one controller of an automated process control system of the filtration system 1.

The filtration device(s) 10 of the filtration system 1 can be appreciated from FIGS. 2-22. For example, each filtration device 10 can be configured as a rotary filter having an array 20 of discs 20*b* supported by bearings on a frame 16. In some embodiments, the array 20 of discs 20*b* can be rotatable about a horizontally extending shaft 25 having a first end 25*a*, a second end 25*b*, and an intermediate portion 25*c* between its first and second ends. In some embodiments, the shaft 25 can be an elongated housing or other structure that retains or is attached to a plurality of tube manifolds 27 that are connected to disc sectors 20*a* of the discs 20*b*. A drive mechanism 18 can be attached to a shaft 25 about which the array 20 of discs 20*b* rotates to drive rotation of the shaft 25 to rotate the discs 20*b*. The drive mechanism 18 can include an electric motor, a gear box, or other type of shaft rotating drive device. In some embodiments, the shaft 25 can be a shaft assembly that has the tube manifolds 27 included within the shaft assembly. The shaft assembly can be coupled to the drive mechanism 18 for rotation of the tube manifolds 27.

In other embodiments, the array of discs 20b can be attached to tube manifolds 27 and the tube manifolds 27 can be attached to the drive mechanism 18 for rotation of the tube manifolds 27 to drive rotation of the discs 20b of the array 20 of discs 20b. For example, at least one end of each of the tube manifolds 27 can be attached to a sprocket, gear, pulley, or other rotating member of the drive mechanism 18 via a coupling mechanism so that the drive mechanism 18 can cause rotation of the tube manifolds 27 via a motor or actuator of the drive mechanism 18.

In yet other embodiments, the drive mechanism 18 can be configured so that the drive mechanism is coupled to an end of shaft 25 for rotation of the shaft 25. The shaft 25 can include a plurality of tube manifolds 27 that are arranged around a central inner shaft 25. The shaft 25 can be rotated to drive rotation of the discs 20b and tube manifolds 27. In yet other embodiments, the central inner shaft 25 may not be included and the array of tube manifolds 27 can be attached to a shaft assembly that is rotated via a drive mechanism 18 to cause the discs 20b and tube manifolds 27 to rotate about a horizontally extending rotational axis.

Figure 20:
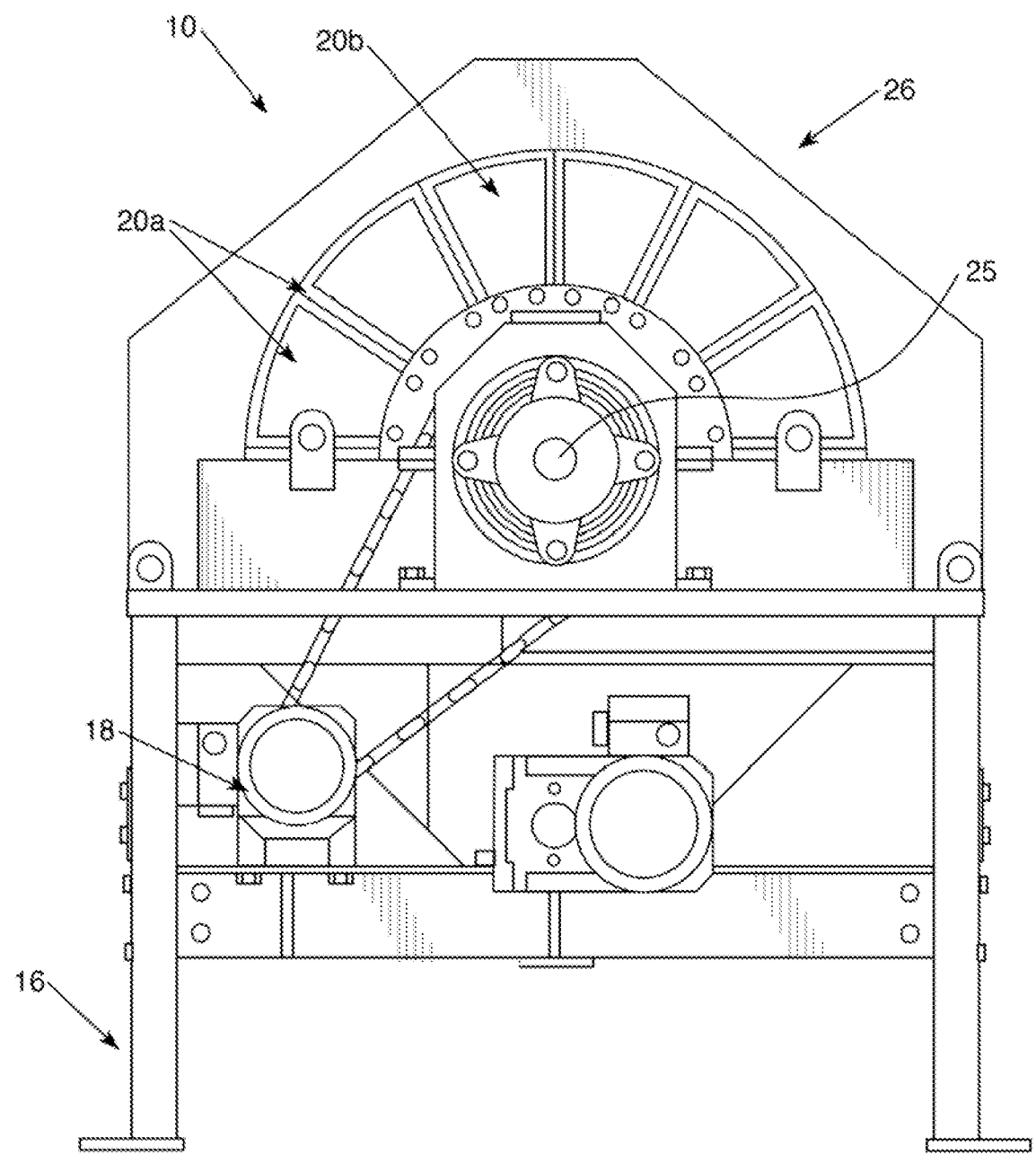
FIG. 20 is an schematic end view of the first exemplary embodiment of the filtration device 10 that illustrates an exemplary hood 26 that can be attached to the frame 16 for enclosing the array 20 of discs 20b and slurry bath 14.
Figure 21:
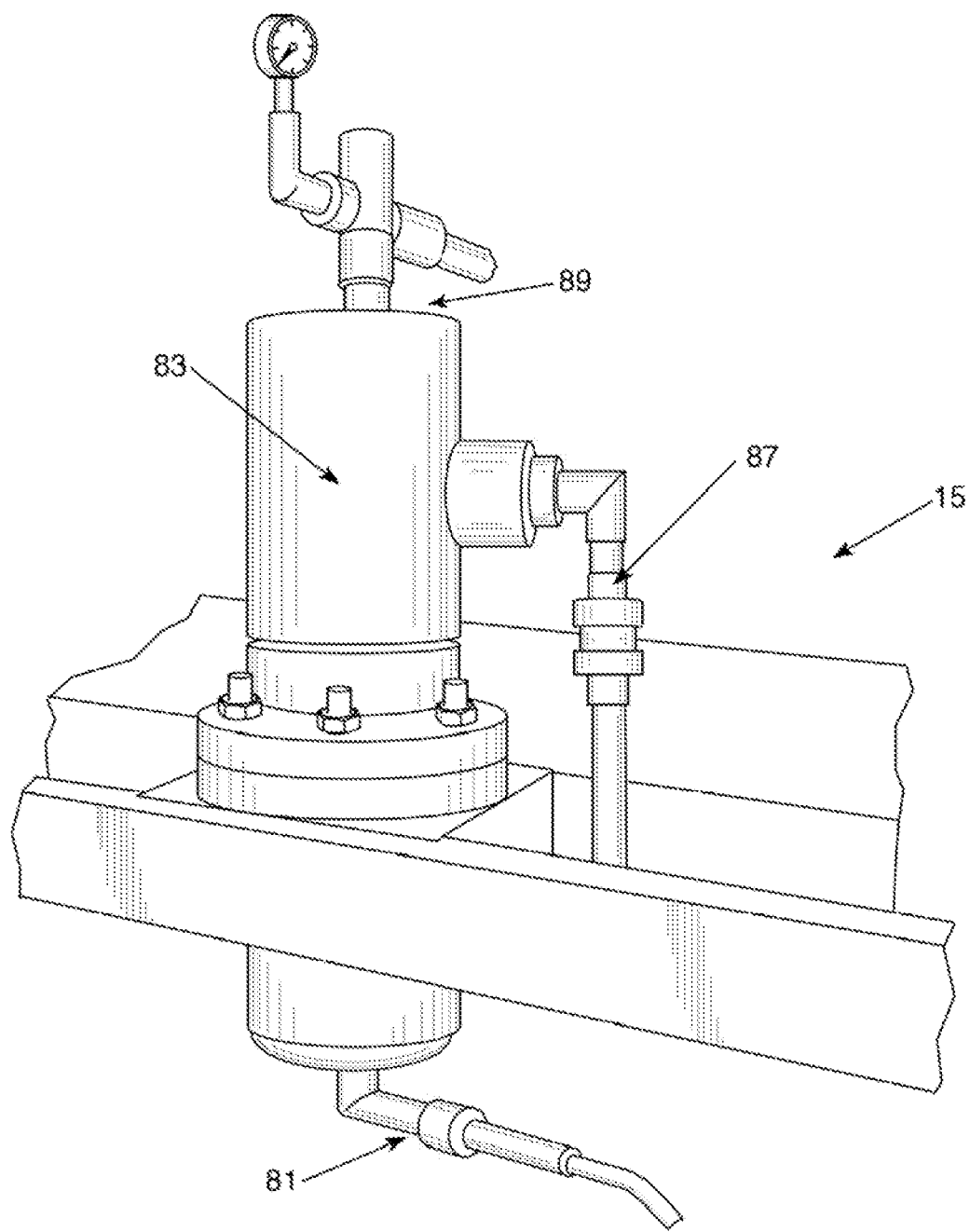
FIG. 21 is a perspective view of the backflow washing mechanism 15 of the first exemplary embodiment of the filtration device.

As may best be appreciated from FIG. 20, the frame 16 can be connected to a hood 26 so that the array 20 of discs 20b is fully enclosed within a housing. The hood 26 can permit the enclosed space in which the array 20 of discs 20b and slurry bath 14 are positioned. This can permit embodiments of the filtration device 10 to be operated at a desired pressure or temperature in the event operations can be improved by operating under a vacuum condition, operating at a pressure that is higher than atmospheric pressure, or operating at a controlled atmosphere. For example, inert gas steam or other gas can be passed into the space within the hood to define a desired atmosphere in which the slurry bath 14 and array of discs 20b are positioned. As another example, the temperature and pressure of the inner space defined by the hood 26 can be maintained within pre-selected temperature and pressure ranges.

The hood 26 can also help avoid contaminant material from a plant environment in which the filtration system 1 is positioned from entering the slurry bath 14 or discs 20b of the array 20. It should be appreciated that some embodiments of the filtration device 10 may not include a hood. Such embodiments may configured as an open system that operates at atmospheric pressure and temperature conditions (though certain flows fed to the array 20 of discs 20b may be at different temperatures or pressures, e.g. a backflow fluid flow 91, etc.).

The frame 16 can also support a slurry overflow tank 12. The slurry overflow tank 12 can be positioned adjacent the slurry bath 14 (e.g. around a periphery of the bath) and can be in fluid communication with the slurry bath 14 to receive overflow of the slurry bath 14 (e.g. a flow of slurry that may rise over the upper edges of the slurry bath 14.

The filtration device 10 can also include a backflow mechanism 15 that includes a backflow reservoir for injecting a flow of fluid onto the filter elements 31 of the array 20 of discs 20b to facilitate cleaning of the filter elements 31. The backflow reservoir may or may not be pressurized.

The array 20 of discs 20b can be configured and positioned so that as the array 20 of discs 20b rotates, filter elements 31 of disc sectors 20a of the filter discs 20b are submerged within a slurry bath 14 adjacent a bottom of the array 20 of discs 20b.

As may best be appreciated from FIGS. 3-9, the array 20 of discs 20b can include a number of separate peripheral discs 20b that each have an array of disc sectors 20a that are attached to define the disc 20b. The disc sectors 20a can include frames 33 that are sized and configured to attach filter elements 31 to the tube manifolds 27. Each of the filter element 31 can be structured as a mesh or web material that has an array of passageways 31a sized to permit the fluid of the slurry (e.g. liquid or gas) to pass through the filter element while also retaining solid particulate material entrained within the slurry on the filter element so that an accumulation of the solid particulates forms a filter cake on the filter element. The filter elements 31 can include ceramic material (e.g. a sintered alumina filter media), a cloth filter material, or a filter element that includes a metal wire mesh body that is at least partially coated on an outer surface with a layer of filtering material 31PCL that includes particulate material cured onto the outer surface of the mesh body via a binder (e.g. a polymeric material, an epoxy, polyurethane, other type of binder as discussed herein, etc.). As may best be appreciated from FIG. 19, the passageways 31a can be defined to include one or more turns or other irregularities as each passageway 31a extends from an first side of the filter element 31 facing toward an inner space 33b within a frame 33 to a second side of the filter element 31 facing outwardly from the frame 33 (e.g. a direction that is opposite to which the first side faces) in fluid communication with holes of the mesh body 31b to define a tortuous path about which liquid and/or gas may move through the body of the filter element 31. Such a configuration of a passageway 31a of a filter element 31 can be considered a pore or other type of fluid pathway defining conduit of the filter element.

The shape and size of the passageways 31a can have a number of configurations for different embodiments. Further, each passageway 31a may be different in size or shape than other passageways 31a. While it is contemplated that the passageways define a tortuous path along which fluid may flow through the filter element 31, it is also possible some embodiments may utilize passageways 31a that have a linearly extending path that do not utilize any turns or do not require the flow of fluid to move in multiple different directions as the fluid passes through the filter element 31.

The filter element 31 can be attached to the sides of the frames 33 via an attachment material 35 (e.g. epoxy, other adhesive, etc.). The attachment material 35 can be positioned so it affixes the peripheral sides of the filter element 31 to walls 33a of the frame 33 (e.g. sidewalls and intermediate portions of the frame that may extend within an inner opening of the frame that is sized for at least one filter element to be positioned therein).

To help facilitate a strong and durable attachment of the filter element 31 to the frames 33, the attachment material 35 can be positioned in the frames 33 so that the attachment material is positioned within keyways 37 defined in the walls 33a and also onto the walls 33 so the attachment material 35 is between the walls 33 and the peripheral edges of the filter element 31. The attachment material 35 can be applied in a liquid form, a paste form, a gel form, or a putty form, and then be subsequently cured so the attachment material 35 is cured within the keyways 37 and also on the peripheral edges of the filter element 31 to form a strong bond to those surfaces for direct attachment of the filter element to the walls via the cured (and hardened) attachment material 35. In some embodiments, the attachment material 35 can be a non-sag high strength epoxy or a viscous adhesive polymer. The keyways 37 can be defined recesses, channels, and/or passageways for receipt of a portion of the attachment material 35 so that the attachment material extends continuously from those keyways to the peripheral edge portions of the filter element 31 once it has cured or solidified.

The keyways 37 can be defined to provide offsets for strengthening internal separating pressures that may act on the filter element 31. The keyways 37 can be defined so that the cured attachment material 35 and the keyway structure help offset and strengthen the filter element attachment laterally for example.

Each frame 33 of a disc sector 20a can be attached a tube manifold 27 passed through a main shaft assembly housing through which shaft 25 can pass (for embodiments that utilize shaft 25). The tube manifolds 27 can be arranged in series about a circumference or perimeter of the shaft 25 or can otherwise be spaced apart from each other and arranged in a circular or elliptical type arrangement. Each tube manifold can be a cylindrical or polygonal shaped elongated member that extends along its length and has end portions 27e at opposite first and second ends. An intermediate portion of the body of the tube manifold 27 can be between the first and second ends of the tube manifold 27. Each tube manifold can define an inner conduit through which fluid is passable.

Each disc 20b can have a separate frame 33 of a disc sector 20a of the disc 20b attached to a respective one of the tube manifolds 27 to align a tube manifold opening 27a with an opening defined in the frame 33 so that fluid can be passed from each tube manifold 27 into an inner opening 33b of the frame 33 between filter elements 31 attached to opposite sides of the frame 33.

For instance, each disc 20b can have a plurality of disc sectors 20a. Each disc sector 20a of each disc 20b can be attached to a respective tube manifold 27. The number of disc sectors 20a that define a disc 20b can be any preselected number of disc sectors 20a. For example, there may be twelve disc sectors 20b arranged in an array about the main shaft assembly housing to define a single disc 20b of the array 20 of discs 20b. Each of these twelve disc sectors 20a may be attached to a respective one of twelve different tube manifolds 27.

As another example, there may be twenty-four, twenty, sixteen, fourteen, ten, eight, six, or four disc sectors arranged in an array about the main shaft assembly housing to define a single disc 20b of the array 20 of discs 20b and each disc sector 20a can be attached to a respective tube manifold (e.g. there may be ten tube manifolds 27 each attached to a respective one of the ten disc sectors 20a, there may be eight tube manifolds 27 each attached to a respective one of the eight disc sectors 20a, etc.). In yet other embodiments, the number of disc sectors 20a arranged to define a disc 20b can be less than four disc sectors 20a or more than three disc sectors 20a. As may best be seen from FIGS. 3-6 and 9, each tube manifold 27 can be attached to a disc sector 20a of a disc 20b for each disc 20b of the array 20 of discs 20b. For embodiments in which discs 20b include 8 disc sectors to form a disc, there may be eight tube manifolds 27, one for each disc sector of each spaced apart disc 20b. As another example, for embodiments in which the discs 20b are comprised of twenty-four, twelve, ten, six, or three disc sectors 20a, there may be twenty-four, twelve, ten, six, or three tube manifolds 27. Each tube manifold 27 can define an internal conduit through which fluid can flow. Each tube manifold can include a an outlet conduit 27o that fluidly connects the conduit of the tube manifold 27 to an inner space 33b defined at least in part by the frame 33 (as well as at least one filter element 31 that can be attached to the frame 33). The outlet conduit 27o can be defined by a pipe segment or other conduit that extends from the main elongated body of the manifold tube 27 to a position within a frame 33 of a disc sector 20a to which the tube manifold 27 is attached.

Such an arrangement can be provided at each outlet opening 27a for each spaced apart disc sector 20a to which the tube manifold 27 is attached so that fluid can be passed from the tube manifold 27 into the frame 33 and/or so that a vacuum can be applied so that fluid can be moved from within the frame 33 to within the tube manifold. It should therefore be understood that each tube manifold 27 can have a number of outlet conduits 27o positioned at openings 27a for passing fluid between an inner space of frames 33 of the disc sectors 20a to which the tube manifold is attached and the main internal fluid conduit defined by the tube manifold 27.

To help provide a strong sealed connection between the tube manifold 27 and the inner space 33b of the frame 33, there can be a seal arrangement provided to help provide a sealed connection between the tube manifold 27 and the frame 33. As may best be seen in FIGS. 5 and 6, such a seal arrangement can include an elastomeric annular gasket 27b positioned around the outlet conduit 27o adjacent the part of the tube manifold to which the frame 33 of a disc sector 20a is attached. The annular gasket 27b can be tightened into close contact with the annular tube member around the pipe or other conduit defining the outlet conduit 27o via a gasket attachment plate 27c. The gasket attachment plate 27c can be an annular plate positioned so that the outlet conduit 27o passes through an inner hole of the gasket attachment plate 27c and inner hole of the annular gasket 27b. The gasket attachment plate 27c can be positioned on top of the gasket 27b and be in contact with the top surface of the gasket 27b. The upper gasket attachment plate 27c can be attached to the body of the tube manifold via one or more fasteners and/or other attachment mechanism to press down on the gasket 27b to reduce the thickness of the gasket 27b to "squish" the gasket to a more narrow thickness (e.g. reduce the thickness of the gasket 27b from a first thickness, or first height, to a second thickness, or second height, that is smaller than the first thickness, or first height). This reduction in thickness can help ensure the resiliency of the gasket provides a resilient engagement that can provide a counteracting force to help strengthen and seal the seam at which the outlet conduit 27o is attached to the tube manifold at the tube manifold opening 27a.

The frame 33 can be attached to the tube manifold 27 via fasteners attached to the body of the tube manifold and/or the gasket attachment plate 27c. Other coupling mechanisms can also be used to attach the frame 33 to the tube manifold. Each disc sector 20a attached to a tube manifold at a respective opening 27a can have such a seal arrangement and coupling arrangement. Each of the tube manifolds 27 can utilize such features.

To help fluid pass between the tube manifold 27 and the frames 33 of the disc sectors 20a to which the tube manifold 27 is attached, at least one nozzle 27d can be attached to the outlet conduit 27o. Each outlet conduit 27o can have at least one nozzle or a plurality of nozzles. In yet other embodiments, there may not be a need for any nozzles.

I have determined that the utilization of seal arrangements at the tube manifold openings 27a/outlet conduit 27o interfaces for each tube manifold 27 can provide a significant improvement to the pressure range at which fluid can be passed from the tube manifold 27 into the inner space 33b of the frames 33 and also the pressure range of a vacuum that can be applied to the inner space 33b via the tube manifolds 27. For example, pressures of well over 1 bar and as much as 10 bar (and more than 10 bar in some contemplated embodiments) can be applied during backflow operations in some embodiments. As another example, a higher vacuum can be applied via a pump or blower connected to the tube manifolds 27 for driving a flow of fluid (or sucking fluid) from the inner spaces 33b through the tube manifolds. The ability to handle such high pressures and/or vacuum conditions can, at least in part, be due to the use of the seal arrangement. The high pressure operations and/or high vacuum operations can also be facilitated by the configuration of embodiments of the backflow mechanism 15, use of stabilizer elements 33c, filter elements 31 having a coating 31PCL, and/or other features of the filtration device as discussed herein.

Each frame 33 of each disc sector 20a can include one or more stabilizer elements 33c positioned within the inner space 33b of the frame 33 between first and second filter elements 31 attached to opposite sides of the frame 33 (e.g. a first filter element 31 attached to a first side of the frame 33 and a second filter element 31 attached to an opposite second side of the frame 33). Each of the stabilizer elements 33c can extend between the filter elements 31 positioned on opposite sides of the frame 33 to enclose the inner space 33b between the frame 33 and the filter elements 31 of the disc sector 20a. Also (or alternatively) the stabilizer elements 33c can extend between opposite sidewalls of the frame 33 so that a portion of each stabilizer element 33c is within the inner space 33b. The stabilizer elements 33c can be, for example, elongated members that extend between filter elements that are positioned within the inner space 33b. The stabilizer elements 33c can be positioned to connect the filter elements 31 of a disc segment 20a together to help improve the rigidity of the filter elements 31 attached to the frame 33 and/or help stabilize the filter elements 31 attached to the frame 33.

For example, the stabilizer elements 33c can be structured as bolts or other type of elongated members that extend between filter elements 31 attached to opposite sides of the same frame 33 to help provide a counteracting force during high pressure backwash cleaning operations and during vacuum operating conditions in which conditions acting on the filter elements 31 can provide additional force that may act to separate the filter elements 31 away from each other and away from the frame 33 to which the filter elements 31 are attached.

Figure 22:
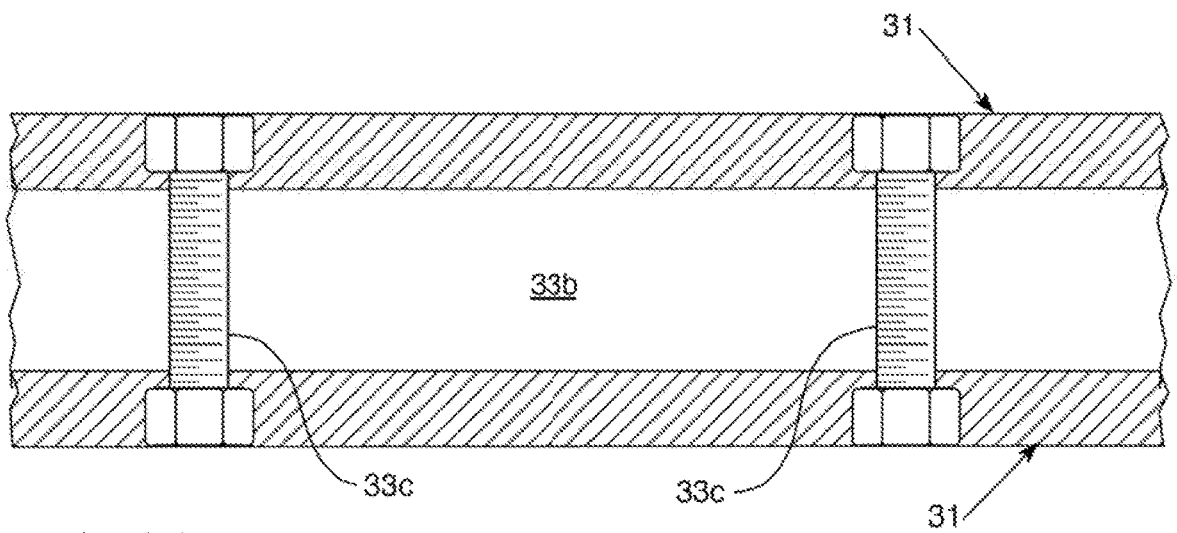
FIG. 22 is a schematic fragmentary view illustrating an exemplary arrangement of stabilizing elements 33c extending between filter elements 31 attached to opposite sides of a frame 33.

FIG. 22 illustrates an exemplary positioning of such stabilizer elements 33c. The stabilizer elements 33c can help counteract such forces by providing a rigid attachment between the filter elements 31 of a disc sector 20a. It should be appreciated that there may be a number of stabilizer elements 33c positioned at different spaced apart spans to extend between the filter elements 31 to provide a pre-selected amount of support for the filter elements 31 to help maintain the attachment of the filter elements 31 to a frame 33 during operations of the filtration device 10.

The discs 20b are shown as being annular disc-like structures (e.g. annular rings). It should be appreciated that the discs 20b can have other shapes (e.g. be an annular polygonal shaped body attached to a rotatable barrel shaft assembly for rotation of the discs 20b, annular shaped hexagonal body, annular shaped oval body, annular shaped octagonal or decagonal body, etc.). The disc sectors 20a are shown in the drawings as being generally triangular sectors of a disc 20b. It should be appreciated that the frames 33 of the disc sectors 20a can have other shapes or configurations to define different shapes of disc sectors 20a to account for the number of disc sectors 20a to be included in a disc 20b and the desired shape of the disc 20b. For instance, the disc sectors 20a can be generally rectangular in shape, generally pentagonal in shape, have an irregular shape having different recessed and projecting portions for mating interlock with other adjacent disc sectors 20a, or have another type of shape to provide a desired interlockable or positionable body that can be located adjacent to other disc sectors 20a to form a disc 20b having a pre-selected size and shape.

Figure 10:
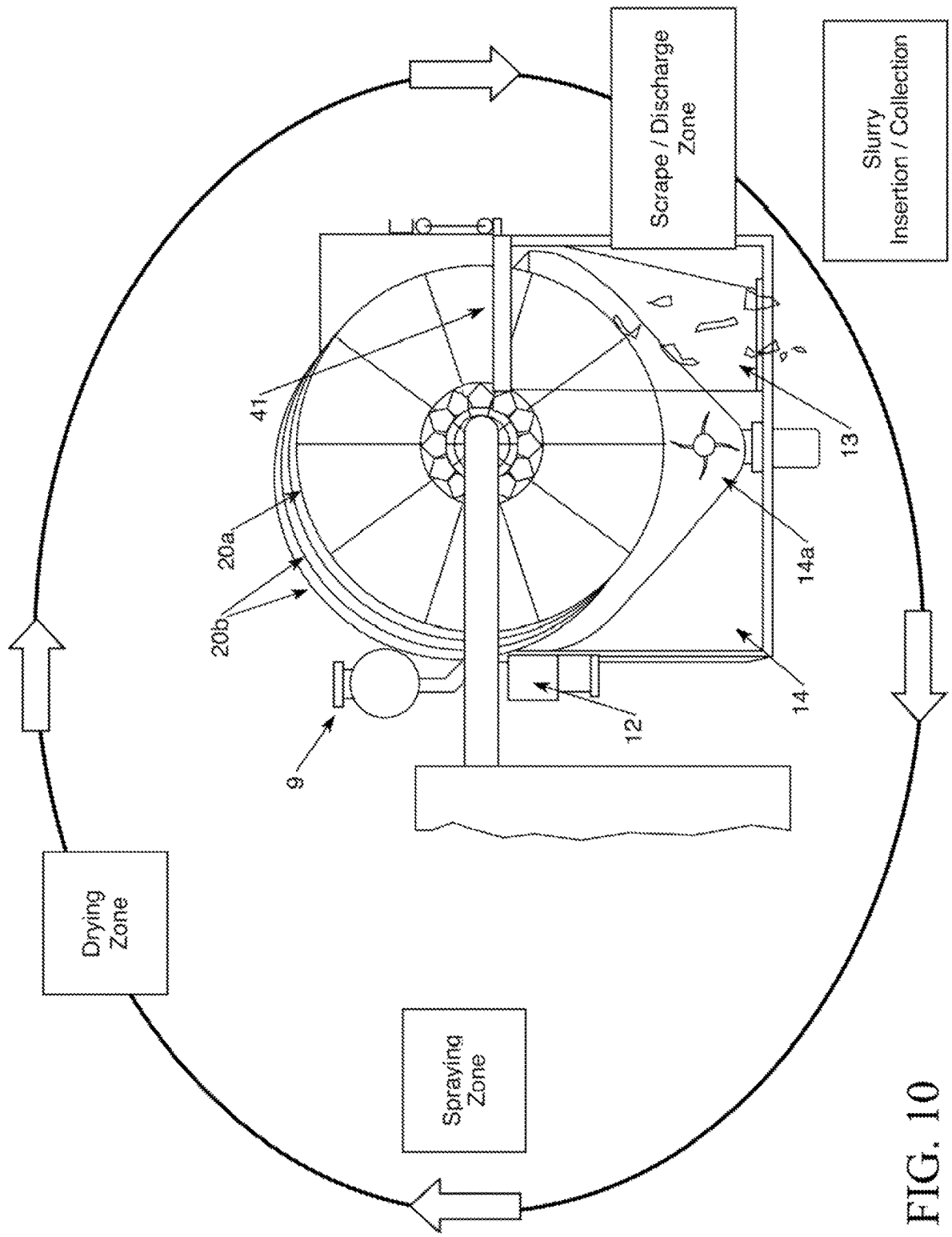
FIG. 10 is a schematic view of the first exemplary embodiment of the filtration device of the first exemplary embodiment of the filtration system that illustrates a first filtration device of the filtration system.

The operation of the filtration device(s) 10 may best be appreciated from FIG. 10. Slurry that can include a liquid having solid particulates entrained therein can be fed from the filtration device feed conduit 9 into the slurry bath 14. An agitator 14a can be positioned in the slurry bath to stir or agitate the slurry within the bath to help keep the solid particulates within the slurry entrained therein to help avoid the solid particulates collecting on the bottom of the bath. The agitator 14a can be structured as an impeller, a sweep mixer, or other type of agitation mechanism.

During operation, the array 20 of discs 20b can be rotated at a pre-selected rotational speed. The pre-selected rotational speed can be in the range of 0.5-10 revolutions per minute (RPM), 1-10 RPM, 0.5-8 RPM, or 1-8 RPM for some embodiments. Many embodiments can operate at a relatively high rotational speed of over 1 RPM, which can provide for a significant increase in operational capacity and efficiency.

The array 20 of discs 20b can be rotated so that the filter discs 20b of the array 20 that have disc sectors 20a are inserted into the liquid slurry of the slurry bath to collect the slurry. About 15°-180° of the 360° rotation of the array 20 of discs 20b can be the extent of the rotation path that involve a disc sector 20a being within the slurry bath 14 for collecting the slurry in a slurry insertion/collection zone or phase of the revolution. For example, some embodiments can be configured so that a disc sector 20a of each disc is within the slurry bath for 15°-45°, 30°-60°, 45°-90°, or 30°-120° of the 360° rotation of the disc sector 20a of the disc 20b for a single revolution of the disc sector 20a of the disc 20b.

It should be appreciated that the extent to which a disc sector 20a is within a slurry bath for the insertion phase can be affected by the height of slurry within the slurry bath 14. Some embodiments of the filtration device 10 can be configured so that the slurry bath has a high overflow position (e.g. the slurry is at a greater height and is closer to the rotational axis of the discs 20b as compared to embodiments having a slurry bath at a lower overflow position). When the slurry bath has a greater height of slurry (e.g. a higher overflow position), the insertion phase may extend for a longer duration of a single revolution as compared to when the slurry bath has a lower height, or a lower overflow position. This can also affect the extent to which a drying phase may be present in a single revolution (e.g. with a higher overflow position, the drying phase may make up a smaller portion of a revolution as compared to embodiments utilizing a slurry bath with a lower overflow position).

As the array 20 of discs 20b continues to rotate in a single revolution after exiting the slurry bath 14, the disc sectors 20a of the discs 20b can pass through a spraying zone (or phase) in which at least one fluid is sprayed onto the disc sectors 20a to facilitate washing, treating, and/or separation of the solid particulates from the fluid of the slurry. The spraying zone or phase of a revolution of the array 20 of discs 20b can be an optional aspect and may not be necessary for operations due to the solid particulates being filtered and the composition of the fluid of the slurry.

After the optional spraying zone or phase of the revolution of the discs 20b (or immediately after the disc sector 20a passes out of the slurry bath 14 when the spraying is not needed or used), the disc sector 20a will undergo a drying zone or phase during a revolution of the discs 20b at which the liquid of the slurry drains from the disc sector and the solid particulates retained by the filter element are dried due to gas flow (e.g. air flow or gas flow within a controlled atmosphere surrounding the discs 20b within a space at least partially defined by a hood 26, etc.) from the speed at which the array 20 of discs 20b rotates (which can be further facilitated by application of a vacuum). The drying phase can range from 30°-330° of the 360° rotation of the discs 20b about the horizontal shaft 25 or a horizontal axis.

The final phase of the revolution that the disc sectors 20a can undergo during a single revolution of the array 20 of discs 20b is the scrape/discharge zone or phase that occurs in a revolution after the drying or dewatering phase. In this final phase, the dried (or mostly dried) filter cake formed on the filter elements 31 of the disc sector 20a is scraped off the filter element(s) 31 and/or otherwise removed from the filter element(s) 31 and distributed to a discharge chute 13 supported on the frame 16 to transport the solid particulates to another processing device that is downstream of the filtration device 10. The scrape/discharge zone or phase of the rotation of the disc sector 20a in a single revolution can be less than 1°, up to 1°, up to 5°, or between 0.25°-5° of the 360° rotation of the disc sector 20a of a disc 20b. In other embodiments, the scrape/discharge zone can be up to 10°, between 1°-10°, up to 15°, up to 20°, or up to 30° of the 360° rotation of the disc sector 20a of a disc 20b that rotates about the horizontal shaft 25 or a horizontal axis. Each disc sector 20a can pass through these phases during a single revolution of the discs 20b of the array 20.

After the scrape/discharge phase, the disc sectors 20a of the discs 20b return to the slurry insertion/collection phase and continue to repeat the cycle of phases as the discs 20b rotate about the shaft 25 for further revolutions. It should be appreciated that for each revolution, a disc sector 20a can go through these phases (slurry/insertion phase, optional spraying phase, drying zone phase, and scrape/discharge phase.

The filtered slurry bath can be drained after filtration operations have proceeded for a predetermined period of time and it is determined that the remaining liquid of the slurry bath is substantially free of particulates. The drained liquid that has had the solid particulates removed can be fed to a filtrate tank or filtrate reservoir for subsequent use or processing of the filtrate formed via the filtration operation. Such a subsequent use of the filtrate within the filtrate tank can be re-use of the filtrate material by feeding that filtrate within the filtrate tank back to the mixer unit 7 or to the tank 3 for use in forming slurry for feeding to the slurry bath 14 in a subsequent filtration operation. Another example of such a reuse of the filtrate can be to feed the filtrate to a liquid tank or reservoir for subsequently being fed to a backwash mechanism 15 for use as a liquid component of a backwash fluid flow to be generated via the backwash mechanism 15.

After the slurry bath 14 is drained and the cleaned filtrate is removed from the slurry bath, a cleaning operation can be performed and then a new feed of slurry can be fed to the slurry bath for subsequent filtration. The cleaning operation can include cleaning operations that utilize the backwash mechanism 15 in combination with an ultrasonic treatment, for example. Different exemplary types of cleaning operations that can be utilized are discussed herein.

The disc sectors 20a can be configured to utilize filter element 31 that can include a mesh body 31b that is formed on the filter element 31 to permit at least one scraper 41 to directly contact the mesh body of the filter element to scrape off the filter cake formed thereon in the scrape/discharge zone or phase of the array 20 of discs 20b revolution cycle discussed herein. For example, the mesh body 31 can be a stainless steel mesh or web body having a plurality of holes defined therein. As another example, the mesh body 31 can be suitable alloy mesh or web body or be a suitable metal mesh or web body. The filter element 31 can also include a polymeric material that can cure onto the mesh or web body 31b that defines a skeleton of the filter element 31 to bond solid particulate material to the skeleton to at least partially encapsulate the mesh or web skeleton of the filter element to define an exterior permeable skin of the filter element 31. This formed fluid permeable skin, or coating 31PCL can be formed to define a plurality of passageways 31a that can facilitate the draining of fluid of the slurry while also retaining solid particulate material within the slurry on or in the filter element. The metal skeleton of the body 31b of the filter element can improve the toughness and strength of the filter element 31 so that it can withstand direct contact with a scraper 41 for scraping off a filter cake formed on the filter element via the formed coating 31PCL and mesh body 31b for directing the solid particulate material of the filter cake to a discharge chute 13 for transport to another processing unit of a plant. For example, a conduit connected to the discharge chute can extend from the discharge chute 13 to another processing unit of a plant or to a hopper so that the particulate material of the filter cake can be used in another process (e.g. undergo refinement, etc.).

Figure 11:
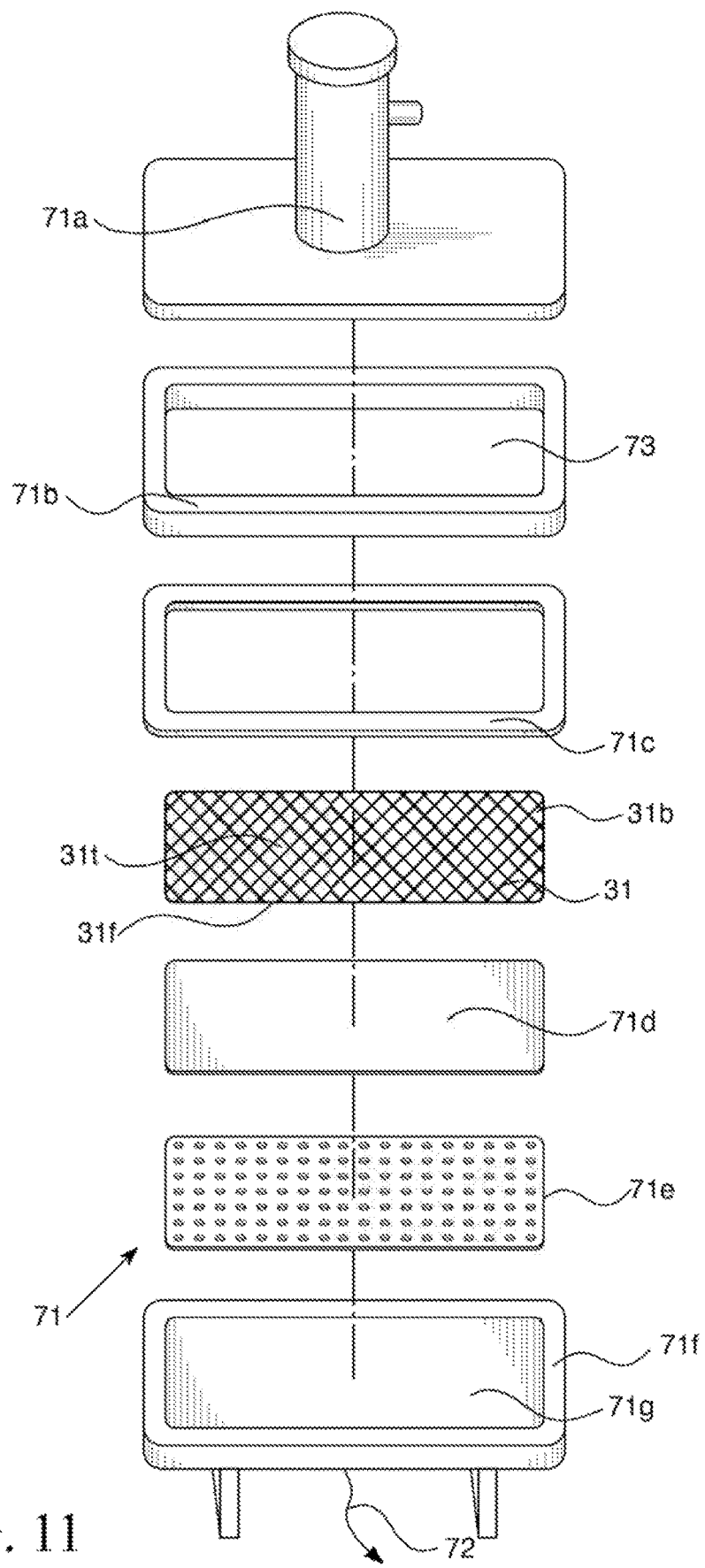
FIG. 11 is an exploded view of an exemplary apparatus for forming an exemplary filter element of the disc sectors that can be configured to permit a scraper to directly contact the filter element to scrape a filter cake formed on the filter element off of the filter element during operation of the first exemplary embodiment of the filtration device.

FIG. 11 illustrates an exemplary system and method for making the filter element 31 having a filtration coating. A filter element 31 having a mesh body 31b (which can also be referred to as a webbed body) having a plurality of passageways 31a defined therein can be inserted into a mold for having the coating formed on at least a portion of the exterior surface of the mesh body. In some embodiments, the mesh body 31b can be a metal mesh, a metal wire mesh, a stainless steel mesh, or other type of mesh material. The mesh body 31b defines a plurality of holes therein.

In some embodiments, the coating 31PCL that can be formed on at least a portion of the mesh body 31b can define a skin that is formed onto the entire peripheral outer surface of the skeleton of the filter element defined by the mesh body 31b to cover the entire external surface of the filter element 31 while still allowing passageways 31a to be defined in the body of the filter element 31 having the formed coating, or covering.

As another example, some embodiments can utilize a filtration coating that is formed only on a top side 31t of the mesh body so that a top coating is provided on at least a portion of the top side 31t of the mesh body or only on a bottom side 31f of the mesh body 31b so that a coating is provided on at least a portion of the bottom side 31f of the mesh body 31b. Such a coating or can be formed to define an innermost face of the filter element or an outermost face of the filter element 31 to be attached to a frame 33 of a disc sector 20a. The coating can be a layer that provides a partial covering or coating of a substantial portion of the top side 31t or bottom side 31f of the mesh body (e.g. over 50%, over 75% or over 90% of the surface area of the mesh body's top side 31t or bottom side 31f). For example, the peripheral edge regions of the top side 31t may not have the coating formed thereon in such embodiments as those peripheral edge regions may be attached to the sides of the frame 33 via one or more attachment mechanisms as discussed herein. As another example, it is contemplated that some relatively small portions of the top side 31t or bottom side 31f of the mesh body may not be fully covered by the coating after a molding operation due to binder material not fully bonding particulate material to the entirety of the side of the mesh body 31b during a molding operation (e.g. there may be some regions of the formed coating that has holes in which the mesh body 31b skeleton on the top side 31t or bottom side 31f is exposed).

Figure 28:
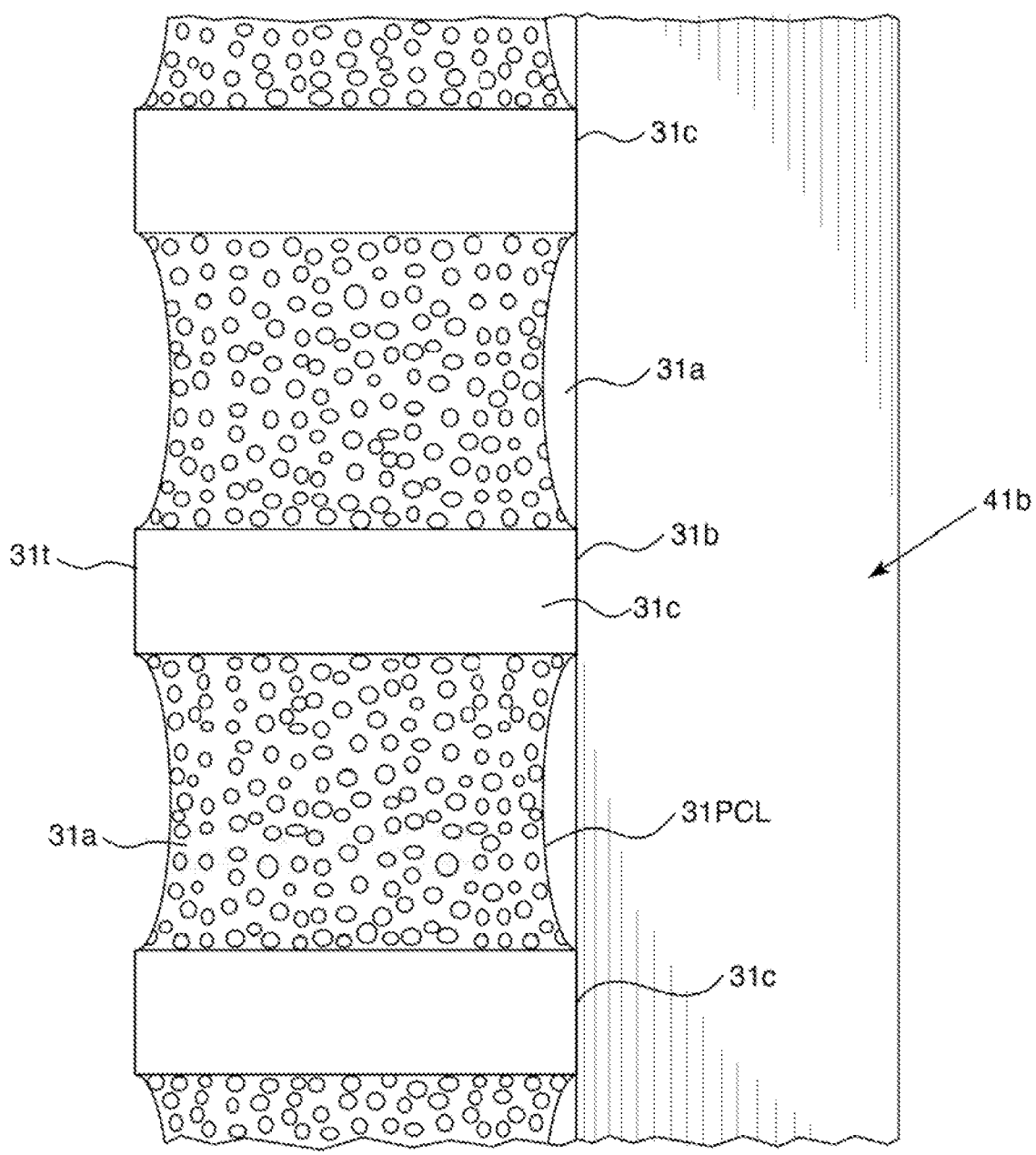
FIG. 28 is a schematic illustration showing an exemplary filter element positioned on a side of a frame 33 of a disc sector 20a for contact with a scraper member 41b in which the coating 31PCL partially covers a mesh body 31b of the filter element 31.

FIG. 28 illustrates one example of a partial coating 31PCL formed on the mesh body 31b. The coating can cover the inner portion of the mesh body 31b around holes defined in the mesh body 31b while not being present at distal outermost faces or sides 31c of the mesh body 31b. For example, the partial coating 31PCL can be formed on the portion of the mesh body 31b that extend between its top and bottom surfaces, or sides 31t and 31f. A scraper member 41b may directly contact the mesh body 31b of the filter element at the distal outermost face or side 31c while the coating 31PCL covers regions of the mesh body around holes in the mesh body 31b to define tortuous passageways 31a within the formed filter element 31.

Figure 8:
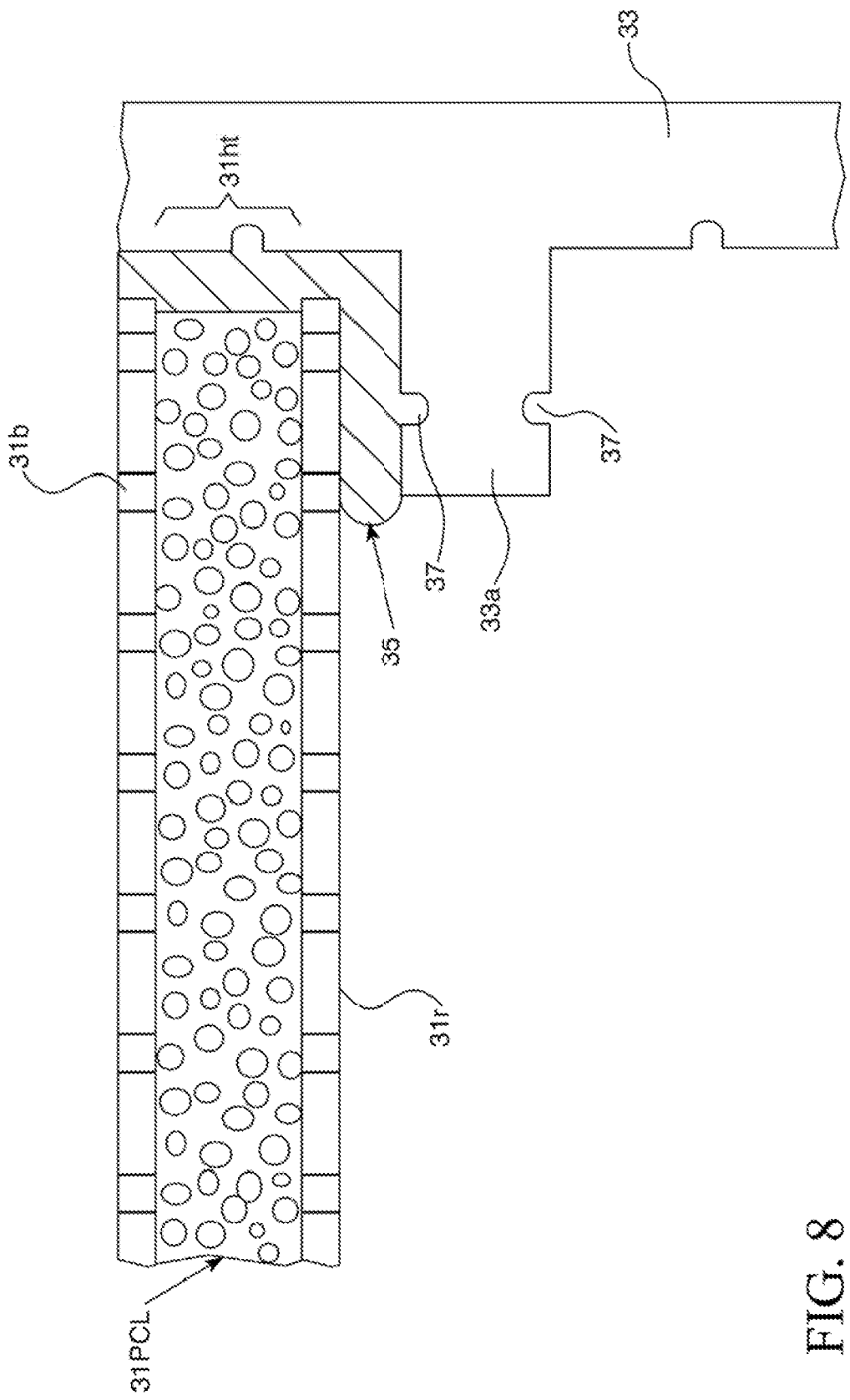
FIG. 8 is a schematic view of an exemplary attachment between a filter element 31 and a frame 33 of the exemplary disc sector 20*a* of the first exemplary embodiment disc 20*b* of the filtration device shown in FIG. 7.
Figure 9:
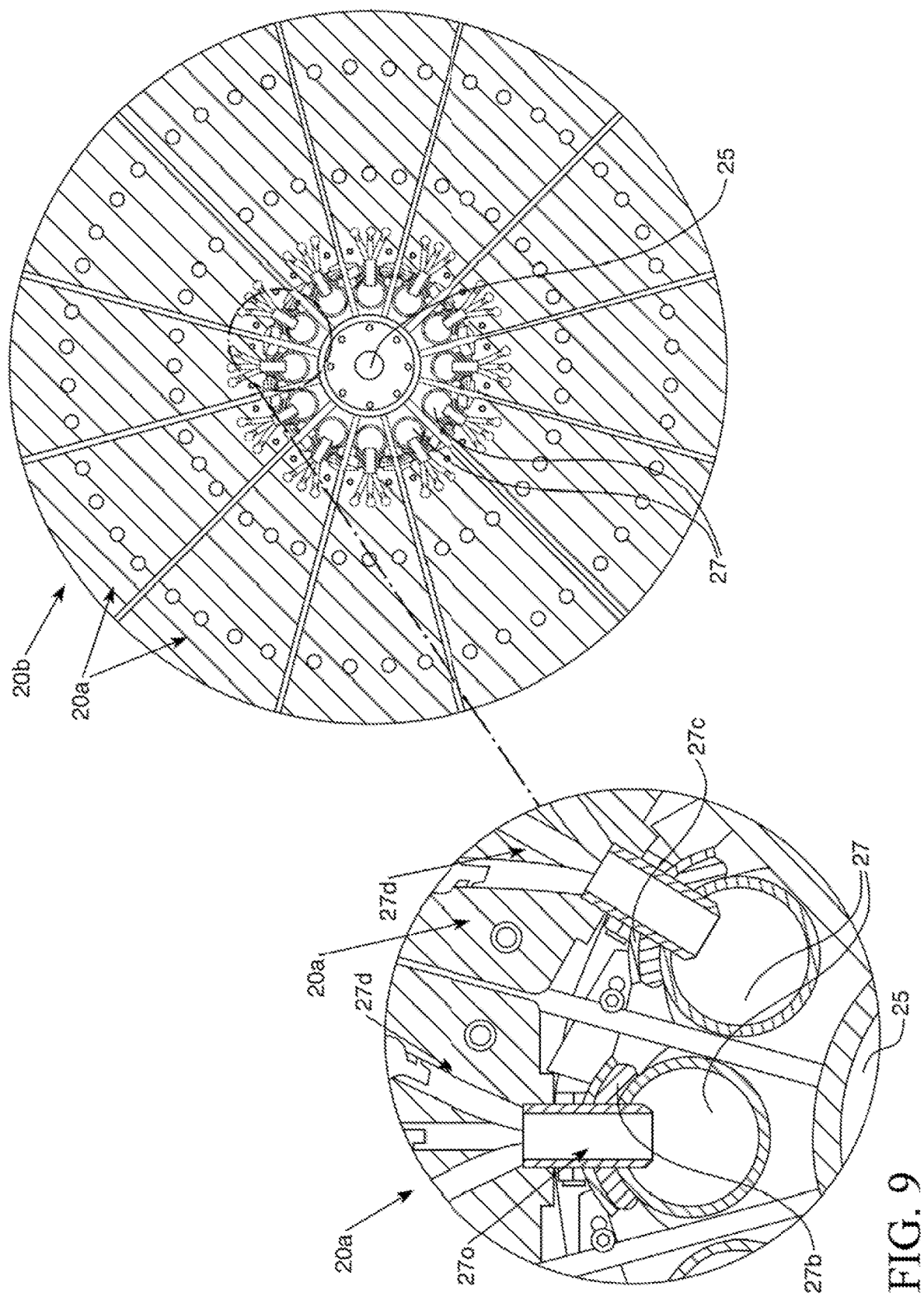
FIG. 9 is a front view of the single peripheral array of disc sectors 20*a* connected to form the exemplary disc 20*b* shown in FIG. 7 having an enlarged view of exemplary connections the disc sector frames have to the rotatable axial shaft assembly that includes a plurality of tube manifolds 27.
Figure 26:
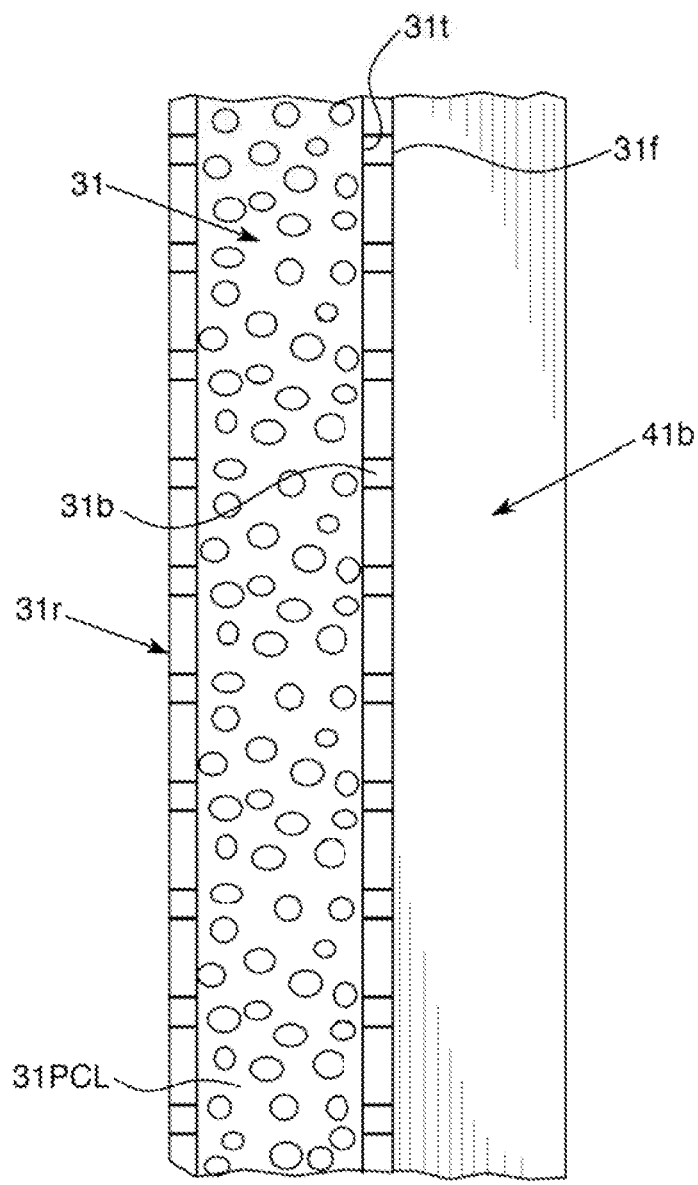
FIG. 26 is a fragmentary schematic view of an exemplary embodiment of a scraper member 41b contacting the mesh body 31b of an outer side of a filter element 31 attached to a frame for cake filter removal.
Figure 27:
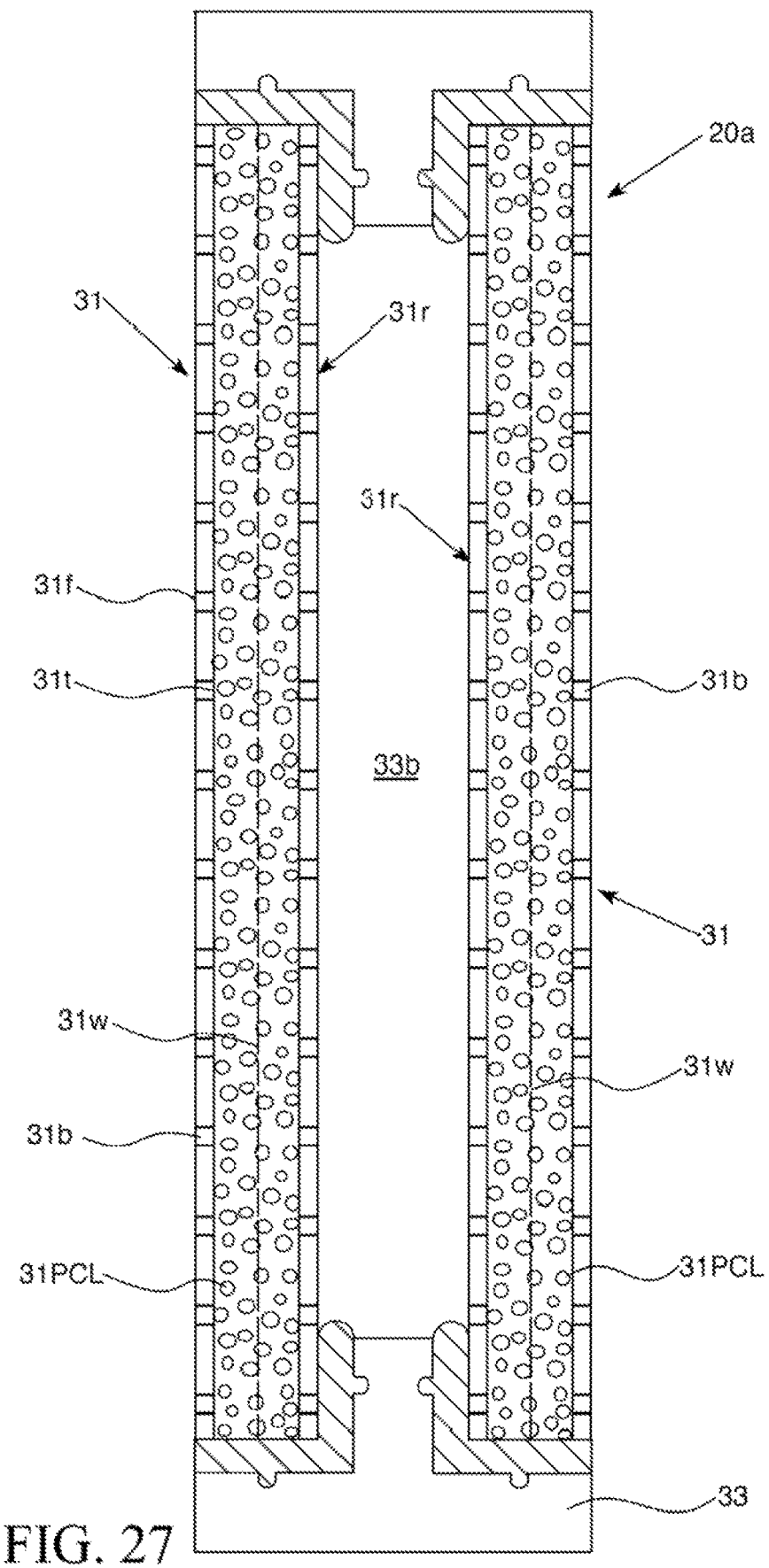
FIG. 27 is a schematic illustration showing an exemplary embodiment of filter elements 31 attached to a frame 33 to define an inner space 33b in which the exemplary filter elements include an intermediate filter media component 31w.

In some embodiments, the top side 31t having the coating layer 31PCL formed thereon can be configured to be an inner side of a filter element that faces inwardly toward the inner space 33b of a frame to which the filter element is attached as shown in FIGS. 26 and 27, for example. In such embodiments, the distal end(s) 41a of scraper member(s) 41b can contact the mesh body 31b of the filter element 31 directly (e.g. at bottom side 31f) for scraping filter cake formed thereon. In other embodiments, the top side 31t can be the outer side of the filter element 31 when it is attached to the frame so that the top side having the coating 31PCL faces away from the inner space 33b as indicated in FIG. 8, for example. In such embodiments, the distal end 41a of a scraper member 41b can contact the coating 31PCL directly.

The mold mechanism 71 that can be utilized to form the coating, or an outer skin, on the filter element 31 can include a die 71a that can be configured to facilitate the application of heat and pressure to the material within a mold. The mold mechanism 71 can also include an annular mold body 71b that defines a central opening 73 in which the filter element 31 can be positioned. An annular seal 71c, such as an elastomeric ring-type seal (e.g. o-ring or polygonaly shaped annular elastomeric gasket, etc.) can be positioned between the filter element 31 and the bottom of the sidewalls of the mold body 71b that define the central opening 73. The top of the filter element mesh body 31b can face toward the seal body 71b, the mold body 71b and the die 71a and have its peripheral edges contact the seal body or be adjacent the seal body 71b and sidewalls of the die 71a within the central opening 73. The bottom of the filter element mesh body that is opposite its top can be positioned on a septum 71d so that the filter element 31 is between the septum 71d and the die 71a. The filter element 31 can have a mesh body that includes or is a wire mesh body (e.g. a metal body having holes that can be in fluid communication with and/or a portion of passageways 31a to be defined in the filter element 31).

The body of the septum 71d can be configured to have permeability to the matrix material so that the matrix material can be inserted into the mold body 71b with the mesh body 31b for forming the coating or covering on the filter element 31. The body of the septum 71d can be composed of materials to account for the particular coating or covering matrix material (e.g. particulate material mixed with polymeric material) to provide a bottom of the mold that can facilitate the formation of the coating or covering that fully encapsulates, substantially encapsulates the entire exterior surface of the mesh body 31b on at least one side of the mesh body 31b (e.g. a top side 31t and/or a bottom side 31f) while also being permeable to allow excess matrix material (e.g. liquefied matrix material or a liquefied polymeric component of the matrix material) to pass out of the mold through the septum when the die 71a is engaged to apply heat and pressure to the mold (e.g. heated gas fed into the mold enclosed via die 71a to apply heat and pressure, etc.).

The mold mechanism 71 can also include a release plate 71e that can have a polymeric coating to facilitate a release of the filter element 31 after the molding operation is over to facilitate the filter element 31 having the coating formed thereon removed from the mold body 71b and septum. The release plate 71e can be positioned so that the septum 71d is between the body 31b of the filter element 31 and the release plate during molding operations that occur when the die 71a applies heat and pressure to the filter element and matrix material inserted into the central opening 73 of the mold body 71b. The release plate 71e can have holes to facilitate the draining of viscous matrix material that may pass out of the septum during molding operations. The release plate 71e can be positioned on a stand 71f The stand can include legs or otherwise be configured to permit excess matrix material that may pass out of the central opening 73 during mold operations to drain for disposal and/or re-use.

The release plate 71e can be a one-time operational element that can need to be replaced with a new release plate after a molding operation. In some embodiments, the release plate's material composition, rigidity, and/or thickness/height can impact the thickness or height 31ht of a layer 31PCL formed on the top side 31t of the mesh body 31b of the filter element. For example, a release plate that is of a softer material can facilitate formation of a layer on at least a substantial portion of the top side 31t of the mesh body 31b that is larger in thickness or height on the top side 31t as compared to a layer formed in a molding operation in which a release plate 71e is made of a more rigid material. In addition to the release plate rigidity, the pressure applied during curing can also affect the thickness or height 31ht of the formed layer 31PCL.

The mold mechanism 71 can be operated by having a body 31b of a filter element 31 positioned in the mold mechanism 71 so it is within the central opening 73 between the seal body 71c and the septum 71d (and also between the mold body 71b and the septum 71d. The matrix material can be inserted into the central opening 73 and may also be shaken or vibrated to level the matrix material within the mold body 71b. In embodiments in which a reinforcing member 31r have a webbed body (e.g. a metal mesh body, a wire mesh body, a stainless steel wire mesh body that may be less thick then the mesh body 31b) is to be included, the reinforcing member 31r having a mesh or webbed body can be positioned on top of the leveled matrix material within the mold body 71b. The die 71a can then be engaged to apply heat and pressure into the opening 73 for heating the matrix material for bonding a portion of the matrix material onto the exterior surface of the body 31b of the filter element 31 to cover the filter element 31 while still allowing passageways 31a to be defined in the covered filter element. When the reinforcing member 31r is present, it may also be bonded to the top of the matrix material via the curing of the matrix material within the mold body 71b.

The die 71a can be configured to apply heat and pressure via inserting hot gas (e.g. heated air) into the opening 73 while the opening 73 is enclosed via the die 71a so that the heated air is passed through the mold body 71b and filter element 31 under pressure. The passage of the hot compressed gas (e.g. heated air, heated nitrogen, heated mixture of gases, etc.) that is passed through the opening 73 can push viscous matrix material (e.g. polymeric material) through the passageways 31a of the filter element so that the matrix material can coat the entirety of the body 31b of the filter element 31 or a portion of the body 31b while an excess portion of the matrix material that is driven through the passageways 31a passes out of the permeable septum 71d and release plate 71e for draining under the stand 71f that can occur as the matrix material is cured for bonding onto the body 31b to form the at least partially encapsulating skin on the skeleton defined by the mesh body 31b of the filter element 31. The drained flow 72 of the matrix material that is pushed out of the passageways 31a of the filter element 31 and passed out of the stand 71f can be collected for recycling and reusing the matrix material in a subsequent molding operation. Alternatively, this excess material can be disposed of (e.g thrown away as waste, consumed in some other way, etc.).

A viscosity level for the matrix material or at least the polymeric component of the matrix material in some embodiments can range from 100 to 30,000 centipoise (cps)+/−1,500 cps. The matrix material can be specially formulated to account for the particular operational parameters (slurry composition to be filtered, etc.).

For example, the matrix material used to provide the coating or encapsulating skin of the filter body 31b for the filter element 31 can be a polymeric material or a polymeric material mixed with other materials. The matrix material can be configured to provide a hydrophobic coating or a hydrophilic coating on at least a substantial portion of the top side 31t of the mesh body 31b. The matrix material can alternatively be configured to provide a mix of hydrophobic and hydrophilic properties for the coating formed on at least a substantial portion of the top side 31t of the mesh body 31b of the filter element 31. Or the matrix material can be configured to provide a coating 31PCL that includes a combination of hydrophobic and hydrophilic particulates that define at least a partial coating on the top side 31t that defines a layer of particulate materials bound to the top side 31t of the mesh body 31b that have a mixture of hydrophobic and hydrophilic properties due to the use of the mix of particulates bound onto the mesh body 31b to form the coating layer 31PCL on at least a substantial portion of the top side 31t of the mesh body 31b. When the reinforcing member 31r is also utilized, the coating layer 31PCL can be positioned between the mesh body 31b and the reinforcing member 31r and the coating layer 31PCL can be bonded to both the mesh body 31b and the reinforcing member 31r at opposite first and second sides of the coating layer 31PCL.

Some examples of the matrix material can include a blend of silica mixed with a polymer resin. In some embodiments, the matrix material can include silica grade 10 micron, silica grade 3 micron, and a polymeric resin. For instance, in some embodiments, the matrix material can be a blend of 10 micron silica grade mixed at a ratio of 2-3 with 3 micron silica. This mixture of silica can then be mixed with polymeric resin to form the matrix material. The polymeric resin can be a suitable polymer in the viscosity range of 100 to 25,000 cps depending on the desired result. For example, one exemplary recipe for the matrix material can be a mixture of two parts—one part being glass and the other part being a 600 cps mixed epoxy, urethane, polyester, or vinyl resin. As yet another example, the matrix material can include a mixture of recycled and graded glass mixed with an equal amount of the 600 cps polymeric material having a viscosity of 600 cps that is inserted into the mold with the mesh body 31b for being heated with gas pressure so that the matrix material is cured and bonded onto the mesh body for adhering the solid particulate material to the mesh body 31b to form a coating 31PCL on at least one side of the mesh body 31b (e.g. on at least a significant portion of the top side 31t of the mesh body or at least on a significant portion of the bottom side 31f of the mesh body 31b).

It should be appreciated that the matrix material can be a mixture having a number of different constituents. For instance, particulate materials including varying grades and sized of silica, varying grades and sizes of perlite, recycled and graded glass, varying grades and sizes of glass particulates or glass beads, and/or varying grades and sizes of diatomaceous earth (also known as "D.E." or diatomite). At least one of the particulate materials can be mixed with one or more polymers to form the matrix material.

The polymeric material of the mixture can be in a pelletized form or other solid form (e.g. powder, etc.). The polymeric material can alternatively be in liquid form. The polymeric material can include a PE material, a polyurethane material, a urethane material, an epoxy material, a vinyl resin or other vinyl material. The polymeric material and the solid particulates can mixed together before the mixture is inserted into the mold for curing and bonding to the mesh body 31b. In some embodiments, it is contemplated that the solid particulates and polymeric material can be inserted into the mold for subsequent curing and bonding without being pre-mixed.

The matrix material can be provided so the polymeric material of the mixture or the entire mixture has a viscosity during molding operations (e.g. melt and pre-curing phase of the molding operation) that is at a pre-selected viscosity level. The viscosity level can be selected to ensure the matrix material can be passed through holes of the mesh body 31b while still having a portion of the matrix material remain in matrix within the mold body to cure on the mesh body 31b so that tortuous passageways 31a are defined in the formed filter element 31 having the skin of solid particulates 31PCL encapsulated thereon or bonded thereon. The formation of the tortuous passageways 31a can be configured so that the filter element 31 that is formed defines the passageways 31a so that the formed coating is formed on the mesh body 31b while also still defining passageways 31a of a pre-selected size or pre-determined size and configuration for facilitating the separation of solid particulates from a fluid of a slurry. The formation of the coating 31PCL can be such that the mesh body 31b is positioned on a side or face of the filter element 31 so that a scraper can directly contact the relatively strong mesh body 31b for filter cake separation while the coating 31PCL can facilitate filtration functionality of the filter element for separation of solid particulates from a fluid of the slurry to form the filter cake.

In some embodiments, the molding operation for formation of the filter elements 31 having the filtration coating, or filtration skin formed thereon can include inserting the mesh body and matrix material into the mold and subsequently applying heated gas (e.g. hot air) at a temperature of 120° F.-200° F. and at a pressure of 100-150 psi (689 kPa-1,034 kPa) to the mold to bond and cure the mixture onto the mesh body 31b and force excess curable polymeric material of the mixture away from the mesh body via the septum 71d. The heated gas (e.g. heated air) can be continued to be applied to the mold at these temperature and pressure ranges for a curing time of 20-30 minutes to force excess curable polymeric material from the mesh body 31b. Thereafter, the filter element body having the cured matrix material bonded thereon can be removed from the mold and allowed to cool at room temperature to complete the curing of the coating, or at least partially encapsulating skin. The cooling at room temperature can take 1-2 hours for a full cure in some embodiments.

The curing time can be 20-30 minutes, longer than 30 minutes, or less than 20 minutes in some molding operations. Often, a shorter curing time (e.g. 20 minutes or less than 20 minutes) can form a filtration layer of the coating 31PCL that is less permeable than a layer formed from a longer curing time (e.g. 30 minutes or 25 minutes, etc.). The filtration layer of the coating 31PCL formed via the shorter curing time tends to be less hydrophilic than a layer formed via the longer curing time.

It should be appreciated that the filter covering, filter coating, or filter skin formed on the mesh body 31b can be a layer of particulates that is bound to at least a substantial portion of the top side 31t of the mesh body (e.g. at least 50%, 50-90%, at least 75%, or at least 90% of the surface area of the top side 31t of the mesh body 31b). The particulates can be bound to the mesh body 31b via the polymeric material being cured onto the mesh body 31b via the molding operation in which heated and pressurized gas is passed into the mold as discussed herein. The particulates or mix of particulates used to form the coating on at least a substantial portion of the top side 31t of the body 31b can have a significant impact on the hydrophobic, hydrophilic, or mixture of hydrophobic and hydrophilic properties.

The polymeric material can function as a binder in the molding operation for forming the filtration layer of particulate materials that defines the coating on at least a portion of the top side 31t of the mesh body 31b and a portion of this binder material may exit the mold during a molding operation. As the particulate material of the matrix material can often form a substantial portion of the formed layer on at least the top side 31t of the mesh body 31b, the polymeric material of the matrix material may have a minor role relative to the solid particulate material in defining a hydrophilic property, hydrophobic property, or mixture of hydrophobic and hydrophilic properties of the formed filter element 31.

In some embodiments, however, the polymeric material of the matrix material can have a more significant role. For instance, in some embodiments, the polymeric material can greatly affect the hydrophobic property of the filter element due to the amount of residual polymeric material bonded or cured to the mesh body 31b.

In some embodiments (and as may be appreciated from FIG. 37), an additional filter media component can be included in the mold so that the formed coating layer 31PCL helps attach the filter media component 31w to the mesh body 31b. FIG. 27 illustrates an example of such a formed filter element having an intermediate filter media component 31w. The filter media component 31w can be a sheet of polymeric membrane, a sheet of non-woven cloth filter media, or a sheet of paper, for example. This type of filter media component 31w can be utilized to help improve the ability of the filter element 31 to capture smaller sized particulates of the slurry to be filtered (e.g. particles that are less than 1 micron or less than 5 microns in size). The filter media component 31w can have holes punched thereon or otherwise formed therein to help control for the filtrate flow and particulate capture that can be provided by its inclusion in the filter element 31. After a molding operation and the coating layer 31PCL is formed on a top side 31t of the mesh body 31b, the filter media component 31w can be positioned within the coating layer 31PCL and between a distal top side of the 31PCL and the mesh body 31b. Such embodiments may form filter elements 31 that can be configured so that a scraper 41 directly contacts the mesh body 31b of the filter element 31 as an outermost side of the filter element 31 when the filter element is attached to the frame of a disc sector 20a as can be appreciated from FIG. 27.

Additionally, as discussed herein, a reinforcing member 31r can be bonded to the coating layer 31PCL during a molding operation. As may be appreciated from FIGS. 26 and 37, for example, embodiments utilizing the reinforcing member 31r can be configured so that the coating layer 31PCL is between the reinforcing member 31r and mesh body. The reinforcing member 31r can be positioned within the inner space 33b of a frame 33 to which the filter element 31 is attached so that the mesh body 31b is a part of the exterior surface of a disc sector 20a opposite the innermost surface of the filter element that can at least partially be defined by the reinforcing member 31r bonded to the coating layer 31PCL.

Figure 12:
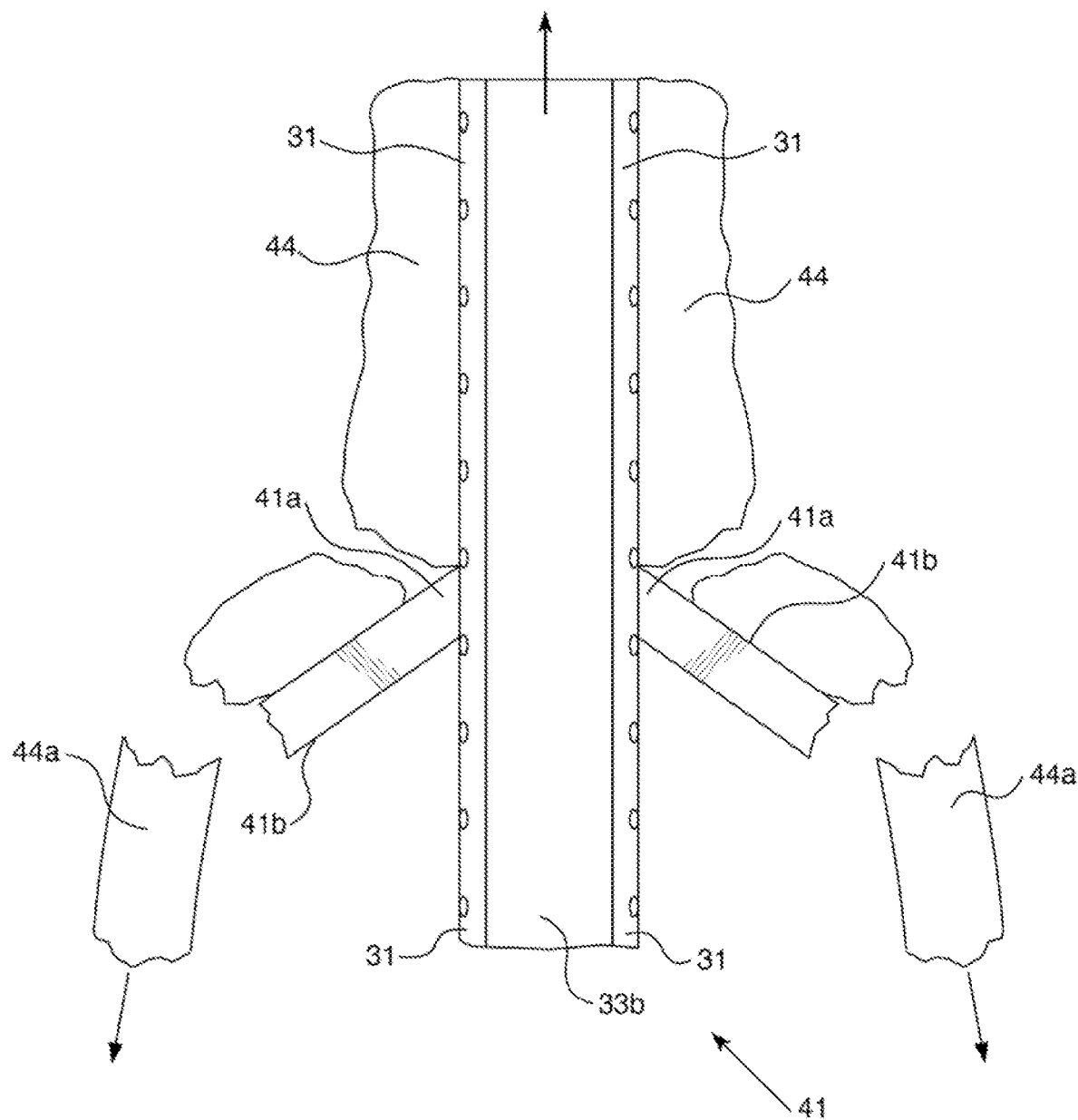
FIG. 12 is a schematic view of an exemplary scraper device of the first exemplary embodiment of the filtration device illustrating the direct contact of scraper elements on the filter element for scraping off filter cake formed thereon.
Figure 13:
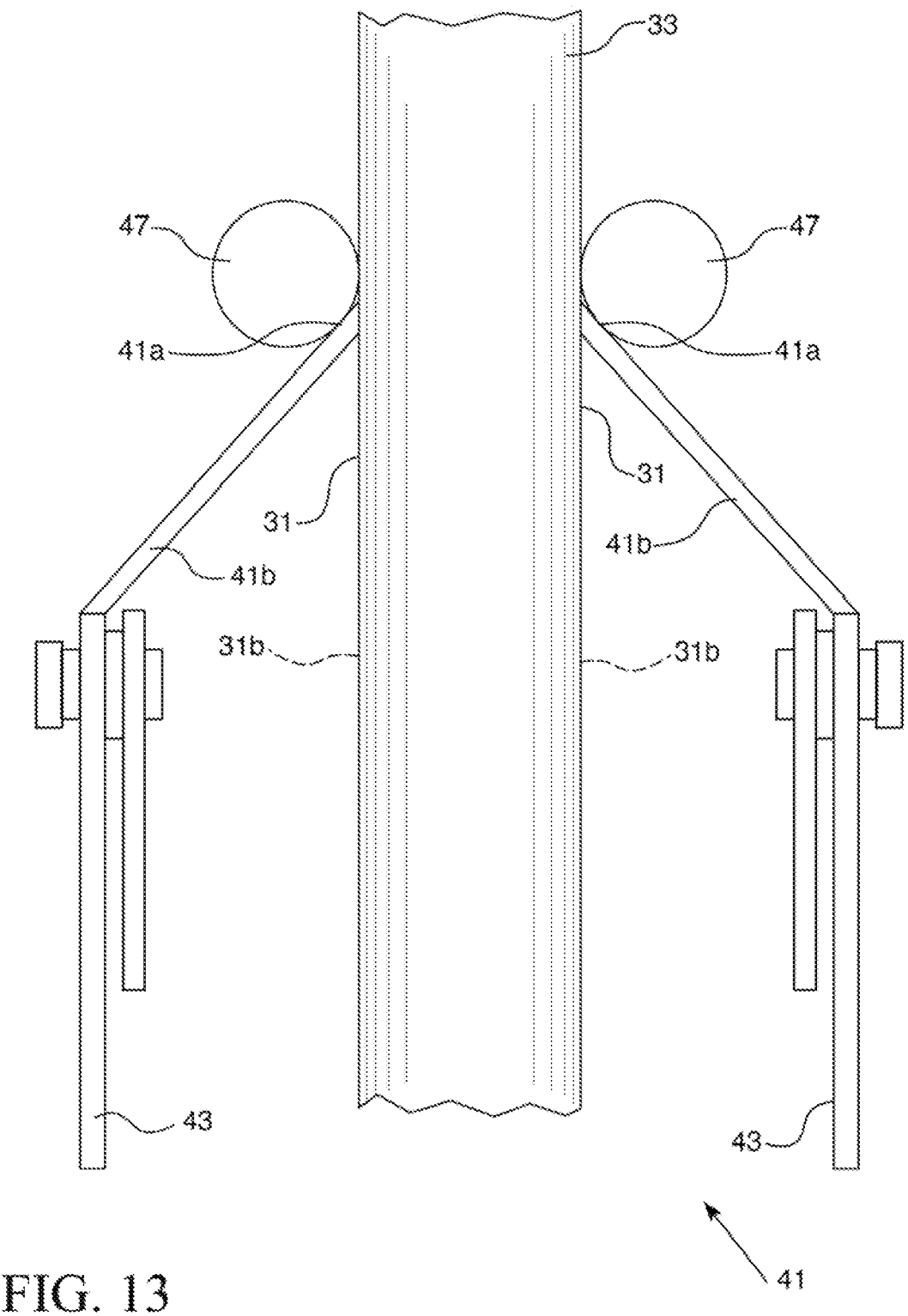
FIG. 13 is a second schematic view of an exemplary scraper device of the first exemplary embodiment of the filtration device illustrating an exemplary guide mechanism for directly contacting the scraper element onto the filter element of a disc sector shown in FIG. 12.
Figure 14:
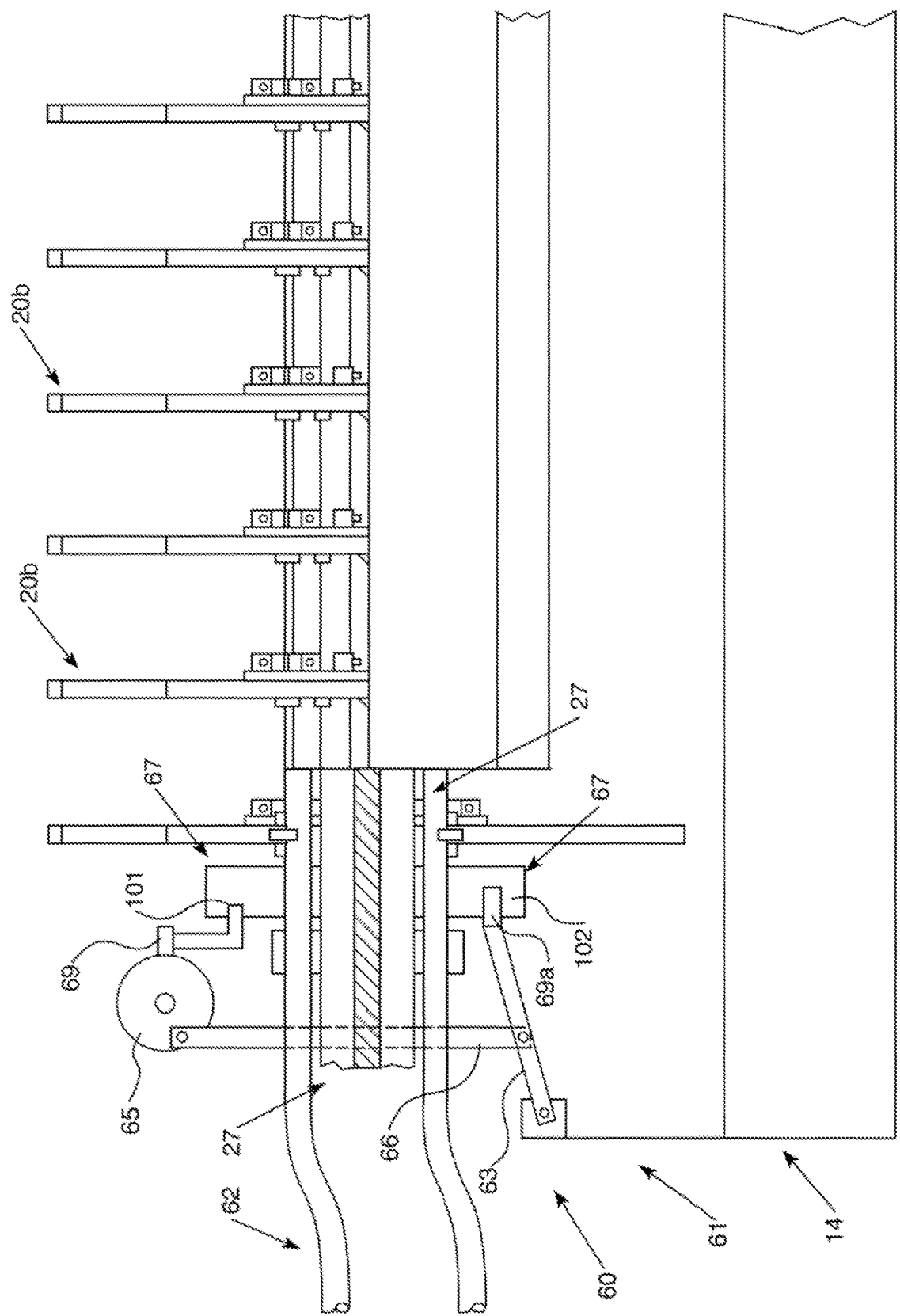
FIG. 14 is a schematic view of an exemplary first dip mechanism of the first exemplary embodiment of the filtration device illustrating a disc sector being moveably positionable within slurry during revolution of the disc sectors for a pre-selected range of a revolution via the dip mechanism. In some embodiments, this pre-selected range can be 30° of the 360° of a single revolution. In other embodiments, the pre-selected range can be less than 30° (e.g. 15° to less than 30°) or more than 30° (e.g. 45° to 60°, 60° to more than 30°, or 45° to more than 30°, etc.) of each revolution the disc sectors may make about a horizontal axis defined by the axial shaft of the filter device. It should be appreciated that an exemplary second dip mechanism of the first exemplary embodiment of the filtration device can be positioned adjacent the opposite ends of the tube manifolds 27 and be configured similar to the first dip mechanism shown in FIG. 14 (e.g. have the same configuration but at an opposite side of the slurry bath, etc.).
Figure 15:
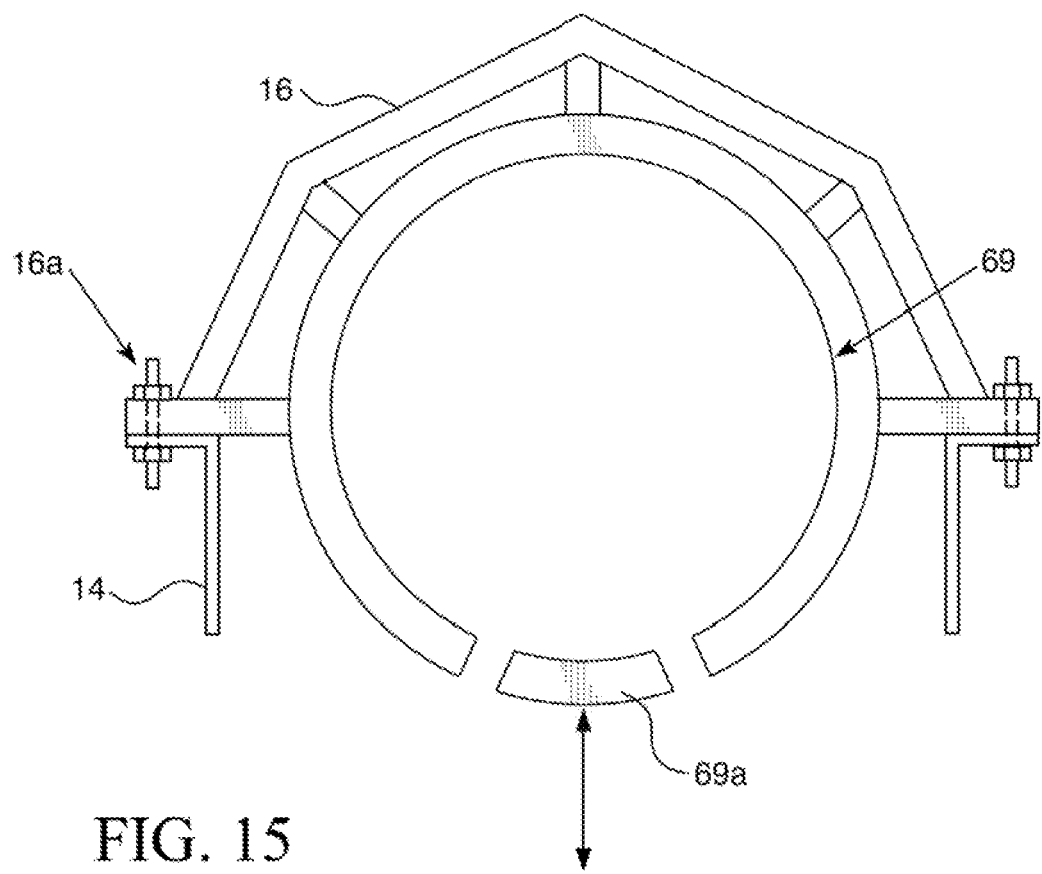
FIG. 15 is a schematic side view of the first exemplary embodiment of the annular tube manifold positioning device of the exemplary first dip mechanism shown in FIG. 14.
Figure 16:
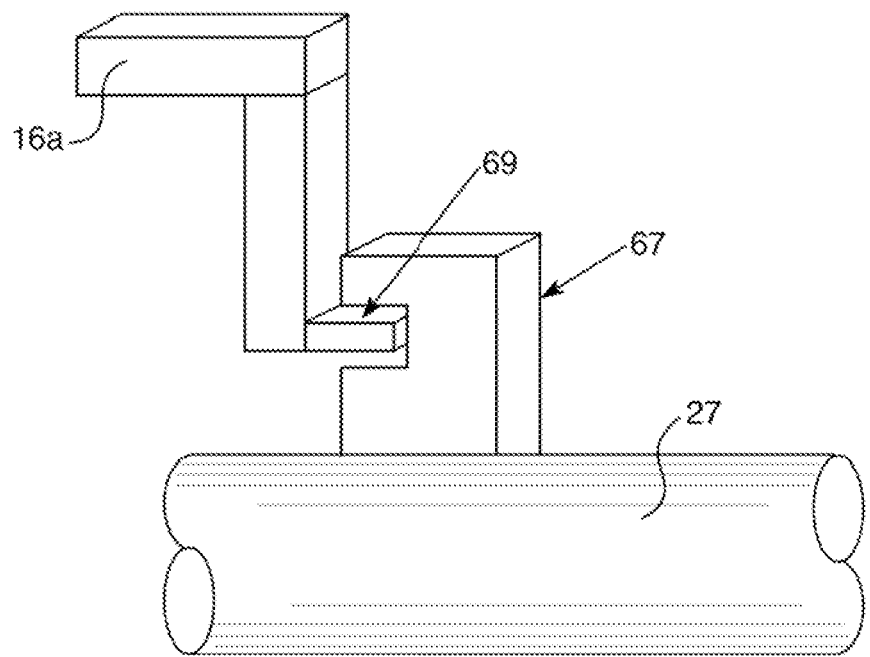
FIG. 16 is a fragmentary schematic view of the dip mechanism 60 of the first exemplary embodiment of the filtration device illustrating an exemplary slideable connection between a tube manifold guide notch and the annular tube manifold positioning device.
Figure 17:
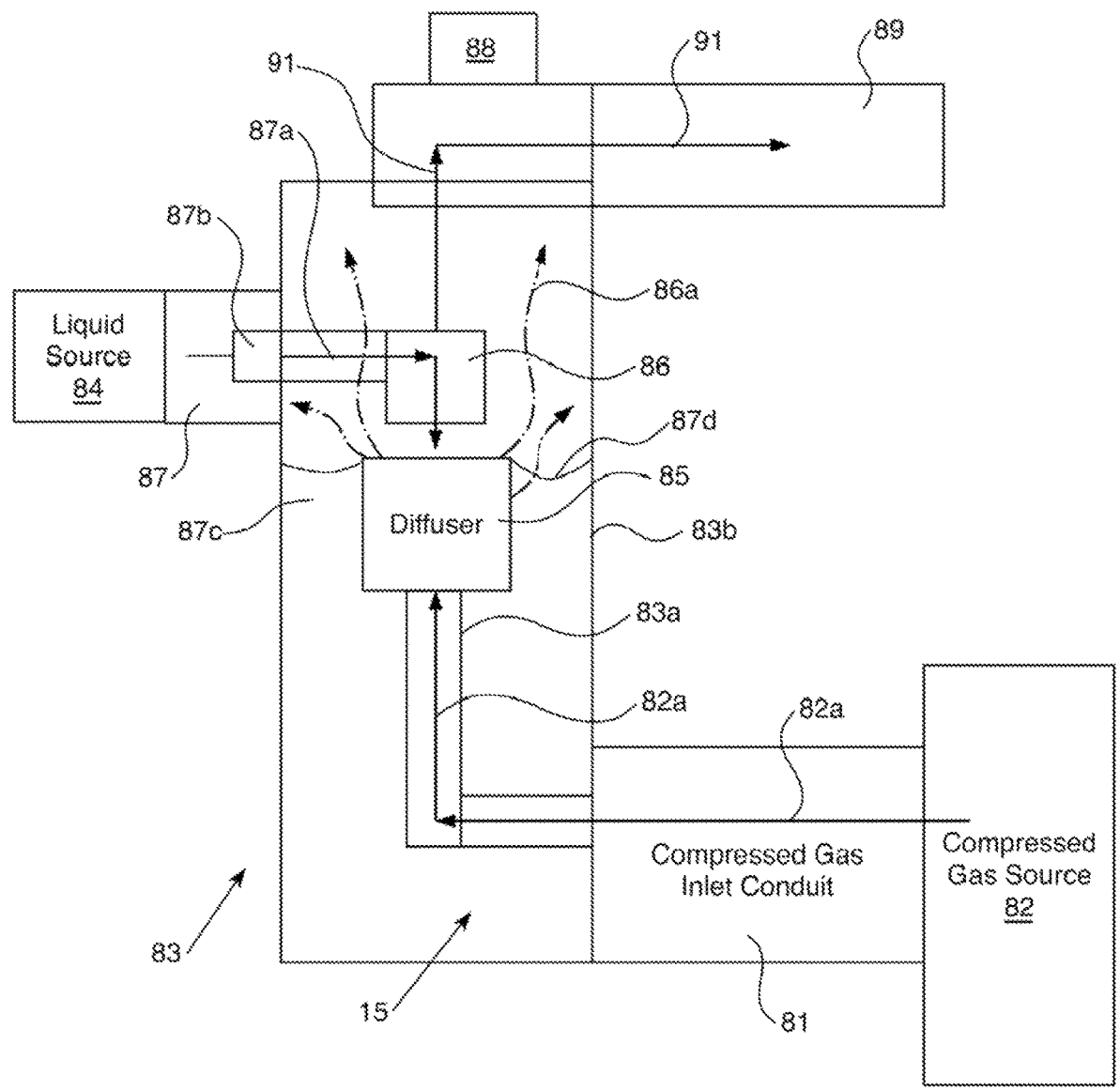
FIG. 17 is a block diagram schematic view of the backflow washing mechanism 15 of the first exemplary embodiment of the filtration device.

The scraper 41 of the filtration device 10 may be best appreciated from FIGS. 12-13, which shows schematic views of the scraper 41. The scraper 41 can be configured to be attached to the frame of the filtration device so that the scraper is positioned to directly contact filter elements 31 on opposite sides of the disc 20b as the disk 20b is rotated about the shaft 25. The scraper 41 can also be positioned so that the filter cakes 44 formed on the filter elements 31 can be directly contacted by at least one scraper element to dislodge the filter cakes 44 from the filter elements 31 and direct the filter cake material 44a into the discharge chute 13.

For embodiments where each disc has disc sectors 20a that have filter elements 31 on opposite sides of a frame 33 of a disc sector 20a, the scraper 41 can be positioned and configured to scrape opposite sides of the disc sectors 20a so that the filter elements 31 attached to opposite sides of each frame 33 of a disc 20b is directly scraped as the disc 20b of the array 20 is rotated. As each array 20 can have multiple discs 20b, there can be multiple scrapers 41—a respective scraper 41 for each disc 20b or a respective scraper 41 that is positioned so that there is a scraper member 41b that is positioned to extend from adjacent opposite sides of a disc 20b of the array 20 for each disc 20b.

In other embodiments, a disc 20b can be formed from multiple disc sectors 20a that only have a single filter element 31 attached to a frame 33 to enclose inner space 33b. There may be two disc sectors 20a attached to the same tube manifold 27 so that there are filter elements 31 positioned on opposite sides of the disc 20b for each segment of the disc 20b for such embodiments. The scraper 41 can be positioned so that a scraper element directly contacts the filter element of each sector 20a of a disc for opposite facing sides of the disc 20b for such embodiments.

The discharge chute 13 can be configured so that there is a single discharge chute for receiving the dislodged filter cake material from the different spaced apart scrapers 41. Alternatively, there may be a single discharge chute for each respective scraper or subset of scrapers 41.

Each scraper 41 can include a frame attachment mechanism 43. The frame attachment mechanism can include one or more beams, rods, steel stringers, stringers, or other types of spaced apart support structures that can attach scraper members 41b to the frame of the filtration device 10 to position the scraper members 41b for directly contacting filter elements 31 attached to a frame 33 of a disc sector 20a. The frame attachment mechanism can be moveable within a range of movement to permit the scraper members of the scraper members of the scraper 41 to be moved to different positions within a range of positions to account for movement of the disc 20b or a slight misalignment of the disc position 20b within a pre-selected tolerance level.

For embodiments where the frame 33 retains a pair of filter elements 31 on opposite sides of the frame (e.g. a first filter element 31 at a first side of the frame 33 and a second filter element 31 at a second side of the frame 33), each scraper member 41b of the scraper 41 can be positioned to directly contact a respective outer face of the filter element 31 on which filter cake can form. For instance, a first scraper member 41b can be positioned so its distal end 41a contacts the first filter element 31 on the first side of the frame 33 and the second scraper member 41b can be positioned so its distal end 41a contacts the second filter element 31 on the second side of the frame 33 that is opposite the first side of the frame 33.

Each scraper member 41b can extend from a separate frame attachment element of the frame attachment mechanism 43. A distal end 41a of each scraper member 41b can be positioned to directly contact a face of the filter element 31. For instance, a first scraper member 41b can have its distal end 41a positioned to contact first faces of the filter elements 31 (or first filter element 31) positioned at first sides of the frames 33 of the disc sectors 20a of a first disc 20b of the array 20 of the filtration device 10 as the array 20 of discs 20b is rotated about shaft 25. A second scraper member 41b can have its distal end 41a positioned to contact second faces of the filter elements 31 (or second filter element 31) positioned at the second sides of the frames 33 of the disc sectors 20a of the first disc 20b of the array 20 of the filtration device 10.

When embodiments utilize multiple filter elements 31 so that each frame 33 can include a first filter element 31 at a first side of the frame and a second filter element at the second side of the frame 33, the first and second filter element bodies can be positioned at those opposite sides of the frame 33 for each frame 33 of the disc 20b. An inner space 33b (e.g. the inner space 33b can be a cavity, a chamber, etc.) between the first and second filter elements 31 can be defined within the frame 33 for such embodiments.

When embodiments of the disc sectors 20a have frames to which only a single filter element 31 is attached, the inner space 33b can be defined by the frame 33 and the filter element 31 attached to a side of the frame 33. A scraper 41 can be positioned and configured so a scraper element directly contacts the filter element 31 of each of the disc sectors 20a of the disc 20b for opposite sides of the disc 20b.

In yet other embodiments, it is contemplated that the filter element 31 can be attached to the frame 33 so that the filter element 31 fills the entire inner space 33b and is on opposite sides of the frame 33. Such embodiments, however, may have limited practical applications. For such embodiments, the scraper members 41b can be positioned for directly contacting the opposite faces of the filter element for scraping filter cake formed thereon (e.g. formed top and formed bottom of the filter element 31 can be attached within a frame 33 so that these sides of the filter element 31 define opposite faces of the filter element 31 within a particular frame 33 of a disc 20b that is to be scraped via direct contact with the scraper members 41b).

To help guide the scraping of the filter cake 44 from the opposite sides of a disc 20b via direct contact with the distal ends 41a of the scraper members 41b of a scraper 41, the scraper can also include guide elements 47. The guide elements 47 can be configured as riders that are attached to the frame 16 or to the disc 20b to position the guide elements 47 adjacent the distal ends 41a of the scraper members 41a to help guide the distal ends 41a into direct contact with the filter element 31 for scraping the filter cake 44 off the filter element 31 as at least one disc 20b rotates.

For example, the guide elements 47 can be structured as washers or other type of plate or member that can be attached to opposite sides of a disc 20b so that the filter elements 31 of disc sectors 20a of the disc 20b are between the guide elements on the opposite sides of the disc 20b. The guide elements 47 in such embodiments can be positioned to contact the distal end portions of the scraper members 41b to maintain the position of the one or more scraper members 41b so that their distal ends 41a are in contact with each of the filter elements 31 of the disc sectors 20a in the scraping phase of a revolution of the disc 20b (e.g. the distal ends of the scraper members 41a contact the outer sides, of the filter elements 31 that face away from the inner spaces 33b of the frames 33 to which the filter elements 31 are attached).

In other embodiments, the guide elements 47 can be structured as washers or other type of plate or member that can be attached to a scraper member 41b so that it is positioned adjacent to a distal side of a disc 20b so as the disc 20b rotates, the guide 47 moves along peripheral sides of the frames 33 of the disc sectors 20a of the disc 20b. The scraper 41 can be configured so that there is such a guide 47 positioned at opposite sides of the disc 20b so that the filter elements 31 of disc sectors 20a of the disc 20b are between the guide elements 47 on the opposite sides of the disc 20b via their attachment to one or more scraper members 41b. The guide elements 47 in such embodiments can be positioned to move along the opposite outer sides of a disc 20b to maintain the position of the one or more scraper members 41b so that their distal ends 41a are in contact with each of the filter elements 31 of the disc sectors 20a in the scraping phase of a revolution of the disc 20b (e.g. the distal ends of the scraper members 41a contact the outer sides of the filter elements 31 that face away from the inner spaces 33b of the frames 33 to which the filter elements 31 are attached).

In some embodiments in at least one intermediate guide 47 can be positioned between the guides 47 at opposite sides of the disc 20b. These intermediate guides 47 can be attached to the disc 20b and/or frame 16 to help maintain the position of the one or more scraper members 41b during rotation of the disc 20b or can be attached to the scraper member 41b and extend to the disc 20b to help maintain the position of the one or more scraper members 41b.

It should be appreciated that the scraper members 41b can be configured to float along the filter elements 31 as the disc rotates 20b so that the scraper members 41b maintain contact with the filter elements 31 of the disc sectors 20a of a disc 20b as the disc 20b rotates and moves along the filter elements 31 as the disc 20b rotates. As the disc 20b rotates, the scraper members 41b can move along filter elements 31 of different disc sectors 20a for directly contacting the filter elements 31 or wire mesh bodies 31b defining an exterior surface of those disc sectors 20a as the disc sectors 20a pass through the scraping phase of a revolution of the disc 20b.

The direct contact of the scraper members 41b with the filter element 31 can occur without excessive wear to the filter element 31 due to the configuration of the scraper 41. The metal mesh body 31b of the filter element 31 can also help make sure that the filter element 31 can withstand the direct contact with the scraper 41.

In conventional filtration systems, if a filter cake is scraped off of a rotating disc, there is no direct contact of the filter element with a scraping element. Instead, a gap is maintained to avoid direct contact. I determined that this safety precaution was conventionally used to avoid the filter element being quickly destroyed during operation. I also determined that this conventional precaution was conventionally known to be needed even though it resulted in some filter cake remaining on the filter element 31 after the filter cake was removed because there was never direct contact between a scraper structure and the actual filter element. I determined that these issues resulted in reduced operational capacity as less solid particular material was separated by each disc or sector for each rotation. Further, the remaining portion of the filter cake could result in additional maintenance needs as the filtration device would need to be cleaned more often and have other operational down time associated with the excess filter cake accumulation that could occur because direct scraping contact is not conventionally permitted.

Use of embodiments of my scraper 41 can avoid these shortcomings. This is particularly true when embodiments of the filtration device utilize embodiments of the scraper 41 in combination with using filter element 31 having metal mesh body 31b with a coating 31PCL formed thereon as discussed herein.

Figure 38:
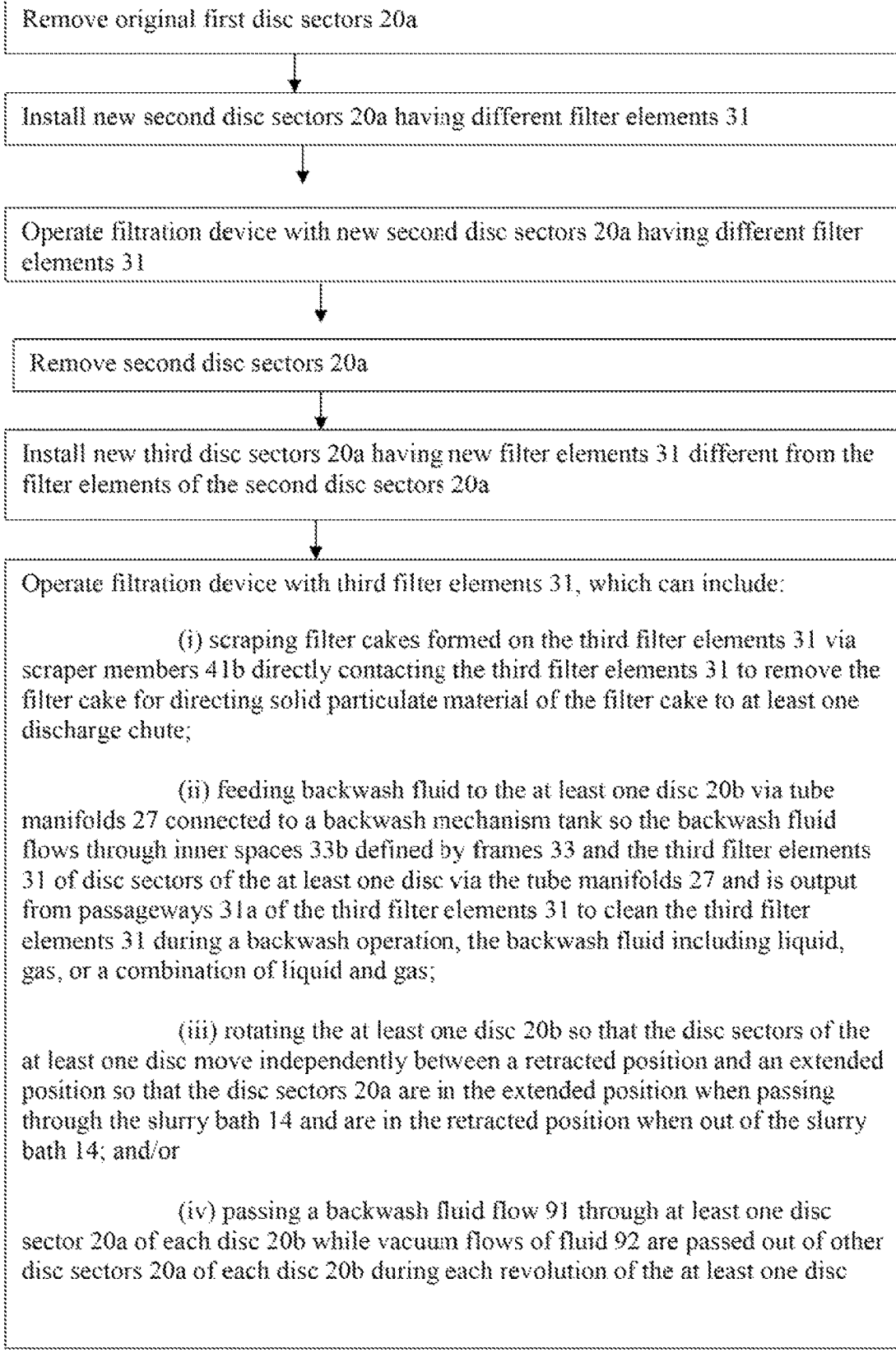
FIG. 38 is a flow chart illustrating an exemplary embodiment of operating a filtration device 10.

Moreover, the filtration device 10 can be configured so that the filter elements 31 of the disc sectors 20a can be removed and replaced as may be appreciated from FIG. 38, which illustrates an exemplary method in which disc sectors 20a having filter elements 31 are replaceable to adjust the filtration device and its use of different filter elements 31 for different operations.

For example, if a new slurry composition is to be filtered via the filtration device, old first disc sectors 20a having first filter elements 31 can be removed a disc 20b and new second disc sectors 20a having new second filter elements 31 can be attached to re-form the disc 20b with the new second disc sectors 20a. The new second filter elements 31 can be similar or different from the old first filter elements (e.g. have a different type of skin composition, have the same skin composition, etc.). Also (or alternatively), the new second filter elements 31 of the second disc sectors 20a can be conventional cloth filter media attached to the frames. When such cloth filter media is utilized, the scrapers 41 can still be configured to directly contact the cloth filter media to scrape of filter cake formed therein. The frames 33 of the new second disc sectors 20a can differ from the frames 33 of the first disc sectors 20a to accommodate the new second filter elements 31 of the new second disc sectors 20a.

As yet another option, the new second filter elements 31 can be conventional ceramic filter elements sized to be received by and attached to the frames 33 of the second disc sectors 20a. When such ceramic filter elements are utilized, the scraper(s) 41 can be adjusted in position so that the scrapers do not directly contact the ceramic filter elements. Instead, a space between the scraper members and the ceramic filter elements can be maintained via positioning of the scraper members to avoid direct contact with the filter elements while still scraping off portions of the filter cake formed thereon during rotation of the discs 20b having the ceramic filter element disc sectors 20a.

It should be appreciated that the changeover of filter elements 31 can occur repeatedly due to operational uses of the filtration device changing. For instance, new filtration services or uses for the filtration device 10 can result in such changes to the filter elements being made for better suiting a particular filtration application. After a cloth filter media and/or ceramic filter elements are utilized as filter elements 31 (e.g. cloth filter elements 31 or ceramic filter elements 31), the filtration device can again have the second disc sectors 20a with second filter elements 31 removed and replaced to include new third disc sectors 20 with new third filter elements 31 having the coating or at least partial coating 31PCL formed thereon as discussed herein as well. This type of flexibility in filter element usage can allow the filtration device 10 to be easily modified to provide filtration services that best meets an operator's needs as they may change over time. Further, utilization of embodiments of a dip mechanism 60, backflow mechanism 15 and/or the scraper 41 and/or the controlled environment via hood 26 can result in the use of the conventional filter elements 31 still providing a significant improvement in operational capacity due to improvements in maintenance, downtime, and operational capacity that can be provided. It should be appreciate that the filtration device 10 can be operated using the different mechanisms of the filtration device 10 discussed herein (e.g. backwash mechanism 15, dip mechanism 60, master valve assembly, etc.) via use of the original first disc sectors 20a as well as the new second disc sectors 20a and use of the new third disc sectors 20a that may be utilized as the use and application of the filtration device 10 is changed to accommodate different operations, operating conditions, or uses by an operator.

Figure 25:
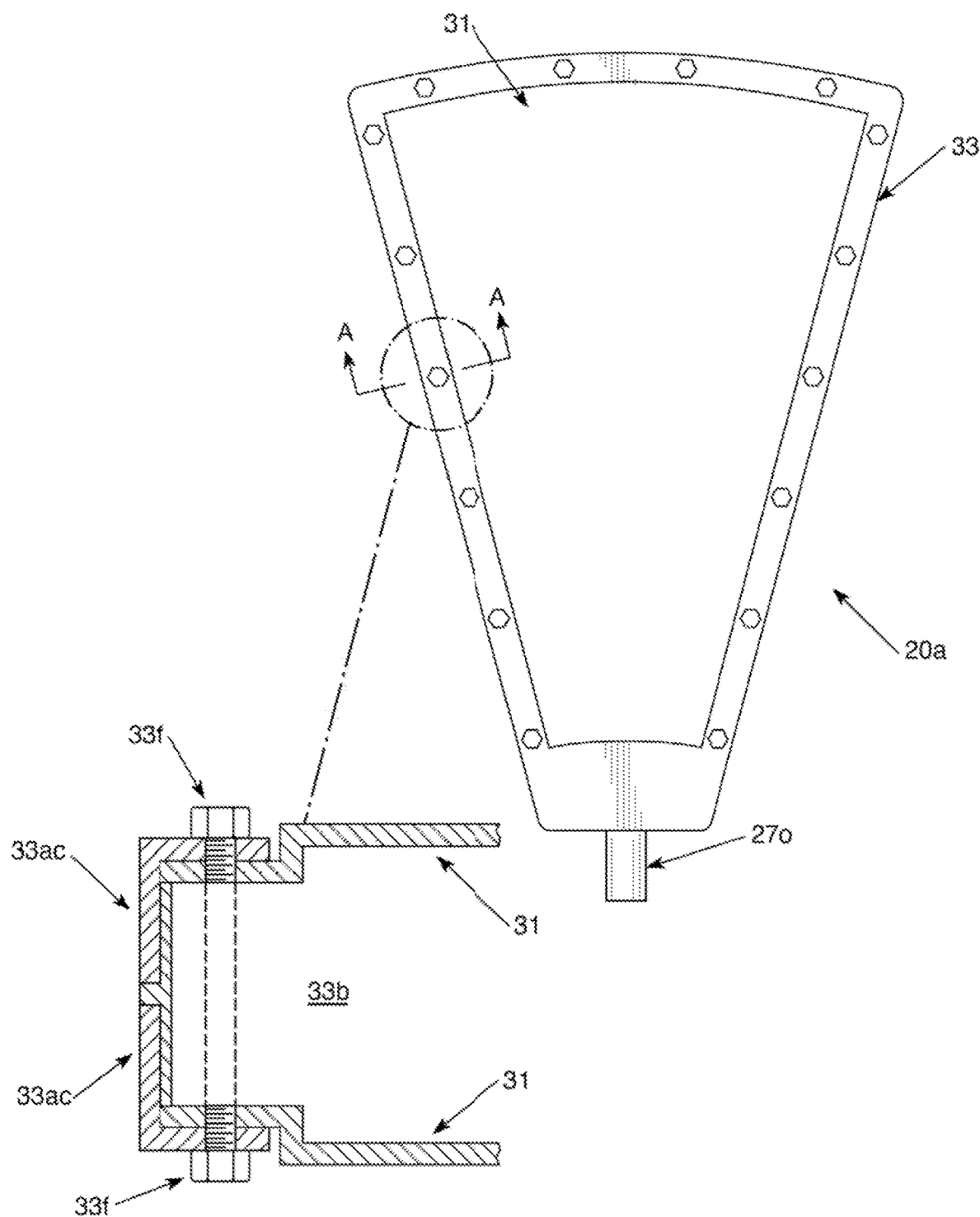
FIG. 25 illustrates an exemplary embodiment of a disc sector 20a that can utilize a cloth filter element 31 in embodiments of the filtration device 10 with an enlarged cross-sectional view taken along line A-A in FIG. 25 being illustrated to show an exemplary attachment mechanism utilized to attach cloth filter elements 31 to the frame 33 of the disc sector 20a. Each angle clamp 33ac can be attached to frame 33 by at least one fastener 33f A portion of a fastener 33f is shown in broken line to indicate that a single fastener 33f can extend between angle clamps 33ac for attachment as an exemplary attachment mechanism in some embodiments.

FIG. 25 illustrates an exemplary attachment mechanism for attachment of cloth filter elements 31 to frames 33 of second disc sectors 20a. For instance, fasteners 33f (e.g. bolts) can be utilized in conjunction with angle clamps 33ac attached to the frame 33 at peripheral edges of the filter element 31 for attachment of the cloth filter elements 31 at opposite sides of the frame 33. A single fastener 33f can extend between angle clamps 33ac for attachment of the angle clamps 33ac to the frame 33 as indicated in broken line in FIG. 25. In other embodiments, each angle clamp 33ac can be attached to the frame by at least one fastener 33f. The filter cloth elements 31 can extend to help define inner space 33b within the frames and extend along opposite faces of the disc sectors 20a so that a scraper member 41b can contact the filter elements 31 as the discs 20b rotate.

The filtration device 10 can also be configured so that when cloth filter elements 31 having cloth filter media are utilized, the filter elements do not have to be exposed to a flow of compressed air to provide a compressed air snap blow (e.g. a gas only backwash fluid flow 91) to help facilitate filter cake removal. During operations when use of cloth filter elements 31 in the disc sectors 20a occurs, the filtration device 10 can be configured so that during rotation of the disc, a vacuum is applied for a portion of the rotation to facilitate drying during the drying phase and then the application of a vacuum is stopped such that the cloth filter elements 31 and inner spaces 33b of the frames 33 of the disc sectors 20a are exposed to a normalized pressure within the hood or atmospheric pressure (as opposed to a vacuum). This can occur during the scraping phase of a revolution, for example. This change from vacuum to non-vacuum conditions without requiring use of compressed air to be fed into the inner spaces 33b for passing out of the cloth filter elements 31 can permit the filter cake to be removed via at least one scraper 41 without requiring operation or use of a compressor. Further, the relatively quick cessation of a vacuum to change to the pressure environment within the inner space 33b can result in the filter cake jumping off of the cloth filter element due to the pressure within the inner space 33b changing rapidly from a vacuum environment to a higher pressure environment of just atmospheric pressure. The quick changeover from a vacuum to atmospheric pressure conditions can be provided by a master valve connection between the tube manifolds 27 and the vacuum generating device by the master valve being adjustable to quickly block a connection to vacuum generating devices for the tube manifolds so that the disc sectors 20a attached to the tube manifolds do not experience a vacuum within the inner spaces 33b of the frames 33 when those disc sectors 20a are in the scraping phase of a revolution. In some embodiments, the cake jumping provided by the sudden change from vacuum to non-vacuum conditions can even allow some embodiments to not utilize a scraper 41 for the scraping phase as the cake jumping alone can be sufficient for cake filter removal during the scraping phase of a revolution.

A dip mechanism 60 of the filtration device may best be appreciated from the schematic drawings of FIGS. 14-16 and 23-24. The dip mechanism 60 can include an arrangement that can be engaged and disengaged during the rotation of the array 20 so that disc sectors 20a of discs 20b connected to a tube manifold 27 via frames 33 can be extended from an initial retracted first position into an extended second position and subsequently retracted back from the extended second position to the initial first position. For each disc 20b, a disc sector 20a can be moved to the extended second position relative to other disc sectors 20a of the disc 20b to move the disc sector 20a into a slurry bath 14 during the slurry intake/collection phase of the rotation of the array 20 of discs 20b.

The retraction and extension of the tube manifolds 27 for extension and retraction of the disc sectors 20a can be facilitated by flexible hose connections 62 between distal ends of the tube manifolds 27 and master valves attached to the frame 16 that can be positioned adjacent opposite ends of the assembly through which the tube manifolds 27 extend. The flexible hose connections 62 can flex from a compressed position to an extended position when the tube manifolds 27 change in position from a more inward, or retracted position to a more outward, or extended position.

The retraction and extension of disc sectors 20a that can be provided during rotation of the array 20 of discs 20b can permit a smaller slurry bath 14 to be utilized for slurry collection operations as compared to conventional devices, which can often utilize as much as half of the 360° of the rotational path of a revolution for slurry intake/collection. The inclusion of the dipping mechanism 60 can also permit a significantly larger portion of the revolution cycle of the array 20 to be utilized for drying operations so that a drier filter cake is formed on the filter element.

In some embodiments, the portion of the revolution cycle for the slurry intake/collection phase can account for as little as 30° of the 360° of a single revolution. In other embodiments, the portion of the revolution cycle for the for the slurry intake/collection phase can account for as little as 15°-45° of the 360° of a single revolution. The dip mechanism 60 can be configured to help reduce the portion of the revolution cycle that is needed for slurry intake/collection so that the slurry bath 14 can be a smaller size. This can greatly reduce the cost and size of filtration devices 10 and can also improve operational efficiency as a larger portion of the revolution cycle can be allocated to drying of the filter cake.

The dynamic path of travel of the disc sectors 20a within the slurry bath 14 provided by the extendable and retractable disc sectors 20a also permits an improvement in slurry collection as the disc sectors 20a can be more selectively positioned within the slurry bath 14 (e.g. the depth into which the disc sector 20a is positioned in the slurry bath changes as the disc sector 20a travels through the slurry bath during the rotation of the array 20 of discs 20b). The movement of the disc sectors 20a within the slurry bath can permit the disc sectors 20a to be positioned within the slurry bath during at least a portion of their path through the slurry bath so that particulates that may collect near the bottom of the slurry bath 14 are more often collected by the disc sectors 20a passing through the slurry bath 14. The improvement in slurry collection can also occur due to the enlargement of the path within the slurry bath provided by the extension and retraction motion of the disc sector 20a that occurs while the disc sectors 20a are rotating about the axial shaft 25.

An exemplary embodiment of the dipping mechanism 60 can include multiple movement mechanisms for simultaneously moving opposite ends of the tube manifolds 27 during rotation of the disc 20b for the retraction and extension of the tube manifolds 27 and the disc sectors 20a attached to the tube manifolds. For example, there can be a first tube manifold moving device 61 adjacent a first end of each tube manifold 27 and a second tube manifold moving device 61 positioned at a second end of each tube manifold 27 to provide movement of the tube manifolds 27 for selective independent extension and retraction motion of the frame elements 20a as the array 20 rotates.

Each tube manifold moving device 61 can include a vertically moveable lever 63. The lever 63 of the first tube manifold moving device 61 can be positioned adjacent a first end of the slurry bath 14 and the vertically moveable lever 63 of the second tube manifold moving device 61 can be positioned adjacent a second end of the slurry bath 14. Each vertically moveable lever 63 can be driven to a lower position when a cam 65 engages the lever 63 to drive the lever 63 to move the lever. For example, the cam 65 can be positioned to rotate to drive an actuator member 66 that connects the lever 63 to the cam 65 so that rotation of the cam 65 can cause the lever 63 to pivot about a pivot point for changing an elevation of at least one end of the lever 63 for vertical adjustment of the lever 63.

For each tube manifold moving device 61, a cam 65 can be positioned adjacent the ends of the tube manifolds for actuation of the actuator member 66 positioned between the cam 65 and the lever 63 to engage the lever 63 and actuate movement of the lever 63. For instance, a first tube manifold moving device 61 adjacent first ends of the tube manifolds 27 can include a first cam 65 adjacent the first ends of the tube manifolds 27 that is connected to a first actuator member 66 for actuating vertical adjustment of at least one end of a first lever 63. A first tube manifold moving device 61 adjacent second ends of the tube manifolds 27 can include a second cam 65 adjacent the second ends of the tube manifolds 27 that is connected to a second actuator member 66 for actuating vertical adjustment of at least one end of the second lever 63.

Each tube manifold 27 can include guide notches 67 extending therefrom adjacent each end of the tube manifold 27. As each tube manifold 27 is rotated, the guide notches 67 can move about attachment rings 69 positioned at opposite ends of the tube manifolds 27 for attachment of the tube manifolds for rotation of the tube manifolds 27. While the tube manifolds 27 rotate, the rings 69 can be in a fixed position and not rotate by being fixedly attached to a portion of frame 16a or otherwise attached to the frame 16 so the attachment rings 69 are in a fixed position.

A first ring 69 adjacent the first ends of the tube manifolds 27 and a second ring 69 adjacent the second ends of the tube manifolds 27 can each have a bottom opening in which a moveable attachment segment 69a is positioned. The moveable attachment segment 69a of the attachment ring 69 can be attached to a lever 63 and is moveable from an upper position to a lower position via vertical motion of the lever 63 or end of the lever 63 that can be driven by cam 65 (and actuation member 66 connected to the cam 65).

The guide notches 67 of the tube manifolds 27 can be configured to move along the bodies of the attachment rings 69 as the tube manifolds 27 are rotated. When the guide notches 67 of a particular tube manifold 27 are positioned into contact with and engagement with the moveable attachment segments 69a during a revolution of the array 20 of discs 20b, the levers 63 of the tube manifold moving devices 61 can be moved via the cam 65 so that the tube manifold 27 of those guide notches 67 is moveable vertically below the attachment rings 69 to an extended position within the slurry bath 14 or deeper within the slurry bath 14.

For example, as the first guide notches 102 of a first tube manifold 27 move along the vertically moveable ring segments of the first and second rings 69, the notches 67 can engage teeth of the cams 65 to drive motion of the cams 65 for raising and lowering motion of the levers 63 to cause the tube manifold 27 and the disc sectors 20a attached to that tube manifold 27 to lower in height so that the disc sectors 20a and filter elements of these disc sectors 20a are inserted into the slurry of the slurry bath 14. As the first tube manifold 27 continues to rotate about a single revolution, the guide notches 101 of the tube manifold 27 continue to move along the vertically moveable segments 69a of the attachment rings 69 to engage the cams 65 to drive downward motion of the levers 63 to a bottommost position that defines a deepest part of the slurry bath 14 in which the disc sectors 20a are inserted and continue to move for causing the cams to move the levers 63 upwards thereafter back to its uppermost position coinciding with the disc sectors 20a attached to the tube manifold 27 exiting the slurry bath 14 as the revolution of the discs 20b proceeds toward the drying phase of a revolution for the disc sectors 20a of that tube manifold 27.

Thereafter, a second tube manifold 27 can be rotated so that its second guide notches 101 positioned onto the moveable segments 69a of the attachment rings 69 so that its second guide notches 102 engage cams 65 for movement of the levers 63 of the tube manifold moving devices 61 in a similar manner. It should be appreciated as each tube manifold 27 can enter the slurry insertion phase of a revolution during a revolution of the disc 20b, the cams 65 are engaged for movement of the levers 63 for vertical adjustment of the tube manifold 27 for positioning of the disc sectors 20a attached to that tube manifold deeper into the slurry bath and subsequently out of the slurry bath in a similar manner.

It should be appreciated that the tube manifold moving device 61 can be arranged to position the lever 63 adjacent to or within the slurry bath 14 in different arrangements. For example, as may best be seen from FIG. 24, the lever 63 can be pivotally attached to a sidewall of the tank of the slurry bath 14 and have a middle portion of the lever 63 pivotally attached to a lower end of the actuator member 66. Vertical movement of the actuator member 66 attached to cam 65 can cause a distal end 63a of the lever 63 to move upwards and downwards via rotational movement of the lever 63 about the pivotal attachment 63b the proximate end of the lever 63 has with the wall of the tank of the slurry bath 14. This rotational motion of the lever 63 can be driven by rotation of the cam 65, which causes vertical motion of the actuator member 66 attached to the cam 65 to drive rotating motion of the lever 63 so that the distal end 63a of the lever 63 connected to the moveable segment 69a is moved from an upper position to a lower position and subsequently back to the upper position in repetitive cycles as the cam 65 rotates.

Figure 23:
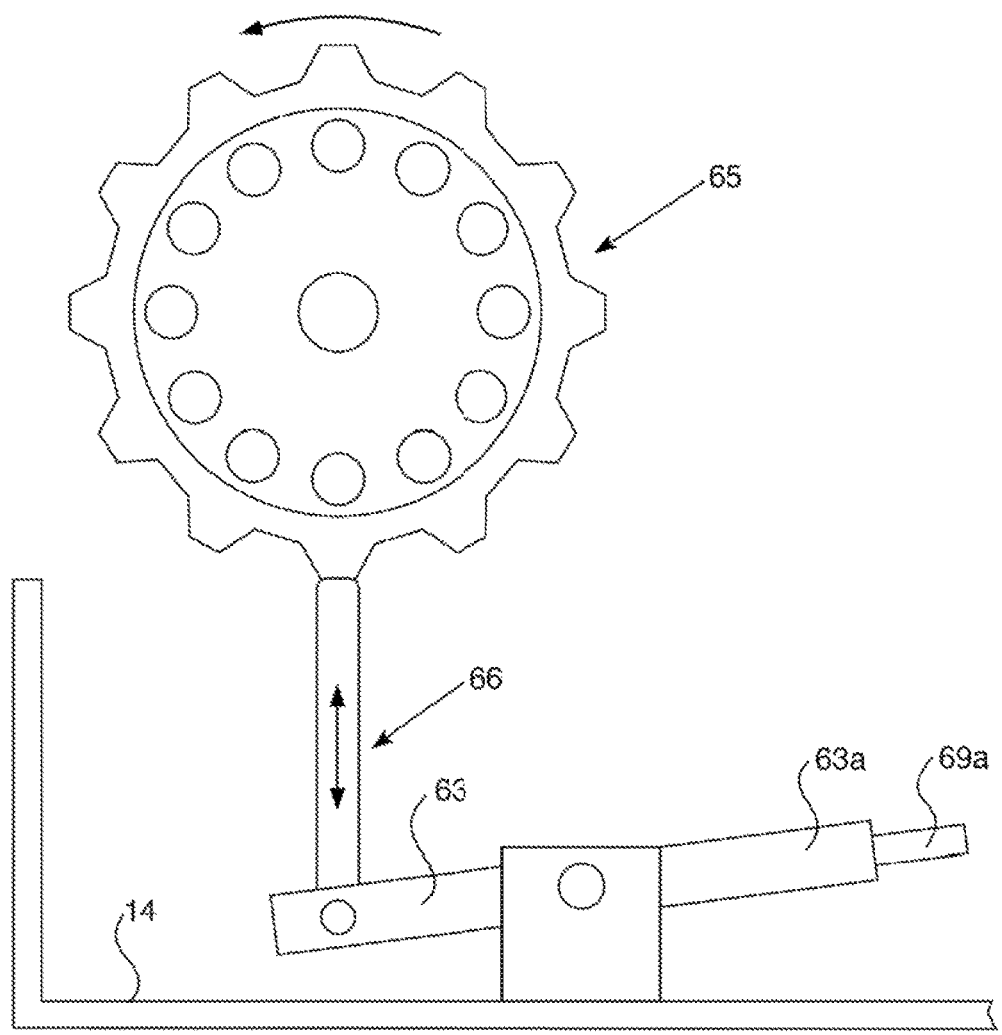
FIG. 23 is a fragmentary schematic view illustrating an exemplary first dip mechanism positioned in a slurry bath 14 adjacent first ends of tube manifolds 27 that can be utilized in the first exemplary embodiment of the filtration device. A second dip mechanism can have the same structure and configuration of the first dip mechanism and be positioned in a similar manner adjacent the second ends of the tube manifolds 27.
Figure 24:
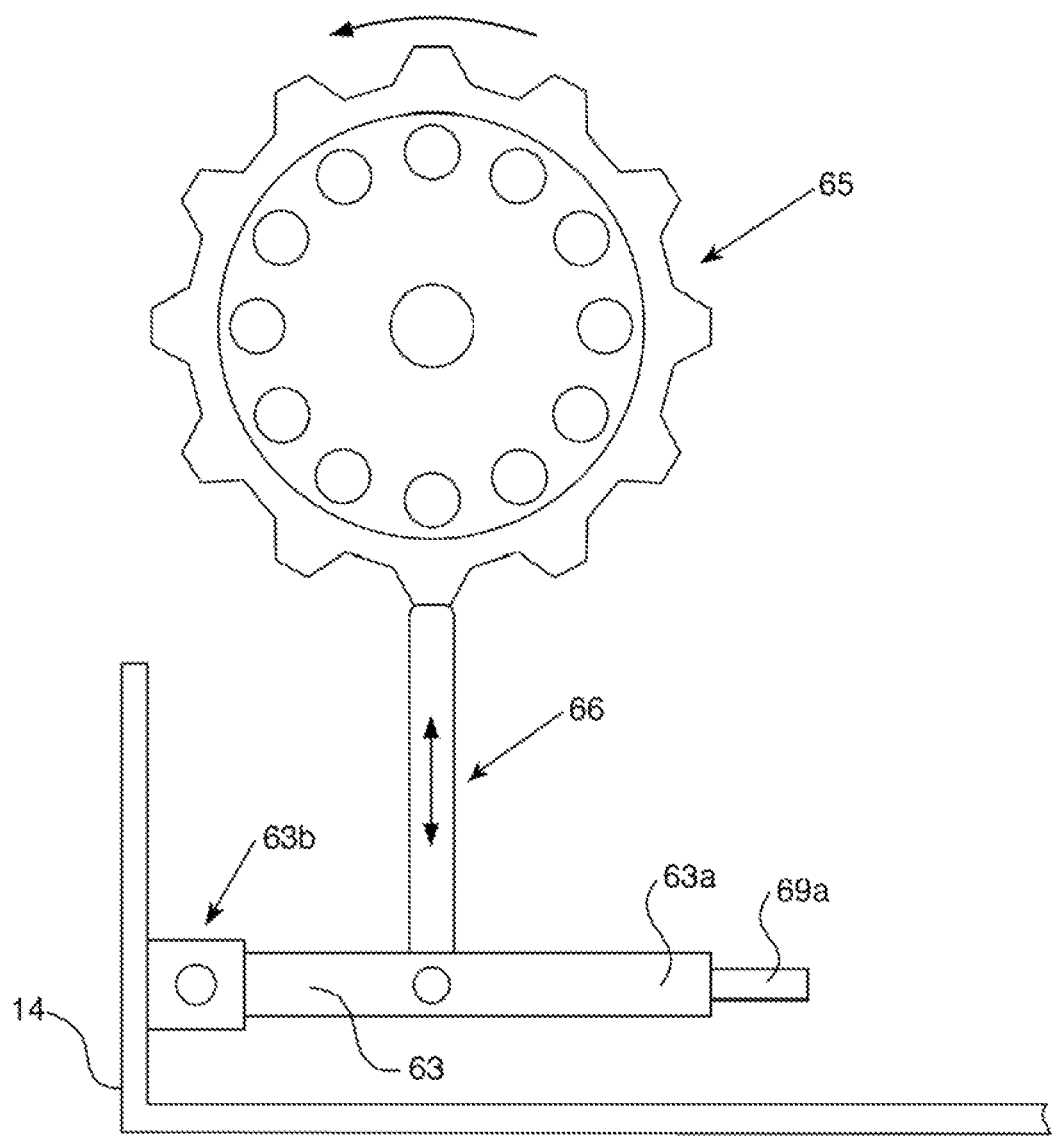
FIG. 24 is a fragmentary schematic view illustrating components of the exemplary first dip mechanism of the first exemplary embodiment of the filtration device illustrated in FIGS. 14-16 that is positioned in a slurry bath 14 adjacent first ends of tube manifolds 27 that can be utilized in the first exemplary embodiment of the filtration device. It should be appreciated that a second dip mechanism can have the same structure and configuration of the first dip mechanism components shown in FIG. 24 and be positioned in a similar manner adjacent the second ends of the tube manifolds 27.

In other embodiments, the actuator member 66 and lever 63 can have an alternative arrangement. FIG. 23 illustrates one example of such an alternative arrangement. The lever 63 can be pivotally attached to a floor of the tank of the slurry bath via a pivotal attachment mechanism. An intermediate portion of the lever 63 that is between its proximate and distal ends (or opposite first and second ends) can be pivotally attached to the floor of the slurry bath tank via the attachment mechanism. The first proximal end of the leer 63 can be connected or pivotally connected to a lower end of the actuator member 66 that is coupled to the cam 65. The second end of the lever 63 can be attached to the moveable segment 69a so that movement of the lever 63 can cause the moveable segment 69a to change its vertical position. Vertical movement of the actuator member 66 attached to cam 65 can cause the proximal end of the lever 63 to move upwards and downwards via rotational movement of the lever 63 about the pivotal attachment the intermediate portion of the lever 63 has to the floor of the slurry bath tank. This rotational motion of the lever 63 can be driven by rotation of the cam 65, which causes vertical motion of the actuator member 66 attached to the cam 65 to drive rotating motion of the distal end 63a of the lever 63 attached to moveable segment 69a to move from an upper position to a lower position and subsequently back to the upper position in repetitive cycles as the cam 65 rotates.

It should be appreciated that the cams 65 can be positioned so the cams 65 rotate continuously during rotation of the tube manifolds 27 so that the moveable segments 69a of the attachment rings 69 are positioned in their uppermost position to receive guide notches 67 of a tube manifold entering the slurry insertion phase of a revolution, subsequently moved downwardly into the slurry bath 14 and/or deeper into the slurry bath 14 as the moveable segments 69a are lowered via the simultaneous motions of the levers 63 of the first and second tube manifold moving devices 61 to a lowermost position in the slurry bath 14 and subsequently raised back to the initial uppermost position as the tube manifold is rotated to a position at which the tube manifold exits the slurry insertion phase of the revolution. At that point, the tube manifold that was lowered and subsequently raised can have its guide notches 67 pass along the non-vertically adjustable portions of the attachment rings 69. At that same time, the guide notches of the next tube manifold can pass onto the moveable segment 69a for subsequent lowering into the slurry bath and raising out of the slurry bath in a similar manner. This repetitive cycle can repeat for each revolution of the discs 20b so that the different tube manifolds 27 and the disc sectors 20a attached thereto are successively lowered and raised during their slurry insertion phase of a revolution of the discs 20b.

It should be appreciated that the dipping motion of each tube manifold 27 can be facilitated by flexible hose connections 62. During extension, or dipping, the flexible hose connections can be extended to facilitate the dipping of the tube manifold closer toward the slurry bath for positioning of the disc sectors 20a attached to the tube manifold 27. During retraction, or raising, of the tube manifold 27, the flexible hose connections 62 can retract from the more extended, or flexed configuration and be in a more resilient, less stretched state.

The backwash mechanism 15 may best be appreciated from FIGS. 1 and 17-19. The backwash mechanism can include a liquid source 84 and a compressed gas source 82. A compressed gas inlet conduit 81 can connected the compressed gas source 82 to the backwash mechanism tank 83. The compressed gas inlet conduit 81 can be a compressed gas inlet conduit that extends from the compressed gas source 82 to the backwash mechanism tank 83. The compressed gas inlet conduit 81 can also include piping, tubing, or other type of interconnected conduit structure that includes valves as well as process control elements (e.g. flow meters, pressure sensors, etc.). The compressed gas source 82 can be configured as a compressor, a pump, or other type of device that is configured to compress air or other gas for feeding the gas to the backwash mechanism tank 83. In some embodiments, the compressed gas source 82 can be a processing unit of a plant that has the filtration system 1 therein that can provide a source of pressurized gas to the backwash mechanism tank 83 via a compressed gas inlet conduit.

The backwash mechanism tank 83 can be a reservoir or other type of tank. In some embodiments, the backwash mechanism tank 83 can be supported on the frame 16 of the filtration device 10. In other embodiments, the backwash mechanism tank 83 can be positioned adjacent the frame 16 or be located at a location remote from a frame 16.

The liquid source 84 can be connected to the backwash mechanism tank 83 via a liquid inlet conduit 87. Liquid of the liquid source 84 can include, for example, liquid water, or liquid water mixed with backwash chemicals that can help facilitate cleaning operations. The particular set of chemicals that may be utilized can be selected to account for the particular types of solids being filtered by the filter element 31. The liquid inlet conduit 87 can extend from the liquid source 84 to the backwash mechanism tank 83 for feeding liquid to the tank 83. The liquid inlet conduit 87 can also include piping, tubing, or other type of interconnected conduit structure that includes valves as well as process control elements (e.g. flow meters, pressure sensors, etc.). For example, the liquid inlet conduit 87 can include a check valve 87*b* so that a flow of liquid 87*a* passes out of the liquid inlet conduit 87 and into the backwash mechanism tank 83 via the check valve 87*b*. The check valve 87*b* can be configured to prevent compressed gas that may be fed into the backwash mechanism tank 83 from flowing into the liquid inlet conduit 87. The flow of liquid 87*a* fed into the backwash mechanism tank 83 can fill the tank 83 to a particular filled zone 87*c*. The filled level of liquid within the backwash mechanism tank 83 can be controlled via a float valve 87 connected to the check valve 87*b* to receive liquid from the liquid inlet conduit 87 and control the flow of liquid 87*a* into the backwash mechanism tank 83 so that the level of liquid in the backwash mechanism tank 83 stays at or below a pre-selected level. Other process control elements can also be connected to the backwash mechanism tank 83 to facilitate process control of the backwash mechanism. Such elements can include a pressure relief valve 88 configured to open to release liquid and/or gas if the pressure within the backwash mechanism tank 83 exceeds a pre-selected threshold. Flow meters, temperature sensors, and/or pressure sensors can also be included for monitoring conditions within the backwash mechanism tank 83. Such sensors can be connected to an automated process control device for monitoring and controlling operations of the backwash mechanism 15.

The backwash mechanism tank 83 can include a diffuser 85 positioned therein. The diffuser 85 can be configured to receive a flow of compressed gas 82*a* from the compressed gas inlet conduit 81. In some embodiments, the flow of compressed gas can be fed from a gas receiving portion 83*a* of the backwash mechanism tank 83 for being fed to the diffuser 85. The diffuser 85 can be positioned in a liquid receiving portion 83*b* of the tank that has a level of liquid 87*c* therein. The diffuser 85 can be configured to receive the compressed gas and output the compressed gas into the liquid to generate a bubbles within the liquid to form a source of fluid that is a mixture of liquid and gas. A flow of the mixture of liquid and gas 87*d* formed via the diffuser can be fed out of the liquid retaining portion 83*b* of the backwash mechanism tank 83 via an output conduit that extends from the backwash mechanism tank 83 to a backflow fluid conduit 89 connected to a master valve 89*mv* for connection of the backwash mechanism 15 to the tube manifolds 27. The flow of output backwash fluid 91 from the backwash mechanism tank 83 can include a mixture of gas and liquid via the diffuser. The backwash mechanism 15 can also be configured to only receive liquid for outputting the flow of output backwash fluid 91 as only a flow of liquid. Such an operation can be provided by a valve closing to prevent compressed gas to be fed into the backwash mechanism tank 83, for example. The backwash mechanism 15 can also be configured to only receive compressed gas for outputting the flow of output backwash fluid 91 as only a flow of gas. Such an operation can be provided by the float valve 86, check valve 87*b*, or other liquid inlet valve being closed to prevent the backwash mechanism tank 83 receiving liquid.

The backwash mechanism 15 can be configured to operate in any of three output fluid providing configurations so that an operator can adjust the backwash operations to provide any of the three output backwash fluid 91 options (e.g. gas, liquid, or a mix of gas and liquid as the flow of output backwash fluid 91). In other embodiments, the backwash mechanism may not include a diffuser 85 and may be configured to only provide liquid as the flow of output backwash fluid 91 and/or only provide compressed gas as the flow of output backwash fluid 91. For embodiments in which only the liquid or only the compressed gas is provided as a flow of output fluid, the backwash mechanism tank 83 can be configured as a portion of a conduit for feeding the flow of output fluid from the liquid source 84 or compressed gas source 82 to the discs 20*b* of the filtration device 10.

Figure 18:
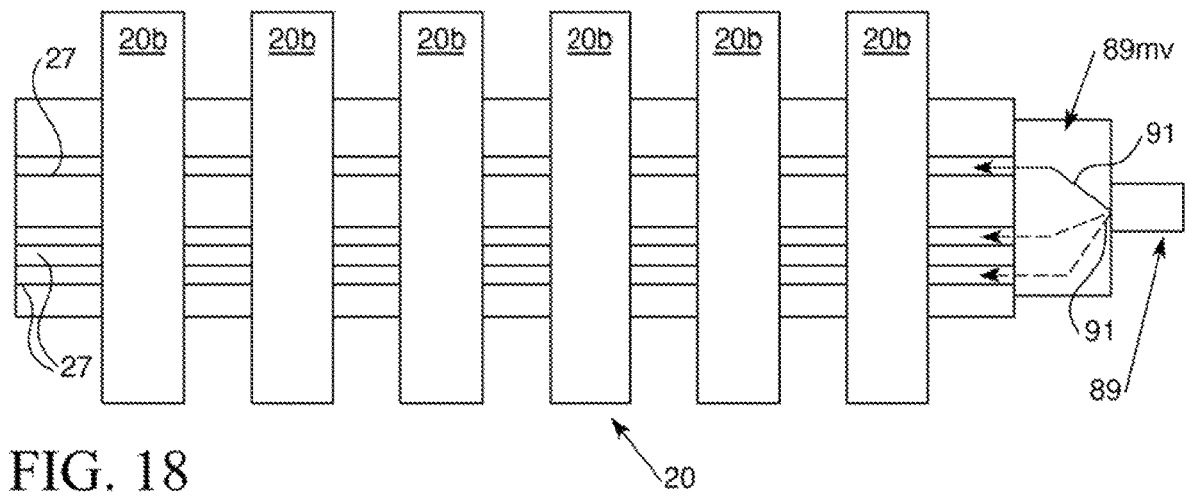
FIG. 18 is a block diagram schematic view of a portion of the axial shaft arrangement in which tube manifolds 27 are attached to the array 20 of spaced apart discs 20b of the first exemplary embodiment of the filtration device that illustrates an exemplary cleaning fluid flow path to tube manifolds 27.
Figure 19:
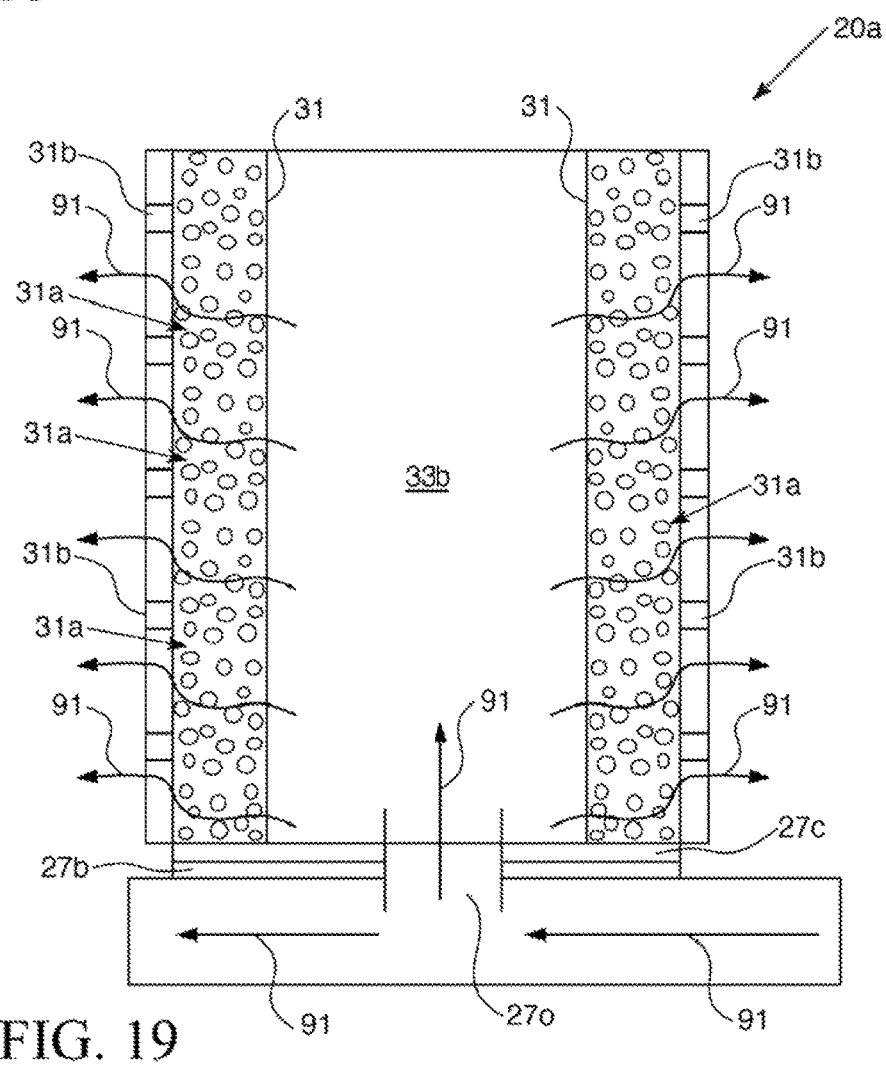
FIG. 19 is a block diagram schematic fragmentary view of a disc sector 20a of a disc 20b of the array 20 of spaced apart discs 20b of the first exemplary embodiment of the filtration device that illustrates an exemplary cleaning fluid flow path from a tube manifold 27 through a segment of a disc sector 20a closest to the tube manifold. It should be appreciated that the view of FIG. 2 only illustrates a small segment of the disc sector 20a and that the cleaning fluid flow 91 can pass throughout the remaining part of the inner space of the disc sector 20a between filter elements 31 and pass out of additional passageways 31a of the filter element 31.

As may best be seen from FIGS. 18-19, the flow of backwash fluid 91 from the backwash mechanism 15 can be fed to the discs 20*b* of the filtration device 10 via a backwash fluid conduit 89 that connects the backwash mechanism tank 83 to the tube manifolds 27. The flow of backwash fluid 91 can pass from the backwash fluid conduit 89 to the tube manifolds 27 and pass through the tube manifolds 27 for being fed into the disc sectors 20*a* of the discs 20*b* via the tube manifold openings 27*a* of the tube manifolds 27 that are in fluid communication with inner spaces 33*b* of the frames 33 of the disc sectors 20*a* of the discs 20*b*.

As may best be appreciated from FIG. 19, the flow of backwash fluid 91 can pass through the tube manifolds 27 and into the frame elements 20*a* of the discs 20*b* to fill the inner space 33*b* with fluid for being passed out of the passageways 31*a* of the filter elements 31. This flow of the backwash fluid 91 can help clean the passageways 31*a* and filter elements 31 to remove solid particulate material, grime, or other material from the passageways 31*a* to help clean the filter elements and improve the operational capacity of the filter elements 31 and disc sectors 20*a*.

The flow of the backwash fluid 91 can be at a pressure that is significantly higher than pressures used in conventional backflow operations of a filtration device. For instance, the pressure of the flow of the backwash fluid 91 can be above 2 bar or in the range of 1-10 bar (100 kilopascals (kPa) to 1,000 kPa). In some embodiments, the flow of the backwash fluid 91 can be at a pressure of above 2 bar (200 kPa) to a pressure of 5 bar (500 kPa). In some preferred embodiments, the flow of the backwash fluid 91 can be at a pressure of more than 2 bar (200 kPa) to a pressure of 3 bar (300 kPa), 4 bar (400 k Pa), 5 bar (500 kPa), 6 bar (600 kPa), 7 bar (700 kPa), 8 bar (800 kPa), 9 bar (900 kPa) or 10 bar (1,000 kPa). This high pressure can be accommodated, at least in part, due to the utilization of the seal arrangement that can include an elastomeric annular gasket 27b and gasket attachment plate 27c as discussed herein to help seal the tube manifold interfaces between the outlet conduits 27o and the tube manifolds 27.

Further, the liquid of the backwash fluid 91 can include liquid water, a mixture of water and other chemicals, or a liquid mixture. For instance the liquid of the backwash fluid 91 can include just liquid water or liquid water mixed with nitric acid, oxalic, hypochlorite, sodium hydroxide, chelating agents, and/or a detergent. The use of a two phase backwash fluid (e.g. use of gas entrained with liquid as the backwash fluid 91) can provide effective operational wash at very high pressures (e.g. up to 10 bar) that can pulse due to the turbulent flow of the fluid and the mixture of gas and liquid of the fluid.

During backwash operations, the filtration device 10 may or may not be operated for collecting slurry from the slurry bath 14 for creating filter cakes that are subsequently removed via discharge chute 13. For full backwash operations, the slurry bath 14 can be drained of slurry via a drain of the slurry bath. This downtime from backwash operations reduces the output capacity of the filtration device as the device is not operating to collect desired solid particulates while it is undergoing backwash operations. In embodiments of the filtration device that utilize the coated filter element 31, and scrapers 41 that directly contact the filter element 31 for filter cake removal, the filter element can be cleaned more effectively and fully than conventional devices. For such embodiments, there may be a reduced need for full backwash operations. Such embodiments may utilize full backwash operations at a much lower frequency, which can greatly improve performance and output of the filtration device 10 by reducing its downtime for backwash operations.

The downtime of the filtration device 10 can be further reduced (or also reduced) by use of the slurry bath as the liquid supply for backwash operations. In such embodiments, the backwash mechanism can be configured to be utilized in a backwash operation for a pre-selected backwash operation time period (e.g. 5-10 seconds) at a pre-selected backwash operation time interval (e.g. a backwash operation of 5-10 seconds occurs every 4-28 hours of operation). For such an operation, the slurry bath 14 may not need to be drained due to the use of the slurry liquid as part of the backwash fluid flow 91. The overall downtime of the filtration device 10 can be quite minimal for such embodiments as operations may only be paused for a short period of time (e.g. less than 10 seconds or less than 20 seconds) every time a backwash operation is to be performed. This is a significant improvement over conventional devices in which a slurry bath must be drained and subsequently refilled before operations can commence, which can often require a significant downtime duration of 1-2 hours multiple times per day.

In yet other embodiments, this same advantage of acceptable slurry bath dilution without requiring draining of the slurry bath can be provided even when the liquid source 84 is not the slurry bath 14. For instance, for backwash operations in which the backwash operation only occurs for a relatively small time periodically (e.g. 5-10 seconds or less than 10 seconds every 8-24 hours), there may be minimal dilution of the slurry bath from the backwash operations. This can permit the backwash operation to occur without draining of the slurry bath as the backwash operation may be able to occur while keeping the slurry of the slurry bath within a pre-selected concentration level and/or specific gravity level.

Further, embodiments of the backwash mechanism 15 can provide a backwash fluid flow 91 that includes mixture of gas and liquid (e.g. air entrained within liquid). This flow can be at relatively high pressures and can be at a turbulent rate of flow of fluid. Such a flow of backwash fluid provides a significant improvement in backwash cleaning operations. Additionally, the turbulent flow of backwash fluid in the backwash fluid flow 91 can pulse and vibrate when it enters and/or passes through the inner spaces 33b of the frames 33 and passes out of the passageways 31a of the filter element of the disc sectors 20a of the discs 20b. The pulsation and vibration of this turbulent flow can greatly enhance the cleaning of the backwash operation by providing additional forces via the vibration and/or pulsation for dislodging any grime or accumulated solid particulate material from the filter element 31 and/or within passageways 31a of the filter element 31.

It should be appreciated that the backwash mechanism 15 of the filtration device 10 can be connected to the frame 16 of the filtration device and/or supported by the frame 16. Some components of the backwash mechanism 15 can also (or alternatively) be positioned in a plant at another location and be connected to portions of the backwash mechanism that are attached to the frame of the filtration device. For instance, in some embodiments a liquid source 84 (e.g. a water source, a tank retaining water or liquid that includes water mixed with a pre-selected mix of chemicals to help facilitate cleaning or other backwash operation, etc.) can be positioned in a plant and a conduit can extend from that remote tank to the backwash mechanism tank 83. In other embodiments, the source of liquid can be a filtrate reservoir that is connected to the frame 16 and the liquid inlet conduit can connect the filtrate reservoir to the backwash mechanism tank 83.

The backwash operations of the backwash mechanism 15 can also be utilized in conjunction with ultrasonic cleaning. For instance, transducers connected to the frame that are positionable in the slurry bath 14 can be activated at a pre-selected frequency or frequency range during operation so that filter elements are exposed to the ultrasonic forces when in the slurry bath. This can facilitate cleaning of the filter elements 31 during the dipping of the filter elements in the slurry bath. In some embodiments, the ultrasonic treatment provided via transducers can be provided for two minutes every 2 hours of operation of the filtration device's rotation of discs 20b to help avoid plugging of the filter elements 31 and/or frame internal spaces 33b of the disc sectors 20a and to help maintain full performance of the disc sectors 20a. In other embodiments, the ultrasonic treatment can be provided at other periodic ultrasonic treatment durations or frequencies while the filtration device rotates the discs 20b to separate solids from the slurry within the slurry bath via the collection of solids, formation of filter cake and feeding of filter cake to the discharge chute 13 to form substantially clean filtrate within the slurry bath 14 (e.g. an ultrasonic treatment can be provided for one minute every 1 hour, for 3 minutes every two hours, etc.).

Further, when the discs 20b of the filtration device 10 are undergoing a cleaning cycle in which the slurry bath is filled with a cleaning fluid, the ultrasonic transducers can be activated at the pre-selected frequency or frequency range while backwash fluid is passing through the tube manifolds 27 and into the filter elements 31 to facilitate cleaning of the frames 33 and filter elements 31. In some embodiments, the pre-selected frequency can be within the range of 10 kHz to 80 kHz or 80 kHz to 200 kHz.

Heat can also be applied to the slurry bath during ultrasonic applications. The heat can be applied by at least one heating element attached to the slurry bath that can be heated via electricity or other heating mechanism. In some embodiments, the heating can be provided by feeding heated gas (e.g. heated air) into the slurry bath 14 area of the filtration device, which can facilitate sufficient heating when used in conjunction with hood 26 in some embodiments. In some embodiments, heat can optionally be provided in conjunction with a backwash operation as well even when those operations do not also a simultaneously provided ultrasonic treatment.

In some situations, disc sectors 20*a* can become worn or plugged from significant use that they may require significant additional cleaning. In such situations, the original disc sectors 20*a* can be removed and sent to a cleaning facility. At the cleaning facility, the disc sectors can be submerged in a cleaning fluid and undergo ultrasonic treatment as well as other cleaning (e.g. the cleaning fluid of the bath may have a particular mix of chemicals to facilitate cleaning, etc.). The disc sectors being cleaned can be exposed to heat and pressurized flows of fluid for this cleaning at the cleaning facility. The cleaning facility can be off-site of a plant having the filtration system 1 or filtration device 10 in some situations. In other situations, a plant may have its own dedicated cleaning facility. When original disc sectors 20*a* are undergoing such cleaning, the filtration device 10 can be shut down. Alternatively, the original disc sectors 20*a* that are removed can be replaced by installation of new disc sectors 20*a* to form discs 20*b* so that the filtration device 10 can be utilized while the original disc sectors undergo cleaning. The cleaned original disc sectors 20*a* can then be reused to replace other disc sectors that may become sufficiently plugged or dirty that they require cleaning in a cleaning facility.

In some embodiments, the filtration device 10 can be configured so that the backwash mechanism 15 is activate to perform a backwash operation during each revolution of the discs 20*b*. For example, the backwash operation can be controlled so that each disc sector 20*a* receives backwash fluid from the tube manifold so that the backwash fluid passed out of the inner space 33*b* of the frame to which the filter elements of the disc sector are attached and pass out of the filter elements 31 attached to the frame 33 of the disc sector 20*a* when the disc sector enters the scraping phase of a revolution. The backwash fluid may be output from the backwash mechanism 15 so that it is no longer fed to the disc sector 20*a* when that disc sector exits the scraping phase of a revolution at another time (e.g. just before it exits the scraping phase or soon after the disc sector is inserted into the slurry bath 14 during the slurry insertion phase of a revolution). The backwash operation may occur simultaneously with the scraping and may help improve the efficiency of the filter cake removal. In some embodiments, the extent of this simultaneous backwash and scraping may occur for a portion of each revolution of a disc sector 20*a* of the disc 20*b* (e.g. each disc sector 20*a* may undergo the simultaneous backwash and scraping for 30° of the 360° in a single revolution, 25° of the 360° in a single revolution, 45° of 360° in a single revolution, 15°-45° of the 360° in a single revolution, etc.).

Referring to FIG. 29, a connection between the backwash mechanism 15 and tube manifolds 27 can be facilitated via a master valve assembly 89*mv*. The end portion 27*e* of the tube manifolds 27 connected to the master valve assembly 89*mv* via a tube manifold attachment plate 89*tap*. The end portions 27*e* of the tube manifolds 27 can be flexible hose connector segments for embodiments that may utilize a dip mechanism or can alternatively be a distal end portion of a tube body of the manifold tube 27. A distal opening 89*to* of the tube manifold attachment plate 89*tap* can be aligned with an opening in fluid communication with an inner conduit of the tube manifold 27 through which fluid is passable into or out of the tube manifolds 27. The tube manifold attachment plate 89*tap* can be attached to a master valve wear plate 89*wp* via a master valve cover plate 89*mvc* so that the tube manifold attachment plate 89*tap* is positioned between the tube manifolds 27 and the wear plate 89*wp*. Wear plate openings 89*o* of the wear plate can be aligned with openings of the tube manifold attachment plate so that fluid is passable between the tube manifolds 27 through tube manifold attachment plate 89*tap*, the wear plate 89*wp*, and the master valve cover plate 89*mvc*.

Different tube manifolds 27 can have different fluid flows passed therethrough (e.g. some operate under vacuum while others have backwash fluid pass therethrough, etc.). For example, the wear plate openings 89*o* can be alignable with one or more backflow fluid conduits and/or at least one vacuum conduit that may extend to the master valve 89*mv* so that backwash fluid and/or a vacuum can be applied to different tube manifolds at different times. The master valve 89*mv* can include blocking elements 89*b* positionable in the wear plate openings 89*o* to block some of the wear plate openings 89*o* to isolate at least one opening from other openings 89*o* of the wear plate 89*wp* so the one or more isolated openings can have pressurized fluid passed therethrough for backwash operations while other openings can be in communication with a vacuum driving device (e.g. pump, blower, etc.) that creates a vacuum for driving a vacuum flow 92 out of the tube manifolds and through the master valve assembly while the backwash fluid is passed from the master valve assembly 89*mv* to at least one tube manifold in a backwash fluid flow 91 via the at least one isolated opening of the wear plate 89*wp*.

Figure 31:
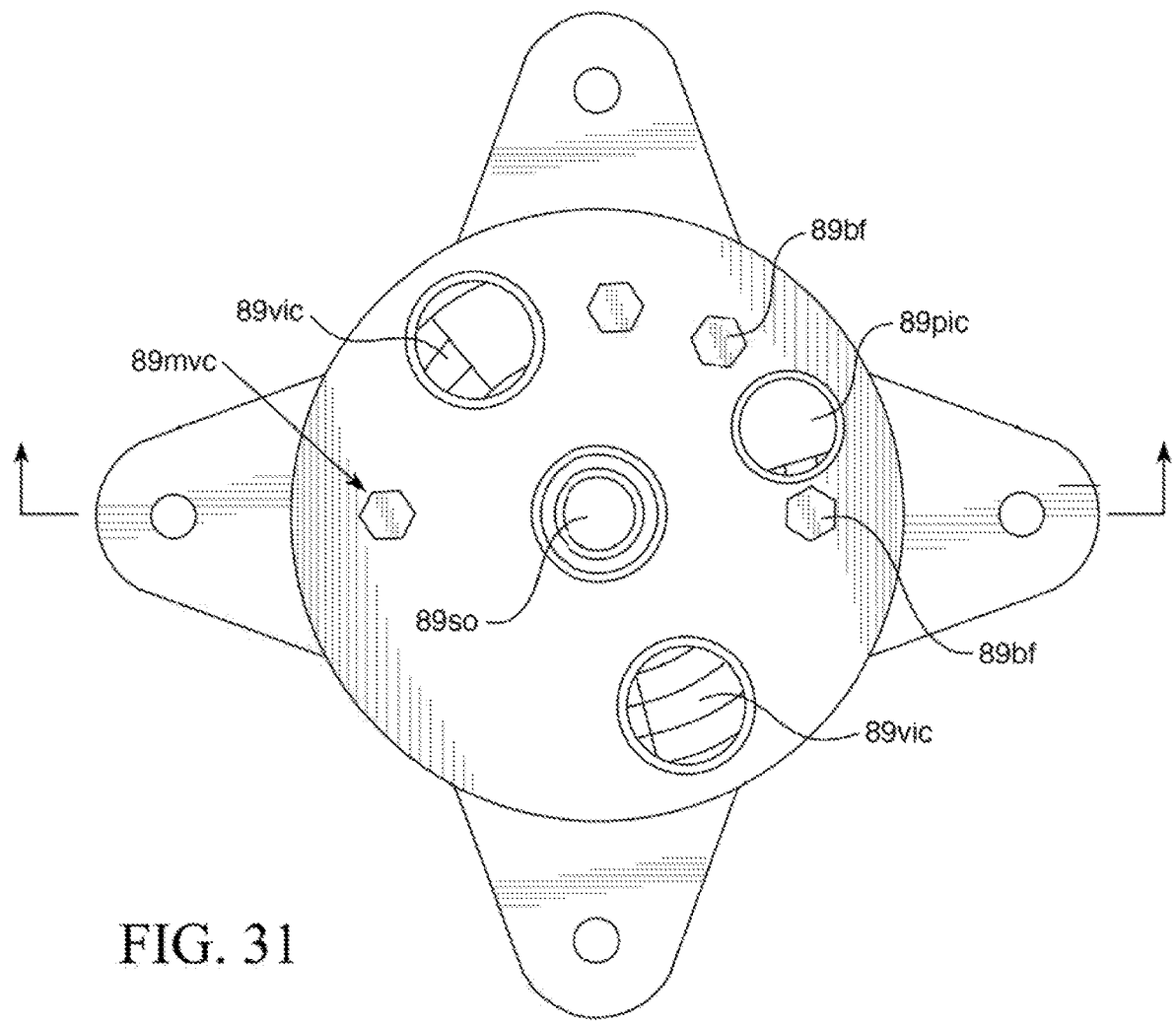
FIG. 31 is an elevational view of an exemplary embodiment of the master valve cover plate 89mvc of the master valve assembly 89mv shown in FIG. 29.
Figure 32:
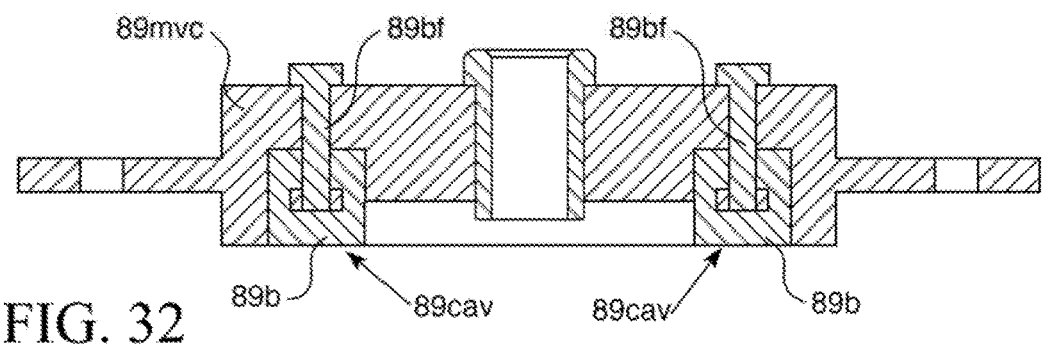
FIG. 32 is a cross-sectional view of the master valve cover plate 89mvc shown in FIG. 31.

As may best be appreciated from FIGS. 29, 31, and 32, the master valve assembly 89*mv* can include a master valve cover plate 89*mvc* that is attached to the frame 16 so that the master valve cover plate 89*mvc* does not rotate when the tube manifolds 27 and discs 20*b* are rotated. The master valve cover plate 89*mvc* can include a central opening 89*so* to receive an end of shaft 25 so that the shaft 25 can rotate relative to the frame 16 and the master valve cover plate 89*mvc* via the drive mechanism 18.

The master valve cover plate 89*mvc* can also have openings for retaining blocking element fasteners 89*bf*. These openings can be threaded so that the blocking element fasteners 89*bf* can be screwed into the body of the master valve cover plate for attachment with blocking elements 89*b* to position the blocking elements 89*b* in stationary positions between the master valve cover plate 89*mvc* and the wear plate 89*wp*.

The master valve cover plate 89*mvc* can also include openings for fluid connections with at least one vacuum driving mechanism 99 (e.g. a pump, fan, etc.) and the backflow mechanism 15. For example, the master valve cover plate 89*mvc* can have a first vacuum port opening 89*vic* and a second vacuum port opening 89*vic* and also have a first backwash fluid port opening 89*pic*. The first backwash fluid port opening 89*pic* can be connected to backwash fluid conduit 89 to receive backwash fluid from the backwash mechanism 15, as can be appreciated from FIGS. 34 and 35, for example.

The first vacuum port opening 89*vic* can be attached to a first vacuum conduit 94 that fluidly connects the master valve cover plate 89*mvc* to at least one vacuum driving mechanism 99. The second vacuum port opening 89*vic* can be attached to a second vacuum conduit 94 that fluidly connects the master valve cover plate 89*mvc* to at least one vacuum driving mechanism 99. In some embodiments, each vacuum conduit 94 can connect a respective vacuum port opening 89*vic* to a respective vacuum drive mechanism 99. For example, as shown in broken line in FIG. 35, the first vacuum conduit 94 can connect the first vacuum port opening 89*vic* to a first vacuum drive mechanism 99*a* and the second vacuum conduit 94 can connect the second vacuum port opening 89*vic* to a second vacuum drive mechanism 99*b*. In other embodiments, each vacuum conduit 94 can connect the vacuum port openings 89*vic* to the same vacuum drive mechanism 99.

The master valve cover plate 89*mvc* can be coupled to the wear plate 89*wp* and/or the tube manifold attachment plate 89*tap* so that the wear plate 89*wp* and the tube manifold attachment plate 89*tap* are rotational relative to the master valve cover plate 89*mvc*. The wear plate 89*wp* can be positioned between the tube manifold attachment plate 89*tap* and the master valve cover plate 89*mvc*.

Blocking elements 89*b* can be positioned at one or more fixed locations within a cavity 89*cav* at least partially defined between the master valve cover plate 89*mvc* and the wear plate 89*wp* to block wear plate openings 89*o* that may be moved into alignment with those blocking elements 89*b* during a revolution of the tube manifolds 27 (and wear plate 89*wp* and tube manifold attachment plate 89*tap* attached to the tube manifolds 27 via a disc attachment assembly configured to be rotated for rotation of the discs 20*b*). The positioning of the one or more blocking elements 89*b* can define different isolated chambers 90 within the cavity 89*cav* so that a vacuum can be applied for vacuum flows 92 to be passed out of the tube manifolds 27 toward the vacuum driving mechanism 99 in one portion of the cavity 89*cav* via a first chamber and a backwash fluid flow 91 is passable into at least one tube manifold 27 via the second isolated chamber defined within the cavity 89*cav*.

Figure 33:
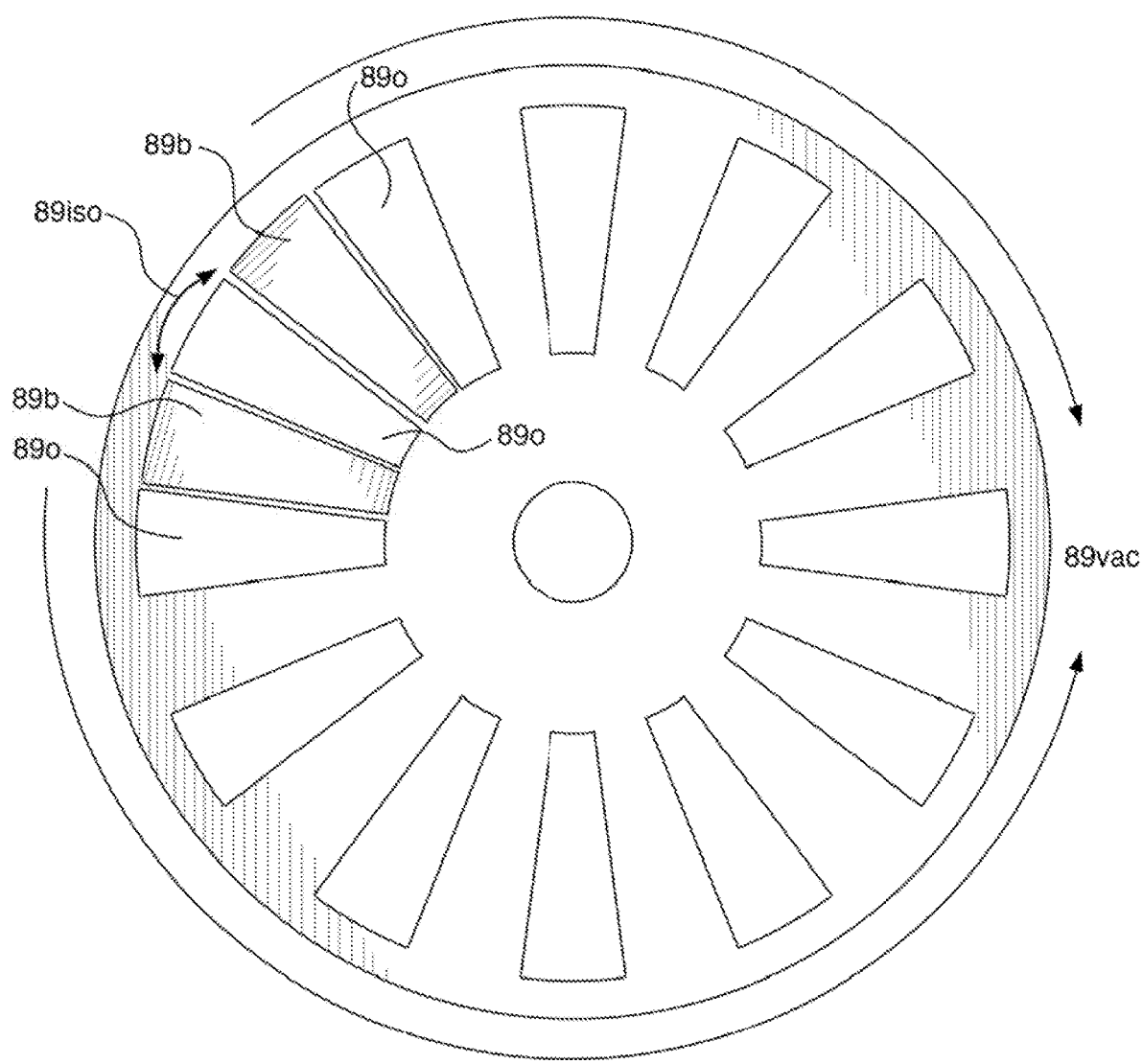
FIG. 33 is a schematic illustration of exemplary blocking element positions relative to wear plate openings 89o in a first rotational position along a rotational path of a single revolution that can be utilized in embodiments of the master valve assembly 89mv shown in FIG. 29.
Figure 34:
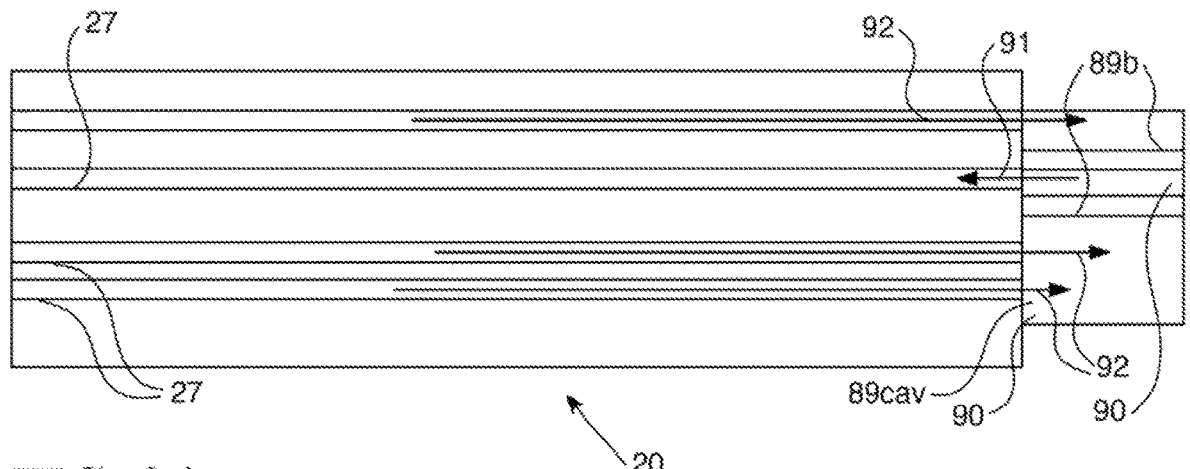
FIG. 34 is a schematic block diagram illustrating exemplary vacuum and backwash fluid flows 92 and 91 that can be provided simultaneously during operation of embodiments of the filtration device 10 via use of an embodiment of the master valve assembly 89*mv*.
Figure 35:
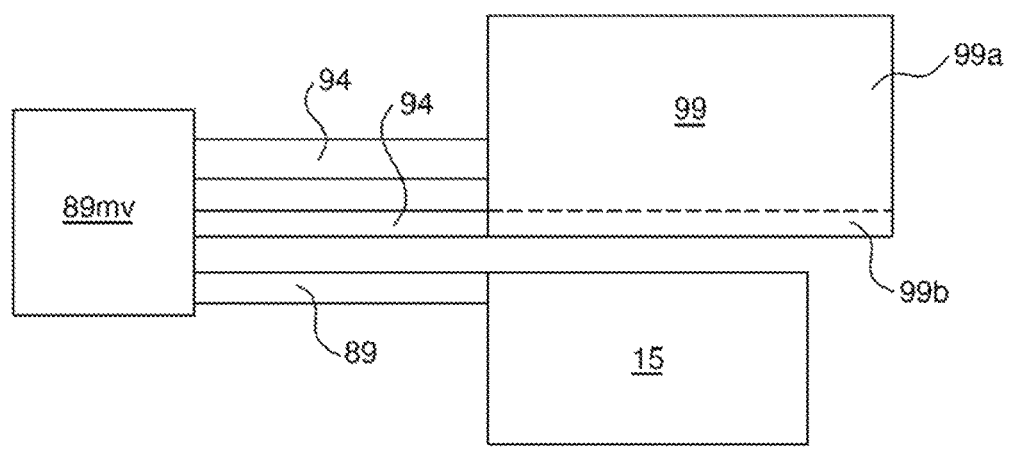
FIG. 35 is a schematic block diagram illustrating an exemplary connection of the master valve assembly 89*mv* with the backwash mechanism 15 and at least one vacuum driving mechanism 99 (e.g. at least one pump, blower, fan, etc.). The wear plate and tube manifold attachment plates 89*tap* of the master valve assembly 89*mv* are not particularly illustrated in FIG. 35 to better illustrate the exemplary vacuum and backwash flows.
Figure 36:
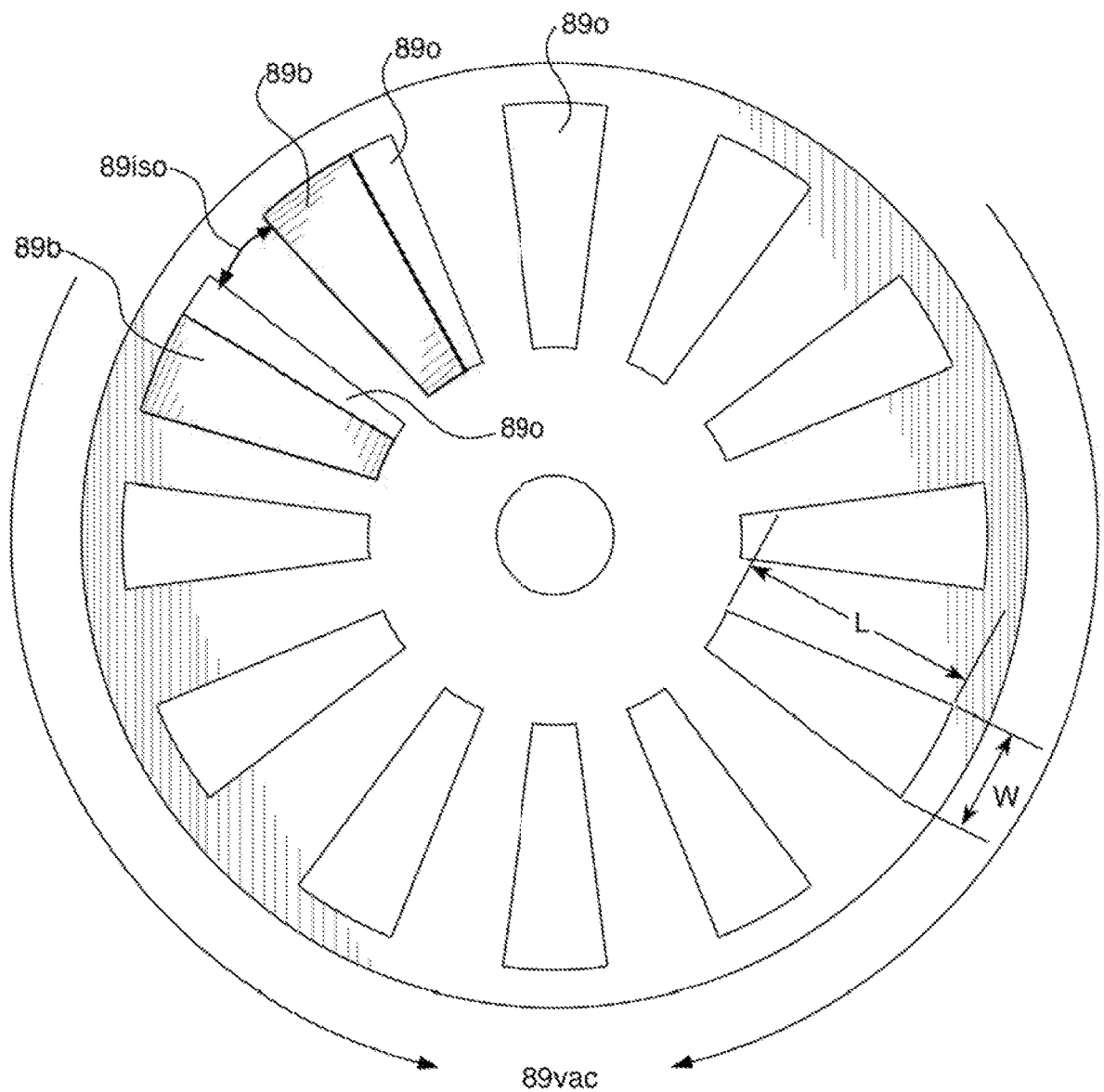
FIG. 36 is a schematic illustration similar to FIG. 33 illustrating exemplary blocking element positions relative to wear plate openings 89*o* in a second rotational position of a rotational path of a single revolution that can be utilized in embodiments of the master valve assembly 89*mv* shown in FIG. 29.
Figure 37:
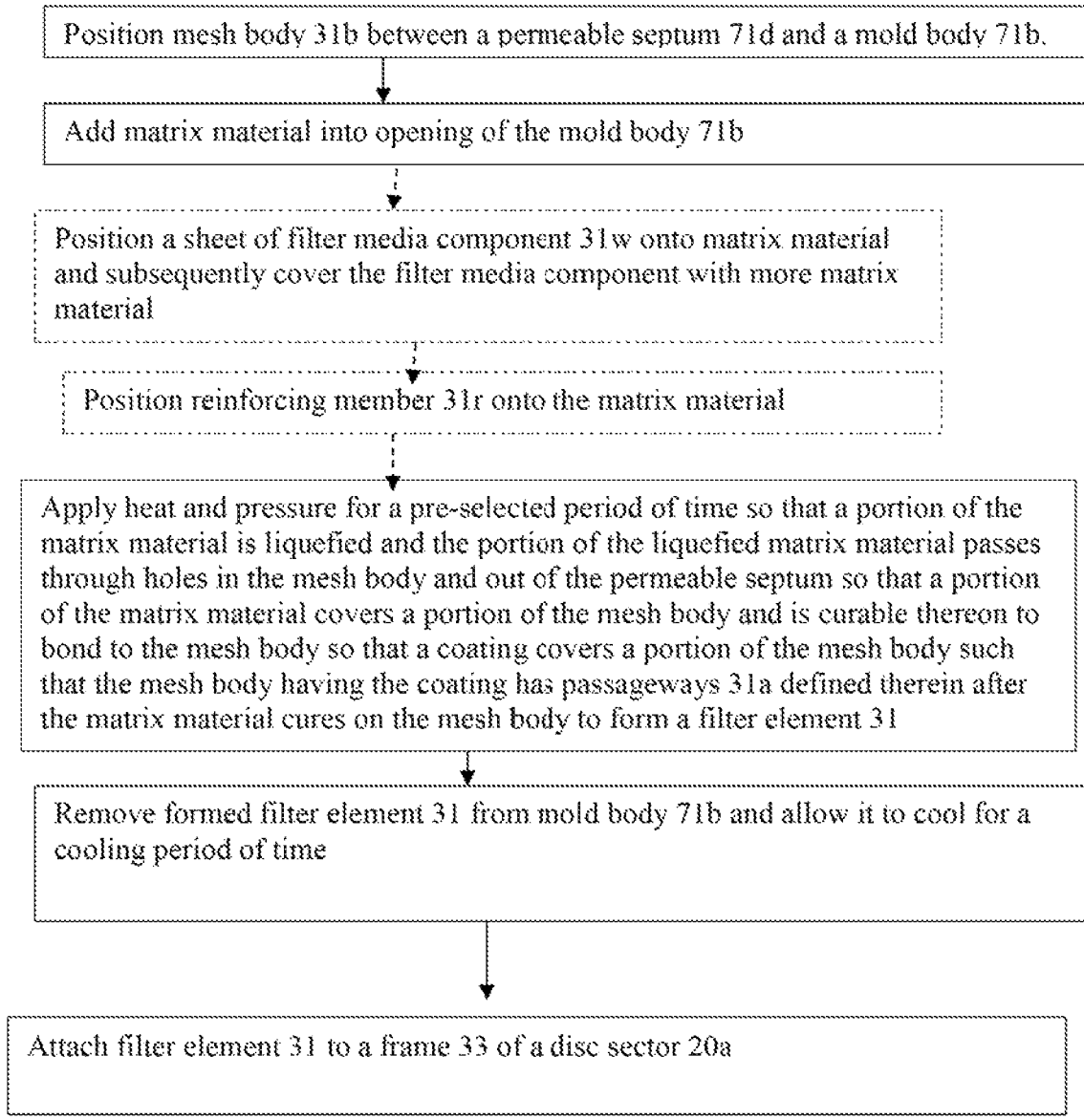
FIG. 37 is a flow chart illustrating an exemplary embodiment of a method of making a filter element 31 for a disc sector 20*a*. Some optional steps in this exemplary embodiment of the method are shown in broken line in FIG. 37.

Exemplary positioning of blocking elements 89*b* may be appreciated from FIGS. 33 and 36, in addition to FIGS. 29 and 31-32 and 34. With reference to FIG. 33, the block elements 89*b* can be positioned to fill certain regions of the cavity 89*cav* to define different isolated chambers 90 therein. The positioning of the blocking elements 89*b* can be positioned so that during rotation of the wear plate 89*wp* and tube manifold attachment plate 89*tap* relative to the blocking elements 89*b* and the master valve cover plate 89*mvc*, different openings 89*o* aligned with different conduits of tube manifolds 27 pass through the different isolated chambers during a revolution of a disc 20. The blocking elements 89*b* can isolate a second chamber 90 from a first chamber 90 within the cavity 89*cav* so that a backwash fluid flow 91 can be passed into the cavity 89*cav* via the backwash fluid conduit 89 connected to the first backwash fluid port opening 89*pic*. When a wear plate opening 89*o* is aligned with the second chamber 90, the backwash fluid 89 passes into the tube manifolds 27. As that wear plate opening 89*o* aligned with a tube manifold conduit continues to rotate along a single revolution, it can move out of alignment with the second chamber 90 and into alignment with the first chamber 90 so that a vacuum is applied and a vacuum flow 92 is generated to pull fluid out of the tube manifold 27 to which that opening 89*o* is aligned and into the vacuum conduits 94 connected to the vacuum port openings 89*vic*.

During a revolution of the wear plate 89*wp* and tube manifolds 27, each wear plate opening 89*o* and tube manifold 27 to which that wear plate opening 89*o* is aligned can move along a full 360° rotational path that includes a backwash fluid segment 89*iso* and a vacuum segment 89*vac*. The backwash fluid segment 89*iso* can be the segment of the rotational path of a revolution that corresponds to the wear plate opening 89*o* being in fluid communication with the second isolated chamber 90. The vacuum segment 89*vac* of the rotational path of a single revolution can be the segment of the rotational path of the wear plate opening 89*o* that corresponds to the wear plate opening 89*o* being in fluid communication with the first chamber 90 that is isolated from the second chamber via blocking elements 89*b*.

It should be appreciated that there may be third and fourth segments to the rotational path of each wear plate opening 89*o* (and tube manifold to which that opening is aligned) in a single revolution. The third and fourth segments can correspond to portions of the rotational path in which the wear plate opening 89*o* is blocked via respective first and second blocking elements 89*b* that can be positioned to define the isolated first and second chambers 90. When the wear plate openings 89*o* are fully blocked, no fluid may be passed into our out of the openings 89*o* and a flow of fluid within the tube manifolds may be slowed or stopped due to the temporary blockage that occurs.

It should also be appreciated that during a rotation, more than one wear plate opening 89*o* can be in fluid communication with the second isolated chamber 90 and that multiple wear plate openings 89*o* can be in fluid communication with the first chamber 90 for vacuum flows 92 at any one time. For example, FIG. 36 illustrates an example of such positioning of wear plate openings 89*o* that can occur during a revolution of the tube manifolds 27, wear plate 89*wp* and tube manifold attachment plate 89*tap*. As may best be seen from FIG. 36, as a first wear plate opening 89*o* is beginning to be moved out of the second isolated chamber 90 for being blocked by a blocking element 89*b*, a second wear plate opening 89*o* is being entered into the second chamber 90. Both the first and second wear plate openings 89*o* are partially blocked via blocking elements 89*b* that are positioned on opposite sides of the second chamber 90 to define that chamber and are also in fluid communication with the second chamber 90 during the backwash fluid segment 89*iso* of the revolution of these wear plate openings 89*o* and the respective tube manifolds 27 of the tube manifold assembly to which these openings 89*o* are aligned. As the wear plate continues to rotate relative to the blocking elements 89*b* and the master valve cover plate 89*mvc*, the second opening will be in a position shown in FIG. 33 and the first opening that is shown in FIG. 36 as moving out of the second chamber will be in a position that is fully blocked by a blocking element. As rotation along the single revolution continues, the first opening 89*o* will enter the first chamber and be exposed to a vacuum for vacuum flow 92 to be generated within the tube manifold aligned with that first wear plate opening 89*o*. The first opening 89*o* will be positioned in fluid communication with the first chamber for the vacuum segment 89*vac* segment of the rotational path of a revolution. It will then be blocked by a first blocking element that defines the second chamber and then begin to enter the second chamber as shown in FIG. 36 as it begins the backwash fluid segment 89*iso* segment of the rotational path.

The second wear plate opening 89*o* (as well as the other wear plate openings 89*o* and the respective tube manifold aligned with each wear plate opening 89*o*) will follow a similar path as a revolution continues by being moved out of fluid communication with the second chamber 90, being blocked via a blocking element, and subsequently entering the first chamber 90 for the vacuum segment 89*vac* of the revolution. As each wear plate opening 89*o* and tube manifold to which it is aligned continues to move along the rotational path, it can again be blocked by a blocking element 89*b* before being brought into fluid communication with the second chamber 90 for the backwash fluid segment 89*iso* of the revolution.

It should be appreciated that the extent of the rotational path at which each wear plate opening 89*o* is blocked can reduce efficiency of the operation of the vacuum flows 92 and backwash fluid flow 91 that may be provided simultaneously during rotation of the discs 20*b*. I have determined that the size and shape of the blocking elements 89*b* and wear plate openings 89*o* (as well as tube manifold end conduit portions and tube manifold attachment plate 89*tap* openings in which tube manifold end portions 27*e* or hose connections 62 are positioned) can be designed to minimize the extent of a revolution in which the blockage occurs so that a larger portion of the backwash fluid segment 89*iso* and vacuum segment 89*vac* of a revolution are utilized without blockage.

For instance, the wear plate openings 89*o* can be defined so that a first side of each of the openings 89*o* is polygonaly shaped to have a surface area that is larger than a surface area of the tube manifold attachment plate opening 89*tap* to which it is aligned for fluidly connecting the tube manifold 27 to the cavity 89*cav* having the first and second chambers 90 of the master valve assembly 89*mv*. The shaping of the openings 89*o* at the first side 89*wpfs* of the wear plate 89*wp* can be configured so the openings 89*o* to extend along a length that extends along a radius or width of the wear plate 89*o* so that the openings are not circular and are relatively narrow (e.g. longer along their length L as compared to their width W). The width of each opening 89*o* can taper so that the width W of the opening 89*o* is smaller near the center region of the wear plate 89*wp* and is larger near the outer region of the wear plate 89 at the first side 89*wpfs* of the wear plate 89 *wp* that can face toward the maser valve cover plate 89*mvc* and away from the tube manifold attachment plate 89*tap*. Each blocking element 89*b* can have a shape that can matingly correspond with the first sides of the wear plate openings 89*o* so the blocking element 89*b* can fully block and close that openings when each opening 89*o* is fully aligned with the blocking element (as can be seen from FIG. 33, for example).

Each blocking element 89*b* can have a fastener receiving opening defined on a side of the blocking element that is opposite the side that faces toward the wear plate 89*wp*. A distal end of a blocking element fastener 89*bf* can be positioned in this fastener receiving opening for attachment of the blocking element to the master valve cover plate 89*mvc* for fixing the position of the blocking element 89*b*. In some embodiments, the blocking element 89*b* can have a threaded opening or hole for retaining the fastener. In other embodiments, there may be a nut or other element configured to matingly interlock with the fastener 89*bf* to facilitate receipt and attachment between the fastener 89*bf* and the blocking element 89*b* for attachment of the blocking element 89*b* to the master valve cover plate 89*mvc*.

The wear plate openings 89*o* can be defined so that they have a different shape at the second side of the wear plate 89*wp* that faces toward the tube manifold attachment plate 89*tap* for alignment with inlet openings of the tube manifolds 27 or hose connectors 62 of the tube manifolds 27. The openings 89*o* can be shaped polygonaly in some embodiments and can taper so that the wider segment of the opening is opposite a narrower segment of the opening as the opening extends from a first side 89*wpfs* of the wear plate 89*wp* that can face the master valve cover plate 89*mvc* to a second side 89*wpss* of the wear plate 89*wp* that can face toward the tube manifold attachment plate 89*tap*. The wider segment of each opening 89*o* at the first side 89*wpfs* of the wear plate 89*wp* can have a larger surface area that is greater than the surface area of the circular shape of the opening 89*o* at the second side 89*wpss* of the wear plate 89*wp*. In other embodiments, the surface areas of the opening 89*o* at the first and second sides of the wear plate 89*wp* can be the same, but the shape of the opening may change from a more polygonal shape at the first side 89*wpfs* to a circular shape or different polygonal shape at the second side 89*wpss* of the wear plate 89*wp*.

FIG. 30 illustrates an example of such a tapered wear plate opening 89*o* that is tapered as the opening extends through the wear plate 89*wp*. The wider segment of the opening can be located farthest from the tube manifold attachment plate 89*tap* in some embodiments to help ensure that fluid can be easily passed through the wear plate openings 89*o* toward or from the tube manifolds 27 and the narrower segment can be shaped to match or better align with an inlet opening of the tube manifold attachment plate 89*tap* to which the opening 89*o* is aligned. It is contemplated that this narrowing of each opening 89*o* that reduces the surface area of the opening 89*o* at the second side of the opening 89*o* may provide a venturi effect for a backwash flow 91 of fluid passed out of the tube manifolds 27. In other embodiments, it is contemplated that the openings 89*o* can be structured so that a narrower segment of the opening 89*o* having a less surface area at the first side of the wear plate 89*wp* can be located closest to the master valve cover plate 89*mvc* and/or blocking elements 89*b* to provide a venturi effect for fluid as it is passed out of the tube manifolds 27 (e.g. a vacuum flow 92).

It should be appreciated that embodiments of the master valve assembly 89*mv* can facilitate operation of the filtration device 10 so that as the discs 20*b* are rotated via rotational assembly that can include shaft 25 connected to drive mechanism 18 for rotation of the discs 20*b* so that backwash fluid flow 91 and vacuum fluid flows 92 can be applied simultaneously to different tube manifolds 27 and disc sectors 20*a* during a revolution of the discs 20*b*. Each tube manifold can be in fluid communication with an isolated chamber 90 within a cavity 89*cav* of the master valve assembly 89*mv* during a backwash fluid segment of the rotational path of a revolution. This isolated chamber 90 can be defined by positions of blocking elements 89*b* so that the backwash fluid segment 89*iso* of the revolution corresponds with the scraping phase of a revolution. As the tube manifold assembly rotates, each tube manifold 27 can be positioned so it is in fluid communication with the backwash fluid isolated chamber 90 for receipt of backwash fluid flow 91 from the backwash mechanism. The backwash fluid flow 91 can pass through the tube manifolds 27, into the inner space of frames 33 of the disc sectors 20*a* attached to the tube manifold 27, and pass out of the passageways 31*a* of the filter elements during at least a portion of the scraping phase of the revolution for the tube manifold 27 and the disc sectors 20*a* attached thereto. When the disc sectors 20*a* attached to the tube manifold 27 is about to enter the slurry bath or after they have been inserted into the slurry bath, the tube manifold 27 can no longer be in fluid communication with the backwash fluid chamber 90 of the master valve assembly cavity 89*cav*. Due to the rotational motion of the tube manifold 27, wear plate 89*wp* and tube manifold attachment plate 89*tap*, the tube manifold can have moved out of fluid communication with the backwash fluid chamber 90 and moved into fluid communication with a vacuum fluid chamber 90 of the cavity 89*cav* defined at least in part by the stationary blocking elements 89*b*. Each tube manifold can stay in fluid communication with the vacuum fluid chamber 90 of the cavity 89*cav* for a vacuum segment of the revolution. This can correspond to the slurry insertion phase, optional spraying phase, and draying phase of the revolution or at least portions of these phases.

Each tube manifold and the disc sectors 20*a* attached to the tube manifold 27 can also pass through intermediate blocked zones in which the tube manifold 27 is blocked from being in fluid communication with the chambers 90 via the blocking elements 89*b*. These blocked segments of the revolution can occur near the interface of the drying and scraping phases of a revolution and near the interface of the insertion and scraping phases of a revolution.

For an exemplary example of this operation, an embodiment of the filtration device that utilizes three disc sectors 20*a* to form a disc 20*b* can have three tube manifolds, one for each disc sector 20*a* of the disc 20*b*. The first tube manifold 27 can be attached to the first disc sector 20*a* of each disc 20*b*, the second tube manifold 27 can be attached to the second disc sector 20*a* of each disc 20*b* and the third tube manifold 27 can be attached to the third disc sector 20*a* of each disc 20*b*. For disc configurations in which there are more disc sectors than three to form a disc, there may be a similar additional number of tube manifolds. For embodiments in which there are more than one disc 20*b*, each disc 20*b* can have first disc sectors 20, second disc sectors 20*a*, third disc sectors 20*a*, etc. connected to a respective one of the tube manifolds (e.g. first disc sectors 20*a* are attached to the first tube manifold, second disc sectors 20*a* are attached to the second tube manifold, etc.).

During a rotation of the disc(s) 20*b*, the first tube manifold and the first disc sector(s) 20*a* attached to the first tube manifold 27 can be in fluid communication with a first backwash fluid chamber of the cavity 89*cav* during their scraping phase of a revolution and then be in fluid communication with the second vacuum chamber 90 of the cavity 89 during at least their drying phase of the revolution. During the rotation of the disc(s) 20*b*, the second tube manifold and the second disc sector(s) 20*a* attached to the second tube manifold 27 can be in fluid communication with a first backwash fluid chamber of the cavity 89*cav* during their scraping phase of a revolution and then be in fluid communication with the second vacuum chamber 90 of the cavity 89 during at least their drying phase of the revolution. During the rotation of the disc(s) 20*b*, the third tube manifold and the third disc sector(s) 20*a* attached to the third tube manifold 27 can be in fluid communication with a first backwash fluid chamber of the cavity 89*cav* during their scraping phase of a revolution and then be in fluid communication with the second vacuum chamber 90 of the cavity 89 during at least their drying phase of the revolution. This rotational path of motion between the chambers 90 can occur for each revolution during rotation of the discs 20*b*.

For example, the first, second, and third tube manifolds can be arranged so that when the first tube manifold is in its scraping phase, the second tube manifold is in the drying phase and the third tube manifold is in the slurry insertion phase for each revolution. When the first tube manifold is rotated during the revolution so the disc sector(s) 20*a* to which the tube manifold 27 is attached is inserted into the slurry via the slurry insertion phase, the second tube manifold 27 and its disc sector(s) 20*a* can be in the scarping phase and the third tube manifold 27 and its disc sectors 20(*a*) can be in the drying phase. When the first tube manifold is rotated during the revolution so its disc sector(s) 20*a* are in the drying phase, the second tube manifold 27 and its disc sector(s) can be in the slurry insertion phase and the third tube manifold 27 and its disc sector(s) can be in the scraping phase.

Of course, this example using three tube manifolds in an exemplary arrangement is only to help provide a further example of operation of the backwash and vacuum operation of the filtration device. There can be more than three disc sectors 20*a* and more than three tube manifolds 27. As discussed herein there can be as many as twelve, twenty-four, or more than twenty-four tube manifolds that are each attached to respective disc sectors 20*a* of discs 20*b*. For such embodiments, each of the tube manifolds and its disc sector(s) would pass along a similar rotational positions during a revolution for each revolution of the discs 20*b*.

It should be appreciated that the number of blocking elements 89*b* and the number of isolated chambers 90 can be adjusted so blocking elements are arranged to define more than two isolated chambers 90 within the cavity 89*cav* of the master valve assembly 89*mv*. For example, multiple backflow fluid chambers can be connected to different segments of a backflow fluid conduit 89 for connection with backflow mechanism 15 to provide backflow fluid flows 91 at different discrete segments of a single revolution. There may also be more than one vacuum camber 90 defined in the cavity 89*cav* to similarly correspond to different vacuum segments of a revolution of discs 20*b*, their disc sectors 20*a*, and the tube manifolds 27 connected to respective disc sectors 20*a* of each disc 20*b* as the discs 20*b* are rotated about a horizontal rotational axis.

In yet other embodiments, the size and shape of the blocking elements can be configured to block the openings 89*b* for a pre-selected segment of a revolution to close off the opening(s) 89*o* during a continuous segment of the revolution. For example, in embodiments in which the filter elements 31 are cloth filter elements, the backwash fluid flow may be optionally not used. Instead, only a vacuum can be applied for a vacuum segment 89*vac* of the revolution. A second segment of the revolution corresponding to a scraping phase of the revolution can be blocked so that the filter elements are at atmospheric pressure or the pressure within the hood of the filtration device and no longer under a vacuum condition due to the presence and position of one or more blocking elements 89*b* within the cavity 89*cav*. The rapid change in pressure conditions caused by the blocking of the opening(s) 89*b* during a revolution can result in forcing particulates of the filter cake formed on the cloth filter elements 31 of the disc sectors 20*a* attached to the tube manifold(s) 27 that are aligned and in fluid communication with the blocked opening(s) 89*o* to jump off the cloth filter without requiring the use of a backwash fluid flow 91 (e.g. compressed air flow). For such embodiments, the blocking element(s) 89*b* can be positioned to coincide with the scraping phase of a revolution to help facilitate filter cake removal from the filter elements 31 for feeding the filter cake to the discharge chute 13.

In some embodiments, the master valve assembly 89*mv* can be configured so that blocking elements 89*b* are not utilized and the cavity 89*cav* is not defined. In such embodiments, the vacuum port opening(s) 89*vic* backwash fluid port opening(s) 89*pic* can define the chambers 90 that are alignable with the wear plate openings 89*o* so that body of the master valve cover plate 89*mvc* defines and isolates the chambers 90 without utilization of blocking elements 89*b* positioned in a common cavity 89*cav*.

The positioning of the vacuum driving mechanism(s) 99, backwash mechanism 15 and master valve assembly 89*mv* can be configured to avoid unnecessary bending or turning conduit paths to try and allow the flow paths for backwash fluid flows and vacuum flows to be as unimpeded as possible. For example, the conduits for the backwash fluid flows and vacuum flows can be arranged so allow for a substantial portion of the conduit pathway to extend linearly in some embodiments.

I have determined that embodiments of the master valve 89*mv* can reduce a dead area of vacuum filter equipment by providing for a larger portion of the filter area to be useful when isolating a single opening 89*o* for backwash fluid flow 91 from other openings 89*o* of the wear plate 89*wp* that can be utilized for application of a vacuum flow 92 to other tube manifolds 27 during a revolution. Such an arrangement can permit fluid to be pulled out of some disc sectors 20*a* of some tube manifolds via the vacuum flow 92 while some disc sectors 20*a* attached to a tube manifold 27 receive a backwash fluid flow 91 or other type of pressurized fluid flow. This can greatly enhance production by exposing the filter elements 31 of disc sectors 20*a* to a vacuum flow 92 during a slurry insertion and drying phases of a revolution while also exposing those filter elements 31 to backwash fluid flow 91 during a scraping phase of a revolution. The disc sectors 20*a* attached to different tube manifolds 27 can be exposed to each type of fluid flow during a single revolution selectively as the tube manifolds 27 rotate about a horizontal axis.

Embodiments of the master valve 89*mv* can also help allow for equal or greater useful pressure differential isolation that can allow for improved performance and allow for effective vacuum and backwash fluid applications that can occur simultaneously. For example, the backwash fluid segment 89*iso* of a revolution can account for 30°-45° of the 360° in a single revolution of a disc 20*b* and disc sectors 20*a* attached to the tube manifolds 27 in some embodiments. The vacuum segment 89*vac* of the revolution can be up to 300°-315° of the rotational path of a single revolution for such embodiments. The blocking phases in which blocking elements block fluid flow can make up 15° or less than 15° of the rotational path of a single revolution for such embodiments. This can provide greater control and more effective dewatering and cake drying as well as cake washing in cake washing spraying operations that may be utilized.

The use of blocking elements 89*b* for blocking at different rotational segments of a revolution to isolate at least one wear plate opening 89*o* that requires the blocking to block up a smaller sector of the wear plate 89 for isolating the at least one opening can also provide for a thinner filter cake formation and an improved drying of the filter cake by expanding the extent of the wear plate that is not blocked so that a further extent of a revolution can have a vacuum applied to facilitate drying etc. Further, this type of positioning of the blocking elements 89*b* can help provide for a more effective pressure and fluid flow for filter element cleaning and backwashing. This can be further enhanced with use of high pressure fluid flows (e.g. flows of up to 10 bar and, in some embodiments, over 10 bar) as can be facilitated by embodiments of the backwash mechanism and tube manifold/disc sector 33 attachment mechanisms discussed herein.

The master valve assembly 89*mv* can be adjusted to account for different uses of the filtration device 10. For example, the master valve assembly 89*mv* can be adjusted for use in an extensive cleaning phase that may occur after filtrate is formed in the slurry bath and subsequently drained from the bath and before a next batch of slurry is fed to the slurry bath for filtering operations to form substantially clean filtrate by removing the solid particulates from the slurry. For such a cleaning phase, the blocking elements 89*b* can be removed from the master valve assembly so that only a single chamber is defined by the single cavity 89*cav* so that backwash fluid flows 91 can be applied to all the tube manifolds at the same time to facilitate cleaning. Bolts or other filler elements can be positioned in the holes of the master valve cover plate 89*mvc* to help ensure the absence of the blocking elements 89*b* does not create significant leaks in the master valve assembly 89*mv*.

This arrangement in which there are no blocking elements 89*b* within the cavity 89*cav* can also be utilized during a cleaning cycle so that the backwash mechanism 15 can be deactivated and the vacuum conduit(s) 94 can then be utilized in conjunction with the at least one vacuum driving mechanism 99 to apply a vacuum to all of the tube manifolds 27 and their disc sectors 20*a* so vacuum flows 92 are generated and pass out of the tube manifolds 27. This can be done to facilitate a drying of the tube manifolds 27 and disc sectors 20*a* after extensive cleaning, for example.

After the extensive cleaning phase is complete, the master valve assembly 89*mv* can again be adjusted by having the blocking elements 89*b* repositioned within the cavity 89*cav* to form the chambers 90 so that the disc sectors 20*a* can undergo vacuum and backwash flows during each revolution of the discs 20*b* while the filtration device 10 is operated to perform filtering in a subsequent filtration operation.

It should be appreciated that the master valve cover plate 89*mvc*, wear plate 89*wp*, and tube manifold attachment plate 89*tap* are illustrated as generally circular disc type bodies in a number of the drawings. But, this is an exemplary arrangement. It should be appreciated that the shape of the master valve assembly 89 and one or more of these plates can alternatively be polygonal shaped, oval shaped or have another plate type shape.

It should also be understood that the foregoing is provided for illustrative and exemplary purposes; the present invention is not necessarily limited thereto. Rather, those skilled in the art will appreciate that various modifications, as well as adaptations to particular circumstances, are possible within the scope of the invention as herein shown and described. For instance, different embodiments may be designed to meet a particular set of design criteria. As another example, the size and configuration of different elements and the material for those elements can be designed for a particular operational objective (e.g. filtration of a particular type of mineral from a liquid slurry, filtration of a particular set of solid particulates from a slurry, a size and layout of the facility in which at least one filtration device 10 is to be incorporated, operational parameters at which the facility that will include one or more filtration devices is to operate, etc.). For instance, some embodiments of the filtration devices may utilize a dip mechanism but may not utilize at least one scraper 41 that can directly contact filter element of disc sectors of the rotatable discs 20*b* of the filtration device 10. As another example, some embodiments of the filtration device may utilize the at least one scraper 41 without using the dip mechanism. Yet other embodiments may utilize both at least one scraper 41 and the dip mechanism. Yet other embodiments may only use an embodiment of the backwash mechanism 15 or may utilize the backwash mechanism 15 in combination with the dip mechanism, at least one scraper 41, or both the dip mechanism and at one scraper 41. As yet another example, some embodiments of the filtration system may utilize a single filtration device 10 and other embodiments may utilize a series of filtration devices 10 that operate in parallel. Yet other embodiments of the filtration system may utilize a series of filtration devices 10 that operate to filter different slurries within a particular plant.

As another example, the size and shape of different components can be altered to meet a particular type of design criteria. For example, tube manifolds 27 can be cylindrical tubes or polygonal shaped tubes. The conduits of the tube manifolds can be circular or polygonal in cross sectional shape as well. The discs 20b and disc sectors 20a can be circular, oval, or polygonal in shape. As yet another example, the master valve assembly 89mv can have cylindrical or polygonal shaped components.

As yet another example, it should be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement. Therefore, while certain exemplary embodiments of filter devices, filtration elements used to remove solid particulates from a slurry for forming a filter cake, mechanisms utilized to separate a formed filter cake from a disc sector of a filter device and methods of making and using the same have been shown and described above, it is to be distinctly understood that the invention is not limited thereto but may be otherwise variously embodied and practiced within the scope of the following claims.

What is claimed is:

1. A filtration device comprising:
   at least one rotatable disc that is rotatable so disc sectors are insertable into a slurry bath positioned adjacent the at least one rotatable disc, the disc sectors configured to form filter cakes comprised of solid particulate material of the slurry via rotation of the at least one rotatable disc;
   at least one of:
   (i) a scraper comprising at least one scraper member configured to scrape filter cakes formed on the disc sectors of at least one disc via the at least one scraper member directly contacting at least one filter element of each of the disc sectors of the disc to remove the filter cake for directing solid particulate material of the filter cake to at least one discharge chute;
   (ii) a backwash mechanism configured to feed backwash fluid to the disc sectors of the at least one rotatable disc via tube manifolds connected to a backwash mechanism tank of the backwash mechanism so backwash fluid flows through inner spaces defined by a frame and at least one filter element of each of the disc sectors via the tube manifolds and is output from passageways of the at least one filter element to clean the filter element during a backwash operation, the backwash fluid including liquid, gas, or a combination of liquid and gas;
   (iii) a dip mechanism configured so that the disc sectors of each disc move independently of each other between a retracted position and an extended position so that the disc sectors are in the extended position when passing through the slurry bath and are in the retracted position when out of the slurry bath during rotation of the at least one rotatable disc; and
   (iv) a master valve assembly configured so that at least one disc sector of each disc receives a backwash fluid flow while vacuum flows of fluid is passed out of other disc sectors of each disc during each revolution of the at least one disc; and
   wherein the filtration device includes the dip mechanism, the dip mechanism including:
   a first tube manifold moving device connected adjacent first ends of the tube manifolds; and
   a second tube manifold moving device connected adjacent second ends of the tube manifolds.

2. The filtration device of claim 1, comprising:
   the dip mechanism, the backwash mechanism, the master valve assembly, and the at least one scraper.

3. The filtration device of claim 1, comprising:
   the dip mechanism and the backwash mechanism.

4. The filtration device of claim 1, comprising:
   the dip mechanism and the at least one scraper.

5. The filtration device of claim 1, comprising:
   the at least one scraper and the backwash mechanism.

6. The filtration device of claim 1, wherein the filter element is comprised of a mesh body that has a coating that covers an entirety of the exterior surface of the mesh body or at least a portion of the exterior surface of the mesh body.

7. The filtration device of claim 1, wherein each disc sector includes at least one stabilizer element positioned in the inner space of the frame extending between filter elements attached to opposite sides of the frame.

8. The filtration device of claim 1, wherein the filtration device includes the scraper and the at least one scraper member comprises:
   a first scraper member positioned so that a distal end of the scraper member contacts the filter element of the disc sectors of a first disc of the at least one disc.

9. The filtration device of claim 8, wherein the at least one scraper member also comprises:
   a guide positioned adjacent the distal end of the first scraper member.

10. The filtration device of claim 9, wherein the guide is a rider that rides on the filter elements of the disc sectors of the first disc.

11. The filtration device of claim 1, wherein the backwash mechanism comprises:
    a liquid source;
    a compressed gas source;
    a backflow mechanism tank, the backflow mechanism tank connected to the compressed gas source to receive compressed gas from the compressed gas source, the backflow mechanism tank connected to the liquid source to receive liquid from the liquid source, the backflow mechanism tank having a backflow fluid outlet to output the backflow fluid from the backflow mechanism tank.

12. The filtration device of claim 11, wherein the backwash mechanism comprises a diffuser positioned in the backflow mechanism tank to mix the compressed gas with the liquid in the backflow mechanism tank to form a two phase backflow fluid.

13. The filtration device of claim 1, wherein the first tube manifold moving device and the second tube manifold moving device each comprises:
    a rotatable cam;

a moveable lever; and an actuator member connecting the cam to the lever so that rotation of the cam causes the lever to move to adjust a vertical position of a distal end of the lever attached to a moveable segment of an attachment ring to which the tube manifolds are connected so that a position of a respective one of the tube manifolds is adjusted relative to the other tube manifolds from the retracted position to the extended position while the tube manifold is positioned into engagement with the moveable segment of the attachment ring.

14. The filtration device of claim 13, wherein the lever is pivotally attached to a wall of the slurry bath or a floor of the slurry bath and rotates to vertically adjust the moveable segment of the attachment ring.

15. The filtration device of claim 13, wherein the first ends of the tube manifolds are connected to flexible connection hoses and the second ends of the tube manifolds are connected to flexible connection hoses.

16. The filtration device of claim 15, wherein the cam is positioned so that the cam rotates as the tube manifolds rotate.

17. The filtration device of claim 1, wherein the filtration device includes the backwash mechanism, and wherein each of the tube manifolds is connected to disc sectors via outlet conduits extending from frames of the disc sectors to which the tube manifold is connected so that fluid is passable from between an inner space of the frame and a fluid conduit defined by the tube manifold.

18. The filtration device of claim 17, comprising:

a plurality of gaskets and a plurality of gasket attachment plates, each of the gaskets positioned about a respective one of the outlet conduits to surround the outlet conduits and engage the tube manifold adjacent an interface between the outlet conduit and the tube manifold; and each of the gasket attachment plates positioned on a respective one of the gaskets to position the gasket in a resilient engagement adjacent the interface between the outlet conduit and the tube manifold.

19. The filtration device of claim 18, wherein each of the gasket attachment plates is configured to facilitate attachment of the frame of the disc sector to the tube manifold.

20. The filtration device of claim 18, wherein the filtration device also includes the master valve assembly.

21. The filtration device of claim 20, wherein the master valve assembly comprises:

a tube manifold attachment plate configured to attach to the tube manifolds so that the tube manifolds are in fluid communication with the backwash mechanism and a vacuum driving mechanism;

a plurality of blocking elements positioned in a cavity of the master valve assembly to define a backwash fluid chamber and a vacuum chamber in the cavity; and the blocking elements positioned so that during rotation of the tube manifold plate, each tube manifold attached to the tube manifold plate is in fluid communication with the backwash fluid chamber during a first phase of a revolution of the at least one disc and is also in fluid communication with the vacuum chamber during a second phase of the revolution of the at least one disc.

22. The filtration device of claim 21, wherein the first phase of the revolution is a scraping phase and the second phase of the revolution is a drying phase.

* * * * *